US008429023B2

(12) United States Patent
Swallow et al.

(10) Patent No.: US 8,429,023 B2
(45) Date of Patent: Apr. 23, 2013

(54) REVENUE RAISING AUCTION PROCESSES FOR PUBLIC GOODS

(76) Inventors: Stephen K. Swallow, West Kingston, RI (US); Christopher M. Anderson, East Greenwich, RI (US); Elizabeth C. Smith, Newport, RI (US)

( * ) Notice: Subject to any disclaimer, the term of this patent is extended or adjusted under 35 U.S.C. 154(b) by 503 days.

(21) Appl. No.: 12/653,125

(22) Filed: Dec. 8, 2009

(65) Prior Publication Data
US 2010/0169187 A1    Jul. 1, 2010

Related U.S. Application Data

(60) Provisional application No. 61/120,573, filed on Dec. 8, 2008.

(51) Int. Cl.
*G06Q 30/00* (2006.01)
(52) U.S. Cl.
USPC ...................................... 705/26.3; 705/26.25
(58) Field of Classification Search ............ 705/26–27.2
See application file for complete search history.

(56) References Cited

U.S. PATENT DOCUMENTS

| | | | |
|---|---|---|---|
| 5,237,507 A | 8/1993 | Chasek | |
| 7,013,292 B1 * | 3/2006 | Hsu et al. ........................ | 705/37 |
| 7,039,592 B1 | 5/2006 | Yegge et al. | |
| 7,133,841 B1 | 11/2006 | Wurman et al. | |
| 7,343,341 B2 | 3/2008 | Sandor et al. | |
| 7,346,572 B2 | 3/2008 | Hoffman | |
| 7,395,230 B2 | 7/2008 | Hermreck et al. | |
| 2001/0027437 A1 | 10/2001 | Turbeville et al. | |
| 2002/0046037 A1 | 4/2002 | Ausubel et al. | |
| 2007/0055606 A1 | 3/2007 | Ausubel et al. | |
| 2008/0306860 A1 | 12/2008 | Musier et al. | |

OTHER PUBLICATIONS

Spencer, M.A., "Three Experiments of Providing and Valuing Threshold Public Goods with Alternative Rebate Rules", Ph.D. dissertation, Department of Environmental and Natural Resource Economics, University of Rhode Island, 2002.*
Rondeau, D.; Schulze, W.D.; Poe, G.L., 1999, "Voluntary Revelation ofthe Demand for Public Goods Using a Provision Point Mechanism", Journal of Public Economics, 72(3), pp. 455-470.*
Ledyard, J., 1995 in: Kagel, J. Roth, A. (Eds) "Public Goods: A Survey of Experimental Researc"h in the Handbook of Experimental EconomiCS, Princeton University Press, Princeton NJ.*

(Continued)

*Primary Examiner* — Adam Levine
(74) *Attorney, Agent, or Firm* — Alfred M. Walker; Harvey Lumenfeld

(57) ABSTRACT

A computer system for a pricing and auction process allows private enterprise firms to establish an individual price for each consumer paying in to support delivery of the same units of a public good. The process solicits bids from individuals who value a public good, while reducing each individual's incentives to free ride, thereby increasing their incentives to bid or offer a payment that approaches their full value for each, successive unit of the good. Examples include farmers selling the services of land for wildlife habitat, farmers altering production processes to reduce pesticides and nutrients and increase local water quality, particularly during transition from technologically intensive farming to organic farming, or businesses established to help neighborhoods and communities become carbon neutral in a global economy. The process benefits profit or non-profit organizations supporting conservation such as wetland and salt marsh restoration or restoration of endangered species habitat.

15 Claims, 63 Drawing Sheets

OTHER PUBLICATIONS

Adamowicz, W.; Louviere, J,; Williams, M., 1994, "Combining Revealed and Stated Preference Methods for Valuing Environmental Amenities", Journal of Environmental Economics and Management, 26, pp. 271-292.

Adamowicz, W.; Boxall, P.; Williams, M.; Louviere, J., 1998, Stated Preference Approaches to Measuring Passive Use Values: Choice Experiments versus Contingent Valuation:, American Journal of Agricultural Economics, 80, pp. 64-75.

Addelman, S. Kempthorn, O., 1961, "Orthogonal Main Effect Plans". ASTIA, Arlington Hall Station, Arlington, VA.

Alston, R.M., Nowell, C., 1996, "Implementing the Voluntary Contribution Game: A Field Experiment", Journal of Economic Behavior and Organization 31, 357-368.

Bagnoli, M., Lipman, B. 1989, "Provision of Public Goods: Fully Implementing the Core Through Private Contributions", Review of Economic Studies, 56 pp. 583-601.

Bagnoli, M., McKee, M., 1991, Voluntary Contribution Games: Efficient Private Provision of Public Goods, Economic Inquiry 29, pp. 351-366.

Boxall, P., Adamovvicz, W. (2002), "Understanding Heterogeneous Preferences in Random Utility Models: A Latent Class Approach", Environmental and Resource Economics, 23(4), 421-446.

Bracht, J., Figuieres, C., Ratio, M., 2008, "Relative Performance of Two Simple Incentive Mechanisms in a Public Goods Experiment", Journal of Public Economics—92, 54-90.

Cadsby, C.B., Maynes, E., 1999, "Voluntary Provision of Threshold Public Goods with Continuous Contributions: Experimental Evidence", Journal of Public Economics, 71, pp. 53-72.

Carlsson, Fredrik, Martinsson, Peter, 2011, "Do Hypothetical and Actual Marginal Willingness to Pay Differ in Choice Experiments? Application to the Valuation of the Environment." Journal Environmental Economics and Management, 41, pp. 79-192.

Carlsson, Fredrik, Frykblom, P., Liljenstolpe, Carolina, 2003, "Valuing Wetland Attributes: An Application of Choice Experiments", Ecological Economics, 47, pp. 95-103.

Chen, Y., "Incentive-Compatible Mechanisms for Pure Public Goods: A Survey of Experimental Research", 1999, prepared for: The Handbook of Experimental Economics Results.

Clarke, E.H.,: 1971, "Multipart Pricing of Public Goods", Public Choice, 11 pp. 17-33.

Clark, Jeremy, 2002, "House Money Effects in Public Good Experiments", Experimental Economics, 5(3), pp. 223-231.

Dawes, R., Thaler, R., 1988, "Anomalies: Cooperation", Journal of Economic Perspectives, 2:187-98.

Greene, W.H., Hensher, D.A., 2003, "A Latent Class Model for Discrete Choice Analysis: Contrasts with Mixed Logit", Transportation Research, Part B: Methodological 37 (8):681-698.

Groves, T, Ledyard, J., 1977, "Optimal Allocation of Public Goods: A Solution to the 'Free Rider' Problem", Econometrica, 45(4), pp. 783-809.

Groves, T., Ledyard, J.O., "Some Limitations of Demand Revealing Processes", Public Choice, vol. 29, pp. 107-124, Supplement Spring 1977.

Hanemann, W.M., 1984, "Welfare Evaluations in Contingent Valuation Experiments with Discrete Responses", American Journal of Agricultural Economics 66 (3):332-41.

Hardie, I., Strand, I., 1929, "Measurement of Economic Benefits for Potential Public Goods", American Journal of Agricultural Economics 61(2), pp. 313-317.

Hoehn, J.P., Randall, A., 1987, "A Satisfactory Benefit Cost Indicator from Contingent Valuation", Journal of Environmental Economics and Management 14, 226-247.

Isaac, R. Mark; McCUE, Kenneth, F.; Plott, Charles R., 1985, "Public Goods Provision in an Experimental Environment", Journal of Public Economics 26(1): 51-74.

Isaac, M.; Schmidtz, D.; Walker, J., 1989, "The Assurance Problem in a Laboratory Market", Public Choice, 62, pp. 217-236.

Johnston, R.J., Swallow, S.K., Weaver, T.F., 1999, "Estimating Willingness to Pay and Resource Tradeoffs with Different Payment Mechanisms: An Evaluation of a Funding Guarantee for Watershed Management", Journal of Environmental Economics and Management 38(1): 97-120.

Johnston, R.J.; Magnusson, G.; Mazzotta, M.J.; Opaluch, J.J., 2002, "Combining Economic and Ecological Indicators to Prioritize Salt Marsh Restoration Actions", American Journal of Agricultural Economics, 84, 1362-1370.

Kawagoe, T., Mori, T., 2001, "Can the Pivotal Mechanism Induce Truth-Telling? An Experimental Study", Public Choice, vol. 108, No. 3-4, pp. 331-354.

Kikulwe, E.M., Birol, E., Wesseler, J., Falck-Zepeda, J., 2011, "A Latent Class Approach to Investigating Demand for Genetically Modified Banana in Uganda", Agricultural Economics, 42(1).

Kline, J, Wichelns, D., 1998, "Measuring Heterogeneous Preferences for Preserving Farmland and Open Space", Ecological Economics 26(2): 211-234.

Krutilla, J.V., 1967, "Conservation Reconsidered", American Economic Review 57(4):777-786.

Lancaster, K., 1966, "A New Approach to Consumer Theory", Journal of Political Economy, 74, pp. 132-157.

Lindahl, E., 1919, "Die Gerechtigkeit der Besteuring, Lund: Gleerup", (English translation: "Just Taxation—A Positive Solution", In Classics in the Theory of Public Finance, edited by R.A. Musgrave and A.T. Peacock, London: MacMillan, 1958.

List, John A., Sinha, Paramita, Taylor, Michael H., 2006, "Using Choice Experiments to Value Non-Market Goods and Services: Evidence from Field Experiments", Advances in Economic Analysis & Policy: vol. 6: Iss. 2, Article 2. Available at: http://www.bepress.com/bejeap/advances/vol6/iss2/art2.

Louviere, J.; Hensher, D.; Swait, J., 2000, "Stated Choice Methods", Cambridge University Press, Cambridge.

Lugo, Ezequiel, 2007, "Ecosystem Services, The Millennium Ecosystem Assessment, and the Conceptual Difference Between Benefits Provided by Ecosystems and Benefits Provided by People", Available at: http://works.bepress.com/cgi/viewcontent.cgi?article=10008,context=ezequiel_lugo.

Marks, Melanie; Croson, Rachel, 1998, "Alternative Rebate Rules in the Provision of a Threshold Public Good: An Experimental Investigation", Journal of Public Economics 67(2), pp. 195-220.

Marks, Melanie; Croson, Rachel, 2001, "The Effect of Recommended Contributions in the Voluntary Provision of Public Goods", Economic Inquiry 39(2), pp. 238-249.

MEA (Millennium Ecosystem Assessment), 2005, "Ecosystems and Human Wellbeing: Synthesis", Island Press, Washington, D.C.

Morey, E., Thacher, J., Breffle, W., 2006, "Using Angler Characteristics and Attitudinal Data to Identify Environmental Preference Classes: A Latent Class Model", Environment and Resource Economics, 34(1), 91-115.

Poe, G.L.; Clark, J.E.; Rondeau, D.; Schulze, W.D., 2002, "Provision Point Mechanisms and Field Validity Tests of Contingent Valuation", Journal of Environmental and Resource Economics 23(1), pp. 105-131.

Provencher, B.; Bishop, R.C., 2004, "Does Accounting for Preference Heterogenity Improve the Forecasting of a Random Utility Model? A Case Study", Journal of Environmental Economics and Management 48(1), 793-810.

Provencher, B.; Moore, R., 2006, "A Discussion of 'Using Angler Characteristics and Attitudinal Data to Identify Environmental Preference Classes: A Latent Class Model", Environmental and Resource Economics, 34(1), pp. 117-124.

Rapoport, A., 1988, "Provision of Step-Level Public Goods: Effects of Inequality in Resources", Journal of Personality and Social Psychology 54(4), 432-440.

Rapoport, A., Eshed-Levy, D., 1989, "Provision of Step-Level Public Goods: Effects of Greed and Fear of Being Gypped", Organizational Behavior and Human Decision Processes 44, pp. 325-344.

Rondeau, D.; Schulze, W.D.; Poe, G.L., 1999, "Voluntary Revelation of the Demand for Public Goods Using a Provision Point Mechanism", Journal of Public Economics, 72(3), pp. 455-470.

Rondeau, D.; Poe, G.L.; Schulze, W.D., 2005, "VCM or PPM? A Comparison of the Performance of Two Voluntary Public Goods Mechanisms", Journal of Public Economics, vol. 89, pp. 1581-1592.

Rose, S.K.; Clark, J.; Poe, G.L.; Rondeau, D.; Schulze, W.D., 2002, "The Private Provision of Public Goods: Tests of a Provision Point Mechanism for Funding Green Power Programs", Resource and Energy Economics, vol. 24, pp. 131-155.

Samuelson, P.A., 1954, "The Pure Theory of Public Expenditure", The Review of Economics and Statistics, 36(4), pp. 387-389.

Chen, Y, "Incentive-Compatible Mechanisms for Pure Public Goods: A Survey of Experimental Research", 2003, Prepared for The Handbook of Experimental Economics Results.

Silvestre, J., 2003, "Wicksell, Lindahl and the Theory of Public Goods", Scand. J. of Economics, 105(4), pp. 527-553, http://www.jstor.org/discover/10.2307/3441130?uid=3739888&uid=2&uid=4&uid=3739256&sid=56084271163.

Spencer, M.A., Swallow, S.K., Shogren, J.F., List, J.A., 2009, "Rebate Rules in Threshold Public Good Provision", Journal of Public Economics 93:798-806.

Suleiman, R., Rapoport, A., 1992, Provision of Step-Level Public Goods with Continuous Contribution:, Journal of Behavioral Decision Making 5, 133-153.

Swait, J.R., 1994, "A Structural Equation Model of Latent Segmentation and Product Choice for Cross-Sectional Revealed Preference Choice Data", Journal of Retailing and Consumer Services 1: 77-89.

Swallow, Stephen K.; Smith, Elizabeth C.; Uchida, Emi; Anderson, Christopher M., 2008, "Ecosystem Services Beyond Valuation, Regulation, and Philanthropy: Integrating Consumer Values into the Economy", Choices 23(2), pp. 47-52.

Walker, Mark, 1981, "A Simple Incentive Compatible Scheme for Attaining Lindahl Allocations", Econometrica 49(1), pp. 65-71.

Palfrey, T.; Rosenthal, H., 1991, "Testing for Effects of Cheap Talk in a Public Goods Game with Private Information", Games and Economic Behavior 3, 183-220.

* cited by examiner

DASHED LINES INDICATE COMPUTER MEDIATED PROCESS

FIGURE 6
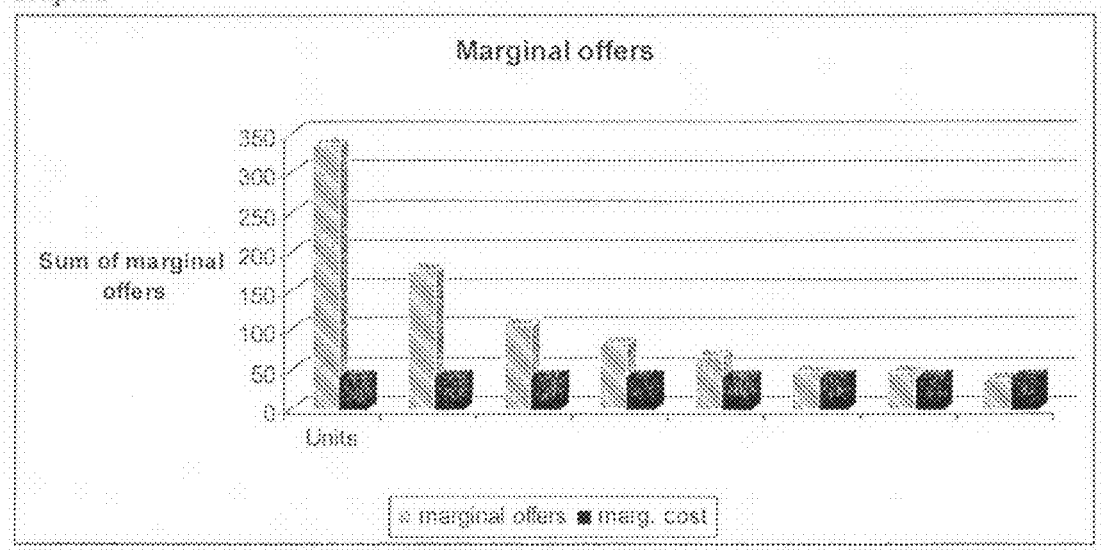
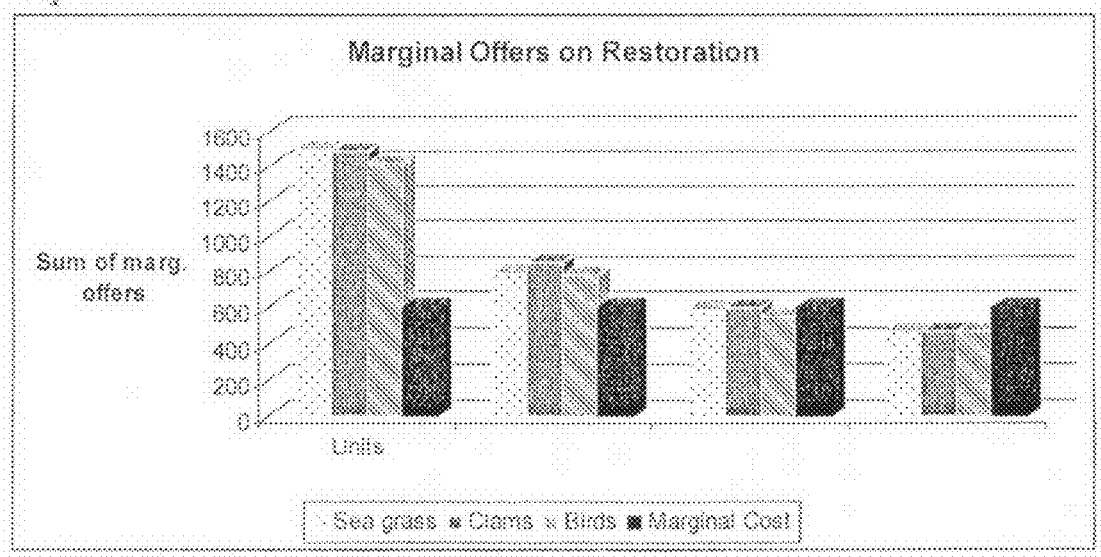
FIGURE 7

Market Goods

- Excludable means
  - only one person benefits from a unit
  - producer can prevent others from benefiting without paying for provision
- Markets can form, _generating incentives_ for production and provision
- Excludability stimulates markets for provisioning services
  - Shellfish for food
  - Shells for building materials (e.g., crushed lime)

The Public Good Challenge

- Ecosystem Services *often* Public Goods
  - Many people benefit simultaneously
- Strategic advantage of "free riding"
  - Provision by anyone benefits everyone, including non-payers / non-providers
  - "Free ride" or "cheap ride" relative to personal benefit

FIGURE 9E

Solving the Challenge

- Design rules of trade and pricing that:
  - Reduce incentives to free ride → Reduce penalty for over-contribution
  - Enable providers to benefit more fully, so providers *become concerned about people's values*
- *Economics Experiments* have shown
  - Rules affect incentives and revenues
  - Dirty details: simplicity, trust and cooperation

FIGURE 9F

The Process – Drawing on Known Literature

- Money back guarantee (MBG)

- For "Provision Point" goods
  : Threshold for funding and provision
    = the cost of farm contract for wildlife-friendly hayfield
    = minimum target for funds

- Provision Point and MBG
  = threat of non-provision

FIGURE 9G

New Elements

- Provider – Broker – Market-maker:
  - establishes and defines a group of potential beneficiaries
  - defines threshold levels for provision
    - This is related to "Clubs"
    - NEW: If done through franchise rights or entrepreneurial "Claim," the entrepreneur can leverage the power of exclusion to establish ability to control: provide or not provide.
    - Our public discussions of earlier versions have avoided making this point obvious

FIGURE 9H

Mechanism 1: Proportional Rebate
(PR) — example rule for provision, integrated from earlier literature, applied in the process for provision of marginal unit

- Individual: pledge to <u>maximum</u> <u>payment</u>
  - Pay only <u>proportion needed</u> for provision point

- Example: Person pledges $50 and all pledges total $5000 but contract cost is $2500 --- then person only pays $25
  - *Incentives reduce cost of pledging beyond marginal need*

FIGURE 9I

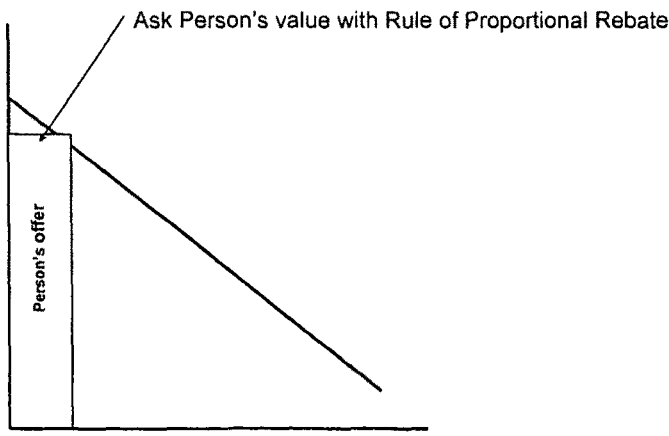

The Process – soliciting individual bids (forward version)

Ask Person's value with Rule of Proportional Rebate

Person's value ($/unit)

Person's offer

Units available or to be provided

FIGURE 9J

For this section, you have a budget of $100 to make each decision with

Questions 18 a-d are specifically about sea grass restoration activities only.

Please *circle* your decisions for the allocation of your personal budget for each incremental unit of *sea grass* restoration activities. You should circle one dollar value in each column, a-d.

Q.18

| Per Unit Prices ($) | (a) 1 Increment | | (b) 2 Increments | | (c) 3 Increments | | (d) 4 Increments | |
|---|---|---|---|---|---|---|---|---|
| 0 | pay 0 | keep 100 | pay 0 | keep 100 | pay 0 | keep 100 | pay 0 | keep 100 |
| 5 | pay 5 | keep 95 | pay 10 | keep 90 | pay 15 | keep 85 | pay 20 | keep 80 |
| 10 | pay 10 | keep 90 | pay 20 | keep 80 | pay 30 | keep 70 | pay 40 | keep 60 |
| 15 | pay 15 | keep 85 | pay 30 | keep 70 | pay 45 | keep 55 | pay 60 | keep 40 |
| 20 | pay 20 | keep 80 | pay 40 | keep 60 | pay 60 | keep 40 | pay 80 | keep 20 |
| 25 | pay 25 | keep 75 | pay 50 | keep 50 | pay 75 | keep 25 | pay 100 | keep 0 |
| 30 | pay 30 | keep 70 | pay 60 | keep 40 | pay 90 | keep 10 | | |
| 33.33 | pay 33.33 | keep 66.67 | pay 66.67 | keep 33.33 | pay 100 | keep 0 | | |
| 35 | pay 35 | keep 65 | pay 70 | keep 30 | | | | |
| 40 | pay 40 | keep 60 | pay 80 | keep 20 | | | | |
| 45 | pay 45 | keep 55 | pay 90 | keep 10 | | | | |
| 50 | pay 50 | keep 50 | pay 100 | keep 0 | | | | |
| 55 | pay 55 | keep 45 | | | | | | |
| 60 | pay 60 | keep 40 | | | | | | |
| 65 | pay 65 | keep 35 | | | | | | |
| 70 | pay 70 | keep 30 | | | | | | |
| 75 | pay 75 | keep 25 | | | | | | |
| 80 | pay 80 | keep 20 | | | | | | |
| 85 | pay 85 | keep 15 | | | | | | |
| 90 | pay 90 | keep 10 | | | | | | |
| 95 | pay 95 | keep 5 | | | | | | |
| 100 | pay 100 | keep 0 | | | | | | |

Figure 9N

Research issues

- Presentation, trust, market context
- Forward – versus – backward
  - Forward was illustrated
- Testing of strategic incentives
- Modification with "Pivotal Mechanism" and link to use with, for example, farm subsidy programs for conservation.

FIGURE 9O

LTER DATA OVERVIEW

Demographics Overview

- 55% women
- Average age 50 (range 23-72yrs)
- Average residency time 13.6years (range 1-45yrs)
- Almost 90% of our sample owned their home, with 89% of those being primary residences
- Of the people who responded, 77hrs was the mean monthly hours (note, I think several people answered this as weekly, so this may not mean very much)
- Educational distribution (%)
  - High school or less (8.6)
  - Bachelors/some college (52.2)
  - Graduate degree/some (39.1)
- Work Status (%)
  - Full time (43.5)
  - Part time (17.4)
  - Unemployed (2.1)
  - Retired (37)
- Income distribution (%)
  - <25k (6.5)
  - 25-40k (4.3)
  - 40-50k (15.2)
  - 50-75k (30.3)
  - 75-100k (26.1)
  - >100k (17.4)
- More than half of the sample identified as being recreational fishermen and bird watchers (56% and 58% respectively), with only 20% identifying as recreational hunters and 4% as commercial fishers.
- Less than 10% of the sample has ever done any oyster gardening (8.7%) and 13% have family members or are clam growers themselves.
- More than 80% sometimes donate to environmental charities Section I & II – Preliminary Observations

- Overall, more people chose a bundle with 1 of each unit of restoration, than a bundle split 2/0/2. (across all types)
- Type 1 Q4, may have been driven by cash – their split was 114/6 for A and 74/48 for B and they were the only id-type that overwhelmingly chose B (1/3/0) over A (0/3/2)
- Type 2 Q5, chose less of a bundle but more money to the bundle – not as notable as above 2/3/1 v 0/1/3 (B)
- Q7 all types. B was majority ( 2/1/0) but some people still chose A (0/0/1) indicating a clear preference for SG (across all types)
- Q11 majority for A (1/3/2) over B (3/1/1) – all types. Birds may be less of a priority than previously thought
- Q14 type 2 did seem somewhat influenced by the large split in money 24/96 to government
- Q16 , type 3, all money to restoration lead this group to favor B (0/2/1) v. A (0/0/3)
- 3 people chose to keep all the money for Q9, remainder of sample chose all money to restoration

FIGURE 10A
10A: Test Auction, Data Overview

Section III

ALL responses for Sea Grass (both groups)

|  | Mean | Std Dev | Min | Max |
|---|---|---|---|---|
| 1 unit | 64.24 | 32.98 | 0 | 100 |
| 2 | 35.78 | 14.38 | 0 | 50 |
| 3 | 26.15 | 8.69 | 0 | 33.33 |
| 4 | 20.91 | 6.40 | 0 | 25 |

Sea Grass CONDITIONAL ONLY

| Unit | Mean | Std. Dev. | Min | Max |
|---|---|---|---|---|
| 1 | 69.29 | 32.53 | 10 | 100 |
| 2 | 38.81 | 13.03 | 5 | 50 |
| 3 | 27.54 | 8.24 | 0 | 33.33 |
| 4 | 21.43 | 6.35 | 0 | 25 |

ALL responses for Clams (both groups)

|  | Mean | Std Dev | Min | Max |
|---|---|---|---|---|
| 1 unit | 64.35 | 32.43 | 0 | 100 |
| 2 | 35.72 | 14.14 | 0 | 50 |
| 3 | 25.29 | 9.76 | 0 | 33.33 |
| 4 | 20 | 6.83 | 0 | 25 |

Clams CONDITIONAL ONLY

| Unit | Mean | Std. Dev. | Min | Max |
|---|---|---|---|---|
| 1 | 70 | 31.10 | 0 | 100 |
| 2 | 37.38 | 13.93 | 0 | 50 |
| 3 | 26.67 | 9.66 | 0 | 33.33 |
| 4 | 21.19 | 6.50 | 0 | 25 |

ALL responses for Birds (both groups)

|  | Mean | Std Dev | Min | Max |
|---|---|---|---|---|
| 1 unit | 61.41 | 32.56 | 0 | 100 |
| 2 | 34.06 | 14.54 | 0 | 50 |
| 3 | 24.17 | 9.94 | 0 | 33.33 |
| 4 | 19.46 | 6.69 | 5 | 25 |

Birds CONDITIONAL ONLY

| Unit | Mean | Std. Dev. | Min | Max |
|---|---|---|---|---|
| 1 | 67.14 | 32.04 | 10 | 100 |
| 2 | 37.06 | 13.39 | 10 | 50 |
| 3 | 26.59 | 8.92 | 5 | 33.33 |
| 4 | 20 | 6.71 | 5 | 25 |

FIGURE 10B

10B: Test Auction Results, Summary

You are ID #

Your participation in this project is voluntary. You may refuse to answer any question. Your responses will be confidential and will never be associated with your name and never reported in any way that could identify you.

This page will be cut and separated here

*RECEIPT*

Receipt for funds during the ecosystem economics experiment through LTER site:

| | |
|---|---|
| Participation Fee | $ 40 |
| Session outcome earnings | $ _____ |
| Total | $_____ |

Signature: _____ Date: 19 November 2008

We are required to ask for the information below only for financial record keeping. This will NOT be used to create any type of mailing or email list.

Name (printed):_____

Address: _____

_____

Phone: _____

Email: _____

SS#: (optional) _____

FIGURE 11A

Introduction

This project involves the value, in economic terms, that area residents have for environmental or ecosystem restoration. You will be asked to make decisions involving the allocation of money to different sets of activities involving ecosystem restoration as well as other non-environmental benefits.

The decisions you make tonight, through answering our questionnaire, will impact local restoration. All of the questions are potentially real – all could lead to real actions for spending money for environmental restoration or other purposes, as explained in each choice-question.

You might find the questions here involve difficult or easy choices, based on your personal preferences and priorities. Your answers will be confidential and will *not* be shared in any way that identifies you. Also, we recognize that your time is valuable and we hope you view any payments you take home from this session to be well-earned. We hope that you will take enough time to think carefully about each question, relative to your personal preferences and priorities. All questions could be implemented. Your participation is important to management and policy for coastal areas.

For this session, we are able to pay a $40 participation fee, no matter which choice question below is implemented. Thus, money referred to below is *in addition* to the $40 participation fee that we will give you at the end of tonight's session.

General Instructions

1) The participants in this session are divided into two separate groups, at random. This means that not every single person in the room is in your group, but you will not be informed as to who is in your group and who is not. Your group is important because in some questions the project coordinator will look at the combined decisions of the group to determine the final outcome for a question. This will be explained more fully in the following instructions.

2) There are 3 separate sections, each with their own set of instructions and choice-questions. Please read each set of instructions carefully, and do not hesitate to raise your hand if you have questions. The instructions will give you important information about the a) allocation of funds to restoration or to other activities and b) the specific restoration activities that could be provided and c) information on how your groups' decisions impact restoration.

3) You will be asked to answer approximately 20 choice-questions today. Each of these questions has the possibility for provision, but only one question in each of the two groups of people will be implemented. Once every participant has completed the set of questions, the project coordinator will randomly choose one question for each group. Based on the choices made by you and the people in your group, the results for that question will be implemented for your group.

4) If you have any questions as we proceed through this session, please do not talk to your friends or neighbors. Rather, please raise your hand so that the project coordinator can come to you and address your question.

FIGURE 11B

11B: Test Auction, Introduction

STOP and Wait Here:

If you have questions for the project coordinator, please raise your hand now.
Please wait for the project coordinator to instruct you to turn the page for Section I.

FIGURE 11C

Section I

For the questions in Section I, you will make decisions between bundles of differing levels of restoration activities that contribute to additional ecosystem services, as well as an individual *rebate of cash* to you. In this section, each individual will be given a personal budget to allocate (or spend) in each choice-question. Please select the bundle that best represents your preferences –by voting for the option, Bundle A or Bundle B, which you would want implemented if that question is the one randomly chosen at the end of the today's session.

Determining the Outcome: The bundle that will be provided will be decided by majority vote of your group. For example, if your group has 10 people in it and 6 choose Bundle B and 4 choose Bundle A, then Bundle B will be the set of restoration activities provided and Bundle A will not be provided. All funds will be used for the restoration activity and take-home payment (either Bundle A or Bundle B) chosen by your group's majority.

EXAMPLE

For this question you have been given $80 to make a decision with

|  | Bundle A | Bundle B |
|---|---|---|
| Bird Habitat Restoration | 2 increments | 1 increments |
| Clam Restoration | 1 increments | 3 increments |
| Sea Grass Restoration | 3 increments | 0 increments |
| Allocation of money, if this question is chosen for implementation: | From your $80, Bundle A will use $60 to help pay for the restoration above and you will receive $20 to take home. | From your $80, Bundle B will use $50 to help pay for the restoration above and you will receive $30 to take home. |

I vote to support (check one box below)

Bundle A        X Bundle B

In the example question above, if your group has 10 people and the majority of people in your group chose Bundle B, and if everyone had the same allocations of money, then $500 ($50 x10) will be used towards the provision (or cost) of Bundle B and the project leaders will implement that bundle while paying $30 to you. Bundle A will not be provided at all. If you voted for A (and the majority voted for B) then your personal budget will be paid according to B because that is what the majority chose.

Please note: The dollar amounts above are only for example. Please make your decisions based only on the information provided in the choice questions (each of which could be randomly chosen for implementation tonight).

FIGURE 11D

11D: Test Auction, Section 1 instructions

For section I, you have a budget of $90 to make each decision with.

| Question 1: | Bundle A | Bundle B |
|---|---|---|
| Bird Habitat Restoration | 0 increments | 1 increments |
| Clam Restoration | 1 increments | 2 increments |
| Sea Grass Restoration | 3 increments | 2 increments |
| Allocation of money, if this question is chosen for implementation: | From your $90.00, Bundle A will use $90.00 to help pay for the restoration above and you will receive $0.00 to take home | From your $90.00, Bundle B will use $49.50 to help pay for the restoration above and you will receive $40.50 to take home |

I vote to support (check one box below)

Bundle A                 Bundle B

| Question 2: | Bundle A | Bundle B |
|---|---|---|
| Bird Habitat Restoration | 0 increments | 2 increments |
| Clam Restoration | 0 increments | 1 increments |
| Sea Grass Restoration | 1 increments | 0 increments |
| Allocation of money, if this question is chosen for implementation: | From your $90.00, Bundle A will use $49.50 to help pay for the restoration above and you will receive $40.50 to take home. | From your $90.00, Bundle B will use $49.50 to help pay for the restoration above and you will receive $40.50 to take home. |

I vote to support (check one box below)

Bundle A                 Bundle B

| Question 3: | Bundle A | Bundle B |
|---|---|---|
| Bird Habitat Restoration | 1 increments | 0 increments |
| Clam Restoration | 1 increments | 2 increments |
| Sea Grass Restoration | 1 increments | 0 increments |
| Allocation of money, if this question is chosen for implementation: | From your $90.00, Bundle A will use $72.00 to help pay for the restoration above and you will receive $18.00 to take home. | From your $90.00, Bundle B will use $22.50 to help pay for the restoration above and you will receive $67.50 to take home. |

I vote to support (check one box below)

Bundle A                 Bundle B

FIGURE 11E

11E: Test Auction, Section I questions 1-3

| Question 4: | Bundle A | Bundle B |
|---|---|---|
| Bird Habitat Restoration | 2 increments | 0 increments |
| Clam Restoration | 3 increments | 1 increments |
| Sea Grass Restoration | 1 increments | 3 increments |
| Allocation of money, if this question is chosen for implementation: | From your $90.00, Bundle A will use $22.50 to help pay for the restoration above and you will receive a $67.50 to take home. | From your $90.00, Bundle B will use $90.00 to help pay for the restoration above and you will receive $0.00 to take home. |

I vote to support (check one box below)

Bundle A                  Bundle B

| Question 5: | Bundle A | Bundle B |
|---|---|---|
| Bird Habitat Restoration | 0 increments | 1 increments |
| Clam Restoration | 3increments | 3 increments |
| Sea Grass Restoration | 2 increments | 0 increments |
| Allocation of money, if this question is chosen for implementation: | From your $90.00, Bundle A will use $72.00 to help pay for the restoration above and you will receive $18.00 to take home. | From your $90.00, Bundle B will use $90.00 to help pay for the restoration above and you will receive $0.00 to take home. |

I vote to support (check one box below)

Bundle A                  Bundle B

| Question 6: | Bundle A | Bundle B |
|---|---|---|
| Bird Habitat Restoration | 3 increments | 2 increments |
| Clam Restoration | 1 increments | 2 increments |
| Sea Grass Restoration | 2 increments | 3 increments |
| Allocation of money, if this question is chosen for implementation: | From your $90.00, Bundle A will use $22.50 to help pay for the restoration above and you will receive $67.50 to take home | From your $90.00, Bundle B will use $72.00 to help pay for the restoration above and you will receive $18.00 to take home. |

I vote to support (check one box below)

Bundle A                  Bundle B

FIGURE 11F

11F: Test Auction, Section I questions 4-6

| Question 7: | Bundle A | Bundle B |
|---|---|---|
| Bird Habitat Restoration | 2 increments | 1 increments |
| Clam Restoration | 0 increments | 1 increments |
| Sea Grass Restoration | 2 increments | 1 increments |
| Allocation of money, if this question is chosen for implementation: | From your $90.00, Bundle A will use $90.00 to help pay for the restoration above and you will receive $0.00 to take home. | From your $90.00, Bundle B will use $72.00 to help pay for the restoration above and you will receive $18.00 to take home. |

I vote to support (check one box below)

Bundle A                Bundle B

| Question 8: | Bundle A | Bundle B |
|---|---|---|
| Bird Habitat Restoration | 3 increments | 1 increments |
| Clam Restoration | 2 increments | 0 increments |
| Sea Grass Restoration | 1 increments | 3 increments |
| Allocation of money, if this question is chosen for implementation: | From your $90.00, Bundle A will use $90.00 to help pay for the restoration above and you will receive $0.00 to take home. | From your $90.00, Bundle B will use $22.50 to help pay for the restoration above and you will receive $67.50 to take home. |

I vote to support (check one box below)

Bundle A                Bundle B

| Question 9: | Bundle A | Bundle B |
|---|---|---|
| Bird Habitat Restoration | 0 increments | 0 increments |
| Clam Restoration | 0 increments | 2 increments |
| Sea Grass Restoration | 0 increments | 1 increments |
| Allocation of money, if this question is chosen for implementation: | From your $120.00, Bundle A will use $0 to help pay for the restoration above and you will receive $120.00 to take home. | From your $120.00, Bundle B will use $114.00 to help pay for the restoration above and you will receive $6.00 to take home. |

I vote to support (check one box below)

Bundle A                Bundle B

FIGURE 11G

11G: Test Auction, Section I questions 7-9

STOP and Wait Here:

Please wait for the project coordinator to instruct you before turning the page, before proceeding to section II.

FIGURE 11H

Section II

For the questions in section II, you will again make decisions between bundles of goods comprised of differing levels of restoration activities. However, in this Section, you are allocating money between supporting restoration and contributing funds to the *local government* for the benefit of the county. In this section, each individual will again be given a personal budget to allocate (or spend) in each choice-question. Please vote to select the bundle that best represents your preferences and thus which option you want your personal budget to be used towards, Bundle A or Bundle B.

Please read the remainder of this page silently to yourself. If you have questions, please raise your hand for the project administer to answer your question quietly.

Determining the Outcome in this section: In order for the bundle to be provided two criteria must be met: (1) the bundle must have the majority vote to be implemented and (2) the amount of money allocated to restoration by your entire group must be enough to pay the costs needed to implement the restoration actions. These costs are pre-determined. In these questions, money not used for restoration under Bundle A or B will be provided to the county government for local use.

For example, if Bundle A costs $700 to provide and if your group has 10 people in it and 8 choose Bundle A, each allocating $100, then the group's majority has chosen A and provided enough money to cover the costs (8 x $100 = $800). If only 6 people voted for Bundle A and they each allocated $100 towards the cost, then Bundle A would be the majority vote, but there would not be enough money to cover the costs (6 x $100 = $600 which is less than $700 needed). In this case, Bundle A would not be provided. If the majority voted for A, then funds from people who voted for B will be given entirely to the county government for local use.

Please note: The above dollar amounts are only for example. Please make your decisions based only on the information provided in the choice questions (each of which could be randomly chosen for implementation tonight).

Stop!! Please wait to turn the page until instructed to do so.

FIGURE 11I

11I: Test Auction, Section II instructions

For this section, you have a budget of $120 to make each decision with

| Question 10: | Bundle A | Bundle B |
|---|---|---|
| Bird Habitat Restoration | 2 increments | 1 increments |
| Clam Restoration | 3 increments | 1 increments |
| Sea grass Restoration | 2 increments | 3 increments |
| Allocation of money, if this question is chosen for implementation: | From your $120.00, Bundle A will use $120.00 to help pay for the restoration above and will give $0.00 to the local county government for general use. | From your $120.00, Bundle B will use $96.00 to help pay for the restoration above and will give $24.00 to the local county government for general use. |

I vote to support (check one box below)

Bundle A        Bundle B

| Question 11: | Bundle A | Bundle B |
|---|---|---|
| Bird Habitat Restoration | 1 increments | 3 increments |
| Clam Restoration | 3 increments | 1 increments |
| Sea grass Restoration | 2 increments | 1 increments |
| Allocation of money, if this question is chosen for implementation: | From your $120.00, Bundle A will use $96.00 to help pay for the restoration above and will give $24.00 to the local county government for general use. | From your $120.00, Bundle B will use $30.00 to help pay for the restoration above and will give $90.00 to the local county government for general use. |

I vote to support (check one box below)

Bundle A        Bundle B

| Question 12: | Bundle A | Bundle B |
|---|---|---|
| Bird Habitat Restoration | 0 increments | 3 increments |
| Clam Restoration | 1 increments | 0 increments |
| Sea grass Restoration | 2 increments | 0 increments |
| Allocation of money, if this question is chosen for implementation: | From your $120.00, Bundle A will use $30.00 to help pay for the restoration above and will give $90.00 to the local county government for general use. | From your $120.00, Bundle B will use $120.00 to help pay for the restoration above and will give $0.00 to the local county government for general use. |

I vote to support (check one box below)

Bundle A        Bundle B

FIGURE 11J

11J: Test Auction, Section II questions 10-12

| Question 13: | Bundle A | Bundle B |
|---|---|---|
| Bird Habitat Restoration | 1 increments | 2 increments |
| Clam Restoration | 3 increments | 0 increments |
| Sea grass Restoration | 1 increments | 2 increments |
| Allocation of money, if this question is chosen for implementation: | From your $120.00, Bundle A will use $120.00 to help pay for the restoration above and will give $0.00 to local county government for general use. | From your $120.00, Bundle B will use $30.00 to help pay for the restoration above and will give $90.00 to the local county government for general use. |

I vote to support (check one box below)

Bundle A                         Bundle B

| Question 14: | Bundle A | Bundle B |
|---|---|---|
| Bird Habitat Restoration | 2 increments | 0 increments |
| Clam Restoration | 3 increments | 3increments |
| Sea grass Restoration | 1increments | 0 increments |
| Allocation of money, if this question is chosen for implementation: | From your $120.00, Bundle A will use $96.00 to help pay for the restoration above and will give $24.00 to the local county government for general use. | From your $120.00, Bundle B will use $66.00 to help pay for the restoration above and will give $54.00 to the local county government for general use. |

I vote to support (check one box below)

Bundle A                         Bundle B

| Question 15: | Bundle A | Bundle B |
|---|---|---|
| Bird Habitat Restoration | 2 increments | 1 increments |
| Clam Restoration | 1 increments | 0increments |
| Sea grass Restoration | 0 increments | 1 increments |
| Allocation of money, if this question is chosen for implementation: | From your $120.00, Bundle A will use $96.00 to help pay for the restoration above and will give $24.00 to the local county government for general use. | From your $120.00, Bundle B will use $30.00 to help pay for the restoration above and will give $90.00 to local county government for general use. |

I vote to support (check one box below)

Bundle A                         Bundle B

FIGURE 11K

11K: Test Auction, Section II questions 13-15

| Question 16: | Bundle A | Bundle B |
|---|---|---|
| Bird Habitat Restoration | 3 increments | 0 increments |
| Clam Restoration | 3 increments | 0 increments |
| Sea grass Restoration | 0 increments | 3 increments |
| Allocation of money, if this question is chosen for implementation: | From your $120.00, Bundle A will use $30.00 to help pay for the restoration above and will give $90.00 to the local county government for general use. | From your $120.00, Bundle B will use $120.00 to help pay for the restoration above and will give $0.00 to the local county government for general use. |

I vote to support (check one box below)

Bundle A                       Bundle B

| Question 17: | Bundle A | Bundle B |
|---|---|---|
| Bird Habitat Restoration | 0 increments | 1 increments |
| Clam Restoration | 2 increments | 1 increments |
| Sea grass Restoration | 1 increments | 0 increments |
| Allocation of money, if this question is chosen for implementation: | From your $120.00, Bundle A will use $96.00 to help pay for the restoration above and will give $24.00 to the local county government for general use. | From your $120.00, Bundle B will use $120.00 to help pay for the restoration above and will give $0.00 to local county government for general use. |

I vote to support (check one box below)

Bundle A                       Bundle B

FIGURE 11L

11L: Test Auction, Section II questions 16-17

STOP and Wait Here:

Please wait for the project coordinator before turning the page to Section III.

FIGURE 11M

Section III

For the questions in section III, you will choose between allocating your funds between an environmental restoration activity (or set of restoration activities) and an amount that you can keep for your household's use. In this section, however, each question will ask about your willingness to contribute part of your budget towards different increments of additional restoration of a particular type. Each individual will again be given a personal budget to allocate (or spend) in each choice-question.

Determining the Outcome:
Your choice and the choices of the other individuals in your group will determine the level of each action influencing restoration activities and ecosystem services. This means that the project coordinator will look at the decisions of the entire group to determine the how much restoration will be provided, if any. If one of these questions is randomly drawn for implementation, then the project coordinator will begin by identifying whether your group's decisions allocated enough funds to pay the costs needed to implement one increment of the restoration activity, before moving on to evaluating whether your group allocated enough funds to pay for the second increment, and so on. Depending on the decisions of all members of your group, the project coordinator will determine the highest level of restoration activities that can be achieved as the largest number of increments that can be provided from the funds your group allocated in that question.

After determining how many increments of the restoration activity can be provided, any money allocated by you and the members of your group that is *in excess of the pre-determined* cost to implement the restoration *will be rebated* to you and your group members. Your rebate will be in proportion to the excess of funds allocated by the group. For example, if the project coordinator determines that your group provided enough funds for 4 increments and your group allocated X% more money than was actually needed to implement 4 increments of restoration, then we will rebate X% of your money back to you as additional funds you can take home.

Instructions:
In this section, each question will provide you with a table, like the one below. Each question provides you with a personal budget ($100 for the example below) with which to make decisions for each part (a-d) of the question. Each part (a-d) will give you a *new opportunity* to allocate some amount of funds towards a certain increment of restoration activities and the remainder for you to take home.

You will make a decision for how much money to allocate (per increment) for varying levels of the restoration activity (1, 2, 3 & 4). The table will give you the breakdown of your funds, for each increment. For example, in column (a) you will decide how much to allocate on a single increment. If you choose to pay $40 towards restoration, and enough funds are allocated from your group to provide 1 increment of restoration, you will keep (take home) $60, plus any available rebate.

In column (b) you will decide how much to allocate for two increments of restoration activities. If you again choose to pay $40 per increment, you will allocate $80 ($40 x2) for restoration activities, and if enough funds are allocated from your group to provide 2 increments of restoration, you will keep (take home) $20 plus any available rebate.

FIGURE 11N
11N: Test Auction, Section III instructions

In column (c) you will decide how much to allocated for three increments of restoration activities. In this example, your budget is $100 which prevents you from allocation $40 per unit ($40 x 3 = $120), but does allow you to allocate up to $33.33 per unit (3 x $33.33 = $100) for restoration activities, and if enough funds are allocated from your group to provide 3 increments of restoration, you will take home $0.

You can make any allocation you like in each column. The above numbers are ONLY examples.

After the research coordinator determines the largest number of increments that can be provided, in the event one of these questions is chosen for implementation, then any excess money allocated above the amount needed to implement the restoration will be rebated to you in proportion to the excess and added to your money to take home.

| Per Unit Prices ($) | (a) 1 increment | | (b) 2 increments | | (c) 3 increments | | (d) 4 increments | |
|---|---|---|---|---|---|---|---|---|
| 0 | pay | 0 keep 100 | pay | 0 keep 100 | pay | 0 keep 100 | pay | 0 keep 100 |
| 5 | pay | 5 keep 95 | pay | 10 keep 90 | pay | 15 keep 85 | pay | 20 keep 80 |
| 10 | pay | 10 keep 90 | pay | 20 keep 80 | pay | 30 keep 70 | pay | 40 keep 60 |
| 15 | pay | 15 keep 85 | pay | 30 keep 70 | pay | 45 keep 55 | pay | 60 keep 40 |
| 20 | pay | 20 keep 80 | pay | 40 keep 60 | pay | 60 keep 40 | pay | 80 keep 20 |
| 25 | pay | 25 keep 75 | pay | 50 keep 50 | pay | 75 keep 25 | pay | 100 keep 0 |
| 30 | pay | 30 keep 70 | pay | 60 keep 40 | pay | 90 keep 10 | | |
| 33.33 | pay | 33.33 keep 66.67 | pay | 66.67 keep 33.33 | pay | 100 keep 0 | | |
| 35 | pay | 35 keep 65 | pay | 70 keep 30 | | | | |
| 40 | pay | 40 keep 60 | pay | 80 keep 20 | | | | |
| 45 | pay | 45 keep 55 | pay | 90 keep 10 | | | | |
| 50 | pay | 50 keep 50 | pay | 100 keep 0 | | | | |
| 55 | pay | 55 keep 45 | | | | | | |
| 60 | pay | 60 keep 40 | | | | | | |
| 65 | pay | 65 keep 35 | | | | | | |
| 70 | pay | 70 keep 30 | | | | | | |
| 75 | pay | 75 keep 25 | | | | | | |
| 80 | pay | 80 keep 20 | | | | | | |
| 85 | pay | 85 keep 15 | | | | | | |
| 90 | pay | 90 keep 10 | | | | | | |
| 95 | pay | 95 keep 5 | | | | | | |
| 100 | pay | 100 keep 0 | | | | | | |

FIGURE 11O

For this section, you have a budget of $100 to make each decision with.

Questions 18 a-d are specifically about sea grass restoration and bird habitat restoration activities. If your group provides any increments of sea grass restoration then an increment of bird habitat restoration will also be provided. If no sea grass restoration is provided, then the increment of bird habitat will not be provided.

Please _circle_ your decisions for the allocation of your personal budget for each incremental unit of _sea grass_ restoration activities, and 1 increment of bird habitat restoration activities will also be provided if enough funds are allocated to provide at least some sea grass. You should circle one dollar value in each column, a-d.

Q.18

| Per Unit Prices ($) | (a) | 1 increment | | (b) | 2 increments | | (c) | 3 increments | | (d) | 4 increments | |
|---|---|---|---|---|---|---|---|---|---|---|---|---|
| 0 | pay | 0 | keep 100 | pay | 0 | keep 100 | pay | 0 | keep 100 | pay | 0 | keep 100 |
| 5 | pay | 5 | keep 95 | pay | 10 | keep 90 | pay | 15 | keep 85 | pay | 20 | keep 80 |
| 10 | pay | 10 | keep 90 | pay | 20 | keep 80 | pay | 30 | keep 70 | pay | 40 | keep 60 |
| 15 | pay | 15 | keep 85 | pay | 30 | keep 70 | pay | 45 | keep 55 | pay | 60 | keep 40 |
| 20 | pay | 20 | keep 80 | pay | 40 | keep 60 | pay | 60 | keep 40 | pay | 80 | keep 20 |
| 25 | pay | 25 | keep 75 | pay | 50 | keep 50 | pay | 75 | keep 25 | pay | 100 | keep 0 |
| 30 | pay | 30 | keep 70 | pay | 60 | keep 40 | pay | 90 | keep 10 | | | |
| 33.33 | pay | 33.33 | keep 66.67 | pay | 66.67 | keep 33.33 | pay | 100 | keep 0 | | | |
| 35 | pay | 35 | keep 65 | pay | 70 | keep 30 | | | | | | |
| 40 | pay | 40 | keep 60 | pay | 80 | keep 20 | | | | | | |
| 45 | pay | 45 | keep 55 | pay | 90 | keep 10 | | | | | | |
| 50 | pay | 50 | keep 50 | pay | 100 | keep 0 | | | | | | |
| 55 | pay | 55 | keep 45 | | | | | | | | | |
| 60 | pay | 60 | keep 40 | | | | | | | | | |
| 65 | pay | 65 | keep 35 | | | | | | | | | |
| 70 | pay | 70 | keep 30 | | | | | | | | | |
| 75 | pay | 75 | keep 25 | | | | | | | | | |
| 80 | pay | 80 | keep 20 | | | | | | | | | |
| 85 | pay | 85 | keep 15 | | | | | | | | | |
| 90 | pay | 90 | keep 10 | | | | | | | | | |
| 95 | pay | 95 | keep 5 | | | | | | | | | |
| 100 | pay | 100 | keep 0 | | | | | | | | | |

FIGURE 11P

Questions 19 a-d are specifically about clam restoration and sea grass restoration activities. If your group provides any increments of clam restoration then an increment of sea grass restoration will also be provided. If no clam restoration is provided, then the increment of sea grass will not be provided.
Please *circle* your decisions for the allocation of your personal budget for each incremental unit of *clam* restoration activities, and 1 increment of sea grass restoration activities will also be provided if enough funds are allocated to provide at least some clams. You should circle one dollar value in each column, a-d.

Q.19

| Per Unit Prices ($) | (a) 1 increment | | | (b) 2 increments | | | (c) 3 increments | | | (d) 4 increments | | |
|---|---|---|---|---|---|---|---|---|---|---|---|---|
| 0 | pay | 0 | keep 100 | pay | 0 | keep 100 | pay | 0 | keep 100 | pay | 0 | keep 100 |
| 5 | pay | 5 | keep 95 | pay | 10 | keep 90 | pay | 15 | keep 85 | pay | 20 | keep 80 |
| 10 | pay | 10 | keep 90 | pay | 20 | keep 80 | pay | 30 | keep 70 | pay | 40 | keep 60 |
| 15 | pay | 15 | keep 85 | pay | 30 | keep 70 | pay | 45 | keep 55 | pay | 60 | keep 40 |
| 20 | pay | 20 | keep 80 | pay | 40 | keep 60 | pay | 60 | keep 40 | pay | 80 | keep 20 |
| 25 | pay | 25 | keep 75 | pay | 50 | keep 50 | pay | 75 | keep 25 | pay | 100 | keep 0 |
| 30 | pay | 30 | keep 70 | pay | 60 | keep 40 | pay | 90 | keep 10 | | | |
| 33.33 | pay | 33.33 | keep 66.67 | pay | 66.67 | keep 33.33 | pay | 100 | keep 0 | | | |
| 35 | pay | 35 | keep 65 | pay | 70 | keep 30 | | | | | | |
| 40 | pay | 40 | keep 60 | pay | 80 | keep 20 | | | | | | |
| 45 | pay | 45 | keep 55 | pay | 90 | keep 10 | | | | | | |
| 50 | pay | 50 | keep 50 | pay | 100 | keep 0 | | | | | | |
| 55 | pay | 55 | keep 45 | | | | | | | | | |
| 60 | pay | 60 | keep 40 | | | | | | | | | |
| 65 | pay | 65 | keep 35 | | | | | | | | | |
| 70 | pay | 70 | keep 30 | | | | | | | | | |
| 75 | pay | 75 | keep 25 | | | | | | | | | |
| 80 | pay | 80 | keep 20 | | | | | | | | | |
| 85 | pay | 85 | keep 15 | | | | | | | | | |
| 90 | pay | 90 | keep 10 | | | | | | | | | |
| 95 | pay | 95 | keep 5 | | | | | | | | | |
| 100 | pay | 100 | keep 0 | | | | | | | | | |

FIGURE 11Q

Questions 20 a-d are specifically about bird habitat restoration and sea grass restoration activities. If your group provides any increments of bird habitat restoration then an increment of sea grass restoration will also be provided. If no bird habitat restoration is provided, then the increment of sea grass will not be provided.
Please <u>circle</u> your decisions for the allocation of your personal budget for each incremental unit of <i>bird habitat</i> restoration activities, and 1 increment of sea grass restoration activities will also be provided if enough funds are allocated to provide at least some clams. You should circle one dollar value in each column, a-d.

Q.20

| Per Unit Prices ($) | (a) 1 increment | | (b) 2 increments | | (c) 3 increments | | (d) 4 increments | |
|---|---|---|---|---|---|---|---|---|
| 0 | pay 0 | keep 100 | pay 0 | keep 100 | pay 0 | keep 100 | pay 0 | keep 100 |
| 5 | pay 5 | keep 95 | pay 10 | keep 90 | pay 15 | keep 85 | pay 20 | keep 80 |
| 10 | pay 10 | keep 90 | pay 20 | keep 80 | pay 30 | keep 70 | pay 40 | keep 60 |
| 15 | pay 15 | keep 85 | pay 30 | keep 70 | pay 45 | keep 55 | pay 60 | keep 40 |
| 20 | pay 20 | keep 80 | pay 40 | keep 60 | pay 60 | keep 40 | pay 80 | keep 20 |
| 25 | pay 25 | keep 75 | pay 50 | keep 50 | pay 75 | keep 25 | pay 100 | keep 0 |
| 30 | pay 30 | keep 70 | pay 60 | keep 40 | pay 90 | keep 10 | | |
| 33.33 | pay 33.33 | keep 66.67 | pay 66.67 | keep 33.33 | pay 100 | keep 0 | | |
| 35 | pay 35 | keep 65 | pay 70 | keep 30 | | | | |
| 40 | pay 40 | keep 60 | pay 80 | keep 20 | | | | |
| 45 | pay 45 | keep 55 | pay 90 | keep 10 | | | | |
| 50 | pay 50 | keep 50 | pay 100 | keep 0 | | | | |
| 55 | pay 55 | keep 45 | | | | | | |
| 60 | pay 60 | keep 40 | | | | | | |
| 65 | pay 65 | keep 35 | | | | | | |
| 70 | pay 70 | keep 30 | | | | | | |
| 75 | pay 75 | keep 25 | | | | | | |
| 80 | pay 80 | keep 20 | | | | | | |
| 85 | pay 85 | keep 15 | | | | | | |
| 90 | pay 90 | keep 10 | | | | | | |
| 95 | pay 95 | keep 5 | | | | | | |
| 100 | pay 100 | keep 0 | | | | | | |

FIGURE 11R

You have now completed the main questions for our environmental study on coastal values.

The next section is to help us understand audience characteristics, these questions are also very important to the study. Your name will not be linked to any of your answers and again, ALL information will be kept strictly confidential.

FIGURE 11S d) Statistical/Demographic

1. How clear and certain are you about how the implementation of each activity would be (1=not very certain at all; 10=completely certain). Please circle a number in each case:

Sea grass 1 2 3 4 5 6 7 8 9 10

Bird habitat 1 2 3 4 5 6 7 8 9 10

Clams for water quality 1 2 3 4 5 6 7 8 9 10

2. How much had you heard about (each restoration activity) in the VCR/ Eastern Shore area prior to tonight (1=nothing at all,, 10= quite a bit).

Sea grass 1 2 3 4 5 6 7 8 9 10

Bird habitat 1 2 3 4 5 6 7 8 9 10

Clams for water quality 1 2 3 4 5 6 7 8 9 10

3. How do you think each of the following restoration activities would benefit YOU
    a. Sea Grass _____
    b. Bird Habitat _____
    c. Clams _____

4. Please design your 'ideal bundle' of restoration activities, based on your preferences. You have a total of 6 increments that can be used. (Please fill in the numbers below)

| Bird Habitat Restoration | _____ increments |
    |---|---|
    | Clam Restoration | _____ increments |
    | Sea grass Restoration | _____ increments |
    | *TOTAL* | *6 increments* |

5. What is your gender? Male / Female (please circle one)
6. What is your age? _____
7. How long have you lived in the Eastern Shore area? _____ (please enter in years)
8. In what county is your primary residence? (please circle one)
    a. Accomack
    b. Northampton
    c. other _____
9. Do you <u>own</u> or <u>rent</u> your home? (please circle one)
10. If you own the house, is this your <u>primary residence</u>? Yes / No (please circle one)

FIGURE 11T
11T: Test Auction, Demographics 1

11. Circle the highest level of education you have completed (please circle one)
    a. high school or less,
    b. bachelor's degree or some college,
    c. graduate degree (Master's, Ph.D. etc.) or some graduate school
12. Are you currently working for income? (please circle all that apply)
    a. Full-time
    b. Part-time
    c. Unemployed
    d. Retired
13. If you are currently working for income, how many hours per month do you typically work? _____And approximately how much are you paid per hour? _____
14. Which category most closely describes your household's income before taxes? (please circle one)
    a. Under A$25,000
    b. $25,000 to under $40,000
    c. $40,000 to under $50,000
    d. $50,000 to under $75,000
    e. $75,000 to under $100,000
    f. Over $100,000

15. Do you consider yourself a: (please circle all that apply)
    a. A recreational fisherman
    b. A commercial fisherman
    c. A bird watcher
    d. A recreational hunter
16. Have you ever participated in oyster gardening activities (yes or no)? (please circle one)
17. Do you or any member of your family work for a clam grower (yes or no)? (please circle one)
18. Have you ever donated money to environmental group(s) (yes or no)? (please circle one)
19. If you answered yes to the above, how often have you donated (please circle one)
    a. Once
    b. A few times
    c. Regularly (monthly, yearly, etc)

Thank you very much for participating in our experiment. Please add any additional comments in the space below/ on the back.

FIGURE 11U

11U: Test Auction, Demographics 2

You are ID #

Your participation in this project is voluntary. You may refuse to answer any question. Your responses will be confidential and will never be associated with your name and never reported in any way that could identify you.

This page will be cut and separated here ------------------------------------------------

*RECEIPT*

Receipt for funds during the ecosystem economics experiment through LTER site:

Participation Fee           $ 40

Session outcome earnings    $ _____

Total                       $ _____

Signature: _____ Date: 19 November 2008

We are required to ask for the information below only for financial record keeping. This will NOT be used to create any type of mailing or email list.

Name (printed): _____

Address: _____

_____

Phone: _____

Email: _____

SS#: (optional) _____

FIGURE 11V
11V: Test Auction, Receipt

Introduction

This project involves the value, in economic terms, that area residents have for environmental or ecosystem restoration. You will be asked to make decisions involving the allocation of money to different sets of activities involving ecosystem restoration as well as other non-environmental benefits.

The decisions you make tonight, through answering our questionnaire, will impact local restoration. All of the questions are potentially real – all could lead to real actions for spending money for environmental restoration or other purposes, as explained in each choice-question.

You might find the questions here involve difficult or easy choices, based on your personal preferences and priorities. Your answers will be confidential and will *not* be shared in any way that identifies you. Also, we recognize that your time is valuable and we hope you view any payments you take home from this session to be well-earned. We hope that you will take enough time to think carefully about each question, relative to your personal preferences and priorities. All questions could be implemented. Your participation is important to management and policy for coastal areas.

For this session, we are able to pay a $40 participation fee, no matter which choice question below is implemented. Thus, money referred to below is *in addition* to the $40 participation fee that we will give you at the end of tonight's session.

General Instructions

1) The participants in this session are divided into two separate groups, at random. This means that not every single person in the room is in your group, but you will not be informed as to who is in your group and who is not. Your group is important because in some questions the project coordinator will look at the combined decisions of the group to determine the final outcome for a question. This will be explained more fully in the following instructions.

2) There are 3 separate sections, each with their own set of instructions and choice-questions. Please read each set of instructions carefully, and do not hesitate to raise your hand if you have questions. The instructions will give you important information about the a) allocation of funds to restoration or to other activities and b) the specific restoration activities that could be provided and c) information on how your groups' decisions impact restoration.

3) You will be asked to answer approximately 20 choice-questions today. Each of these questions has the possibility for provision, but only one question in each of the two groups of people will be implemented. Once every participant has completed the set of questions, the project coordinator will randomly choose one question for each group. Based on the choices made by you and the people in your group, the results for that question will be implemented for your group.

4) If you have any questions as we proceed through this session, please do not talk to your friends or neighbors. Rather, please raise your hand so that the project coordinator can come to you and address your question.

FIGURE 11W

11W: Test Auction, Section IV, instructions

STOP and Wait Here:

If you have questions for the project coordinator, please raise your hand now.
Please wait for the project coordinator to instruct you to turn the page for Section I.

FIGURE 11X

Section I

For the questions in Section I, you will make decisions between bundles of differing levels of restoration activities that contribute to additional ecosystem services, as well as an individual *rebate of cash* to you. In this section, each individual will be given a personal budget to allocate (or spend) in each choice-question. Please select the bundle that best represents your preferences –by voting for the option, Bundle A or Bundle B, which you would want implemented if that question is the one randomly chosen at the end of the today's session.

Determining the Outcome: The bundle that will be provided will be decided by majority vote of your group. For example, if your group has 10 people in it and 6 choose Bundle B and 4 choose Bundle A, then Bundle B will be the set of restoration activities provided and Bundle A will not be provided. All funds will be used for the restoration activity and take-home payment (either Bundle A or Bundle B) chosen by your group's majority.

EXAMPLE

For this question you have been given $80 to make a decision with

|  | Bundle A | Bundle B |
|---|---|---|
| Bird Habitat Restoration | 2 increments | 1 increments |
| Clam Restoration | 1 increments | 3 increments |
| Sea Grass Restoration | 3 increments | 0 increments |
| Allocation of money, if this question is chosen for implementation: | From your $80, Bundle A will use $60 to help pay for the restoration above and you will receive $20 to take home. | From your $80, Bundle B will use $50 to help pay for the restoration above and you will receive $30 to take home. |

I vote to support (check one box below)

Bundle A                  X Bundle B

In the example question above, if your group has 10 people and the majority of people in your group chose Bundle B, and if everyone had the same allocations of money, then $500 ($50 x10) will be used towards the provision (or cost) of Bundle B and the project leaders will implement that bundle while paying $30 to you. Bundle A will not be provided at all. If you voted for A (and the majority voted for B) then your personal budget will be paid according to B because that is what the majority chose.

Please note: The dollar amounts above are only for example. Please make your decisions based only on the information provided in the choice questions (each of which could be randomly chosen for implementation tonight).

FIGURE 11Y

11Y: Test Auction, Section I instructions

For section I, you have a budget of $90 to make each decision with.

| Question 1: | Bundle A | Bundle B |
|---|---|---|
| Bird Habitat Restoration | 3 increments | 1 increments |
| Clam Restoration | 2 increments | 0 increments |
| Sea Grass Restoration | 1 increments | 3 increments |
| Allocation of money, if this question is chosen for implementation: | From your $90.00, Bundle A will use $54.00 to help pay for the restoration above and you will receive $36.00 to take home | From your $90.00, Bundle B will use $40.50 to help pay for the restoration above and you will receive $49.50 to take home |

I vote to support (check one box below)

Bundle A                 Bundle B

| Question 2: | Bundle A | Bundle B |
|---|---|---|
| Bird Habitat Restoration | 2 increments | 1 increments |
| Clam Restoration | 0 increments | 1 increments |
| Sea Grass Restoration | 2 increments | 1 increments |
| Allocation of money, if this question is chosen for implementation: | From your $90.00, Bundle A will use $54.00 to help pay for the restoration above and you will receive $36.00 to take home. | From your $90.00, Bundle B will use $85.50 to help pay for the restoration above and you will receive $4.50 to take home. |

I vote to implement (check one box below)

Bundle A                 Bundle B

| Question 3: | Bundle A | Bundle B |
|---|---|---|
| Bird Habitat Restoration | 3 increments | 3 increments |
| Clam Restoration | 1 increments | 2 increments |
| Sea Grass Restoration | 2 increments | 3 increments |
| Allocation of money, if this question is chosen for implementation: | From your $90.00, Bundle A will use $40.50 to help pay for the restoration above and you will receive $49.50 to take home. | From your $90.00, Bundle B will use $85.50 to help pay for the restoration above and you will receive $4.50 to take home. |

I vote to support (check one box below)

Bundle A                 Bundle B

FIGURE 11Z

11Z: Test Auction, Section I, questions 1-3

| Question 4: | Bundle A | Bundle B |
|---|---|---|
| Bird Habitat Restoration | 0 increments | 1 increments |
| Clam Restoration | 3 increments | 3 increments |
| Sea Grass Restoration | 2 increments | 0 increments |
| Allocation of money, if this question is chosen for implementation: | From your $90.00, Bundle A will use $85.50 to help pay for the restoration above and you will receive a $4.50 to take home. | From your $90.00, Bundle B will use $54.00 to help pay for the restoration above and you will receive $36.00 to take home. |

I vote to support (check one box below)

Bundle A                       Bundle B

| Question 5: | Bundle A | Bundle B |
|---|---|---|
| Bird Habitat Restoration | 2 increments | 0 increments |
| Clam Restoration | 3 increments | 1 increments |
| Sea Grass Restoration | 1 increments | 3 increments |
| Allocation of money, if this question is chosen for implementation: | From your $90.00, Bundle A will use $40.50 to help pay for the restoration above and you will receive $49.50 to take home. | From your $90.00, Bundle B will use $54.00 to help pay for the restoration above and you will receive $36.00 to take home. |

I vote to support (check one box below)

Bundle A                       Bundle B

| Question 6: | Bundle A | Bundle B |
|---|---|---|
| Bird Habitat Restoration | 1 increments | 0 increments |
| Clam Restoration | 1 increments | 2 increments |
| Sea Grass Restoration | 1 increments | 2 increments |
| Allocation of money, if this question is chosen for implementation: | From your $90.00, Bundle A will use $85.50 to help pay for the restoration above and you will receive $4.50 to take home | From your $90.00, Bundle B will use $40.50 to help pay for the restoration above and you will receive $49.50 to take home. |

I vote to support (check one box below)

Bundle A                       Bundle B

FIGURE 11AA

11AA: Test Auction, Section I questions 4-6

| Question 7: | Bundle A | Bundle B |
|---|---|---|
| Bird Habitat Restoration | 0 increments | 2 increments |
| Clam Restoration | 0 increments | 1 increments |
| Sea Grass Restoration | 1 increments | 0 increments |
| Allocation of money, if this question is chosen for implementation: | From your $90.00, Bundle A will use $18.00 to help pay for the restoration above and you will receive $72.00 to take home. | From your $90.00, Bundle B will use $18.00 to help pay for the restoration above and you will receive $72.00 to take home. |

I vote to support (check one box below)

Bundle A                         Bundle B

| Question 8: | Bundle A | Bundle B |
|---|---|---|
| Bird Habitat Restoration | 0 increments | 1 increments |
| Clam Restoration | 1 increments | 2 increments |
| Sea Grass Restoration | 3 increments | 2 increments |
| Allocation of money, if this question is chosen for implementation: | From your $90.00, Bundle A will use $54.00 to help pay for the restoration above and you will receive $36.00 to take home. | From your $90.00, Bundle B will use $18.00 to help pay for the restoration above and you will receive $72.00 to take home. |

I vote to support (check one box below)

Bundle A                         Bundle B

| Question 9: | Bundle A | Bundle B |
|---|---|---|
| Bird Habitat Restoration | 0 increments | 0 increments |
| Clam Restoration | 0 increments | 2 increments |
| Sea Grass Restoration | 0 increments | 1 increments |
| Allocation of money, if this question is chosen for implementation: | From your $120.00, Bundle A will use $0 to help pay for the restoration above and you will receive $120.00 to take home. | From your $120.00, Bundle B will use $114.00 to help pay for the restoration above and you will receive $6.00 to take home. |

I vote to support (check one box below)

Bundle A                         Bundle B

FIGURE 11BB

11BB: Test Auction, Section I, questions 7-9

STOP and Wait Here:

Please wait for the project coordinator to instruct you before turning the page, before proceeding to section II.

FIGURE 11CC

Section II

For the questions in section II, you will again make decisions between bundles of goods comprised of differing levels of restoration activities. However, in this Section, you are allocating money between supporting restoration and contributing funds to the *local government* for the benefit of the county. In this section, each individual will again be given a personal budget to allocate (or spend) in each choice-question. Please vote to select the bundle that best represents your preferences and thus which option you want your personal budget to be used towards, Bundle A or Bundle B.

Please read the remainder of this page silently to yourself. If you have questions, please raise your hand for the project coordinator to answer your question quietly.

Determining the Outcome: The bundle that will be provided is decided by the majority vote of your group. For example, if your group has 10 people in it and 6 choose Bundle B and 4 choose Bundle A, then Bundle B will be the set of restoration activities provided and Bundle A will not be provided. All funds will be used for the restoration activities and payment to local government (either Bundle A or Bundle B) chosen by your group's majority.

Please note: Please make your decisions based only on the information provided in the choice questions (each of which could be randomly chosen for implementation tonight).

Stop!! Please wait to turn the page until instructed to do so.

FIGURE 11DD

11DD: Test Auction, Section II, instructions

For this section, you have a budget of $120 to make each decision with

| Question 10: | Bundle A | Bundle B |
|---|---|---|
| Bird Habitat Restoration | 2 increments | 1 increments |
| Clam Restoration | 3 increments | 1 increments |
| Sea grass Restoration | 2 increments | 1 increments |
| Allocation of money, if this question is chosen for implementation: | From your $120.00, Bundle A will use $72.00 to help pay for the restoration above and will give $48.00 to the local county government for general use. | From your $120.00, Bundle B will use $114.00 to help pay for the restoration above and will give $6.00 to the local county government for general use. |

I vote to support (check one box below)

Bundle A                        Bundle B

| Question 11: | Bundle A | Bundle B |
|---|---|---|
| Bird Habitat Restoration | 1 increments | 3 increments |
| Clam Restoration | 3 increments | 1 increments |
| Sea grass Restoration | 2 increments | 1 increments |
| Allocation of money, if this question is chosen for implementation: | From your $120.00, Bundle A will use $114.00 to help pay for the restoration above and will give $6.00 to the local county government for general use. | From your $120.00, Bundle B will use $54.00 to help pay for the restoration above and will give $66.00 to the local county government for general use. |

I vote to support (check one box below)

Bundle A                        Bundle B

| Question 12: | Bundle A | Bundle B |
|---|---|---|
| Bird Habitat Restoration | 0 increments | 3 increments |
| Clam Restoration | 1 increments | 0 increments |
| Sea grass Restoration | 2 increments | 0 increments |
| Allocation of money, if this question is chosen for implementation: | From your $120.00, Bundle A will use $54.00 to help pay for the restoration above and will give $66.00 to the local county government for general use. | From your $120.00, Bundle B will use $72.00 to help pay for the restoration above and will give $48.00 to the local county government for general use. |

I vote to support (check one box below)

Bundle A                        Bundle B

FIGURE 11EE

11EE: Test Auction, Section II, questions 10-12

| Question 13: | Bundle A | Bundle B |
|---|---|---|
| Bird Habitat Restoration | 1 increments | 2 increments |
| Clam Restoration | 3 increments | 0 increments |
| Sea grass Restoration | 1 increments | 2 increments |
| Allocation of money, if this question is chosen for implementation: | From your $120.00, Bundle A will use $72.00 to help pay for the restoration above and will give $48.00 to local county government for general use. | From your $120.00, Bundle B will use $54.00 to help pay for the restoration above and will give $66.00 to the local county government for general use. |

I vote to support (check one box below)

Bundle A         Bundle B

| Question 14: | Bundle A | Bundle B |
|---|---|---|
| Bird Habitat Restoration | 2 increments | 0 increments |
| Clam Restoration | 3 increments | 3 increments |
| Sea grass Restoration | 1 increments | 0 increments |
| Allocation of money, if this question is chosen for implementation: | From your $120.00, Bundle A will use $114.00 to help pay for the restoration above and will give $6.00 to the local county government for general use. | From your $120.00, Bundle B will use $24.00 to help pay for the restoration above and will give $96.00 to the local county government for general use. |

I vote to support (check one box below)

Bundle A         Bundle B

| Question 15: | Bundle A | Bundle B |
|---|---|---|
| Bird Habitat Restoration | 1 increments | 1 increments |
| Clam Restoration | 1 increments | 0 increments |
| Sea grass Restoration | 0 increments | 1 increments |
| Allocation of money, if this question is chosen for implementation: | From your $120.00, Bundle A will use $114.00 to help pay for the restoration above and will give $6.00 to the local county government for general use. | From your $120.00, Bundle B will use $54.00 to help pay for the restoration above and will give $66.00 to local county government for general use. |

I vote to support (check one box below)

Bundle A         Bundle B

FIGURE 11FF

11FF: Test Auction, Section II, question 13-15

| Question 16: | Bundle A | Bundle B |
|---|---|---|
| Bird Habitat Restoration | 3 increments | 0 increments |
| Clam Restoration | 3 increments | 0increments |
| Sea grass Restoration | 0 increments | 3 increments |
| Allocation of money, if this question is chosen for implementation: | From your $120.00, Bundle A will use $54.00 to help pay for the restoration above and will give $66.00 to the local county government for general use. | From your $120.00, Bundle B will use $72.00 to help pay for the restoration above and will give $48.00 to the local county government for general use. |

I vote to support (check one box below)

Bundle A                                           Bundle B

| Question 17: | Bundle A | Bundle B |
|---|---|---|
| Bird Habitat Restoration | 0 increments | 1 increments |
| Clam Restoration | 2 increments | 1 increments |
| Sea grass Restoration | 1 increments | 0 increments |
| Allocation of money, if this question is chosen for implementation: | From your $120.00, Bundle A will use $114.00 to help pay for the restoration above and will give $6.00 to the local county government for general use. | From your $120.00, Bundle B will use $72.00 to help pay for the restoration above and will give $48.00 to local county government for general use. |

I vote to support (check one box below)

Bundle A                                           Bundle B

FIGURE 11GG

11GG: Test Auction, Section II, questions 16-17

STOP and Wait Here:

Please wait for the project coordinator before turning the page to Section III.

FIGURE 11HH

Section III

For the questions in section III, you will choose between allocating your funds between an environmental restoration activity (or set of restoration activities) and an amount that you can keep for your household's use. In this section, however, each question will ask about your willingness to contribute part of your budget towards different increments of additional restoration of a particular type. Each individual will again be given a personal budget to allocate (or spend) in each choice-question.

Determining the Outcome:
Your choice and the choices of the other individuals in your group will determine the level of each action influencing restoration activities and ecosystem services. This means that the project coordinator will look at the decisions of the entire group to determine the how much restoration will be provided, if any. If one of these questions is randomly drawn for implementation, then the project coordinator will begin by identifying whether your group's decisions allocated enough funds to pay the costs needed to implement one increment of the restoration activity, before moving on to evaluating whether your group allocated enough funds to pay for the second increment, and so on. Depending on the decisions of all members of your group, the project coordinator will determine the highest level of restoration activities that can be achieved as the largest number of increments that can be provided from the funds your group allocated in that question.

After determining how many increments of the restoration activity can be provided, any money allocated by you and the members of your group that is *in excess of the pre-determined* cost to implement the restoration *will be rebated* to you and your group members. Your rebate will be in proportion to the excess of funds allocated by the group. For example, if the project coordinator determines that your group provided enough funds for 4 increments and your group allocated X% more money than was actually needed to implement 4 increments of restoration, then we will rebate X% of your money back to you as additional funds you can take home.

Instructions:
In this section, each question will provide you with a table, like the one below. Each question provides you with a personal budget ($100 for the example below) with which to make decisions for each part (a-d) of the question. Each part (a-d) will give you a *new opportunity* to allocate some amount of funds towards a certain increment of restoration activities and the remainder for you to take home.

You will make a decision for how much money to allocate (per increment) for varying levels of the restoration activity (1, 2, 3 & 4). The table will give you the breakdown of your funds, for each increment. For example, in column (a) you will decide how much to allocate on a single increment. If you choose to pay $40 towards restoration, and enough funds are allocated from your group to provide 1 increment of restoration, you will keep (take home) $60, plus any available rebate.

In column (b) you will decide how much to allocate for two increments of restoration activities. If you again choose to pay $40 per increment, you will allocate $80 ($40 x2) for restoration activities, and if enough funds are allocated from your group to provide 2 increments of restoration, you will keep (take home) $20 plus any available rebate.

FIGURE 11II
11II: Test Auction, Section III, instructions

In column (c) you will decide how much to allocate for three increments of restoration activities. In this example, your budget is $100 which prevents you from allocating $40 per unit ($40 x 3 = $120), but does allow you to allocate up to $33.33 per unit (3 x $33.33 = $100) for restoration activities, and if enough funds are allowed from your group to provide 3 increments of restoration, you will take home $0. You can make any allocation you like in each column. The above numbers are ONLY examples.
After the project coordinator determines the largest number of increments that can be provided, in the event one of those questions is chosen for implementation, then any excess money allocated above the amount needed to implement the restoration will be rebated to you in proportion to the excess and added to your money to take home.

EXAMPLE

| Per Unit Prices ($) | (a) 1 increment | | (b) 2 increments | | (c) 3 increments | | (d) 4 increments | |
|---|---|---|---|---|---|---|---|---|
| 0 | pay | keep 100 | pay | keep 100 | pay | keep 100 | pay | keep 100 |
| 5 | pay | keep 95 | | | | | | |
| 10 | pay | keep 90 | pay | keep 90 | | | | |
| 15 | pay | keep 85 | | | pay | keep 85 | | |
| 20 | pay | keep 80 | pay | keep 80 | | | pay | keep 80 |
| 25 | pay | keep 75 | | | | | | |
| 30 | pay | keep 70 | pay | keep 70 | pay | keep 70 | | |
| 33.33 | pay | keep 66.67 | | | | | | |
| 35 | pay | keep 65 | | | | | | |
| 40 | pay | keep 60 | pay | keep 60 | | | pay | keep 60 |
| 45 | pay | keep 55 | | | pay | keep 55 | | |
| 50 | pay | keep 50 | pay | keep 50 | | | | |
| 55 | pay | keep 45 | | | | | | |
| 60 | pay | keep 40 | pay | keep 40 | pay | keep 40 | pay | keep 40 |
| 65 | pay | keep 35 | | | | | | |
| 66.67 | | | pay | keep 33.33 | | | | |
| 70 | pay | keep 30 | pay | keep 30 | | | | |
| 75 | pay | keep 25 | | | pay | keep 25 | | |
| 80 | pay | keep 20 | pay | keep 20 | | | pay | keep 20 |
| 85 | pay | keep 15 | | | | | | |
| 90 | pay | keep 10 | pay | keep 10 | pay | keep 10 | | |
| 95 | pay | keep 5 | | | | | | |
| 100 | pay | keep 0 | pay | keep 0 | pay | keep 0 | pay | keep 0 |

FIGURE 11JJ

For this section, you have a budget of $100 to make each decision with.
Questions 18 a-d are specifically about sea grass restoration activities only.
Please *circle* your decisions for the allocation of your personal budget for each incremental unit of <u>sea grass</u> restoration activities. You should circle one dollar value in each column, a-d.

Q.18

| Per Unit Prices ($) | (a) 1 increment | | (b) 2 increments | | (c) 3 increments | | (d) 4 increments | |
|---|---|---|---|---|---|---|---|---|
| 0 | pay 0 | keep 100 | pay 0 | keep 100 | pay 0 | keep 100 | pay 0 | keep 100 |
| 5 | pay 5 | keep 95 | pay 10 | keep 90 | pay 15 | keep 85 | pay 20 | keep 80 |
| 10 | pay 10 | keep 90 | pay 20 | keep 80 | pay 30 | keep 70 | pay 40 | keep 60 |
| 15 | pay 15 | keep 85 | pay 30 | keep 70 | pay 45 | keep 55 | pay 60 | keep 40 |
| 20 | pay 20 | keep 80 | pay 40 | keep 60 | pay 60 | keep 40 | pay 80 | keep 20 |
| 25 | pay 25 | keep 75 | pay 50 | keep 50 | pay 75 | keep 25 | pay 100 | keep 0 |
| 30 | pay 30 | keep 70 | pay 60 | keep 40 | pay 90 | keep 10 | | |
| 33.33 | pay 33.33 | keep 66.67 | pay 66.67 | keep 33.33 | pay 100 | keep 0 | | |
| 35 | pay 35 | keep 65 | pay 70 | keep 30 | | | | |
| 40 | pay 40 | keep 60 | pay 80 | keep 20 | | | | |
| 45 | pay 45 | keep 55 | pay 90 | keep 10 | | | | |
| 50 | pay 50 | keep 50 | pay 100 | keep 0 | | | | |
| 55 | pay 55 | keep 45 | | | | | | |
| 60 | pay 60 | keep 40 | | | | | | |
| 65 | pay 65 | keep 35 | | | | | | |
| 70 | pay 70 | keep 30 | | | | | | |
| 75 | pay 75 | keep 25 | | | | | | |
| 80 | pay 80 | keep 20 | | | | | | |
| 85 | pay 85 | keep 15 | | | | | | |
| 90 | pay 90 | keep 10 | | | | | | |
| 95 | pay 95 | keep 5 | | | | | | |
| 100 | pay 100 | keep 0 | | | | | | |

FIGURE 11KK

Questions 19 a-d are specifically about clam restoration activities only.

Please *circle* your decisions for the allocation of your personal budget for each incremental unit of *clam* restoration activities. You should circle one dollar value in each column, a-d.

Q.12

| Per Unit Prices ($) | (a) 1 increment | | | (b) 2 increments | | | (c) 3 increments | | | (d) 4 increments | | |
|---|---|---|---|---|---|---|---|---|---|---|---|---|
| 0 | pay | 0 | keep | 100 | pay | 0 | keep | 100 | pay | 0 | keep | 100 | pay | 0 | keep | 100 |
| 5 | pay | 5 | keep | 95 | pay | 10 | keep | 90 | pay | 15 | keep | 85 | pay | 20 | keep | 80 |
| 10 | pay | 10 | keep | 90 | pay | 20 | keep | 80 | pay | 30 | keep | 70 | pay | 40 | keep | 60 |
| 15 | pay | 15 | keep | 85 | pay | 30 | keep | 70 | pay | 45 | keep | 55 | pay | 60 | keep | 40 |
| 20 | pay | 20 | keep | 80 | pay | 40 | keep | 60 | pay | 60 | keep | 40 | pay | 80 | keep | 20 |
| 25 | pay | 25 | keep | 75 | pay | 50 | keep | 50 | pay | 75 | keep | 25 | pay | 100 | keep | 0 |
| 30 | pay | 30 | keep | 70 | pay | 60 | keep | 40 | pay | 90 | keep | 10 | | | | |
| 33.33 | pay | 33.33 | keep | 66.67 | pay | 66.67 | keep | 33.33 | pay | 100 | keep | 0 | | | | |
| 35 | pay | 35 | keep | 65 | pay | 70 | keep | 30 | | | | | | | | |
| 40 | pay | 40 | keep | 60 | pay | 80 | keep | 20 | | | | | | | | |
| 45 | pay | 45 | keep | 55 | pay | 90 | keep | 10 | | | | | | | | |
| 50 | pay | 50 | keep | 50 | pay | 100 | keep | 0 | | | | | | | | |
| 55 | pay | 55 | keep | 45 | | | | | | | | | | | | |
| 60 | pay | 60 | keep | 40 | | | | | | | | | | | | |
| 65 | pay | 65 | keep | 35 | | | | | | | | | | | | |
| 70 | pay | 70 | keep | 30 | | | | | | | | | | | | |
| 75 | pay | 75 | keep | 25 | | | | | | | | | | | | |
| 80 | pay | 80 | keep | 20 | | | | | | | | | | | | |
| 85 | pay | 85 | keep | 15 | | | | | | | | | | | | |
| 90 | pay | 90 | keep | 10 | | | | | | | | | | | | |
| 95 | pay | 95 | keep | 5 | | | | | | | | | | | | |
| 100 | pay | 100 | keep | 0 | | | | | | | | | | | | |

FIGURE 11LL

Questions 20 a-d are specifically about bird restoration activities.

Please <u>circle</u> your decisions for the allocation of your personal budget for each incremental unit of <u>bird habitat</u> restoration activities. You should circle 1 dollar value in each column, a-d.

Q.20

| Per Unit Prices ($) | (a) 1 increment | | (b) 2 increments | | (c) 3 increments | | (d) 4 increments | |
|---|---|---|---|---|---|---|---|---|
| 0 | pay 0 | keep 100 | pay 0 | keep 100 | pay 0 | keep 100 | pay 0 | keep 100 |
| 5 | pay 5 | keep 95 | pay 10 | keep 90 | pay 15 | keep 85 | pay 20 | keep 80 |
| 10 | pay 10 | keep 90 | pay 20 | keep 80 | pay 30 | keep 70 | pay 40 | keep 60 |
| 15 | pay 15 | keep 85 | pay 30 | keep 70 | pay 45 | keep 55 | pay 60 | keep 40 |
| 20 | pay 20 | keep 80 | pay 40 | keep 60 | pay 60 | keep 40 | pay 80 | keep 20 |
| 25 | pay 25 | keep 75 | pay 50 | keep 50 | pay 75 | keep 25 | pay 100 | keep 0 |
| 30 | pay 30 | keep 70 | pay 60 | keep 40 | pay 90 | keep 10 | | |
| 33.33 | pay 33.33 | keep 66.67 | pay 66.67 | keep 33.33 | pay 100 | keep 0 | | |
| 35 | pay 35 | keep 65 | pay 70 | keep 30 | | | | |
| 40 | pay 40 | keep 60 | pay 80 | keep 20 | | | | |
| 45 | pay 45 | keep 55 | pay 90 | keep 10 | | | | |
| 50 | pay 50 | keep 50 | pay 100 | keep 0 | | | | |
| 55 | pay 55 | keep 45 | | | | | | |
| 60 | pay 60 | keep 40 | | | | | | |
| 65 | pay 65 | keep 35 | | | | | | |
| 70 | pay 70 | keep 30 | | | | | | |
| 75 | pay 75 | keep 25 | | | | | | |
| 80 | pay 80 | keep 20 | | | | | | |
| 85 | pay 85 | keep 15 | | | | | | |
| 90 | pay 90 | keep 10 | | | | | | |
| 95 | pay 95 | keep 5 | | | | | | |
| 100 | pay 100 | keep 0 | | | | | | |

FIGURE 11MM

You have now completed the main questions for our environmental study on coastal values.

The next section is to help us understand audience characteristics, these questions are also very important to the study. Your name will not be linked to any of your answers and again, ALL information will be kept strictly confidential.

FIGURE 11NN d) Statistical/Demographic

1. How clear and certain are you about how the implementation of each activity would be (1=not very certain at all; 10=completely certain). Please circle a number in each case:

Sea grass 1 2 3 4 5 6 7 8 9 10

Bird habitat 1 2 3 4 5 6 7 8 9 10

Clams for water quality 1 2 3 4 5 6 7 8 9 10

2. How much had you heard about (each restoration activity) in the VCR/ Eastern Shore area prior to tonight (1=nothing at all,, 10= quite a bit).

Sea grass 1 2 3 4 5 6 7 8 9 10

Bird habitat 1 2 3 4 5 6 7 8 9 10

Clams for water quality 1 2 3 4 5 6 7 8 9 10

3. How do you think each of the following restoration activities would benefit YOU
   a. Sea Grass _____
   b. Bird Habitat _____
   c. Clams _____

4. Please design your 'ideal bundle' of restoration activities, based on your preferences. You have a total of 6 increments that can be used. (Please fill in the numbers below)

| Bird Habitat Restoration | _____ increments |
   |---|---|
   | Clam Restoration | _____ increments |
   | Sea grass Restoration | _____ increments |
   | *TOTAL* | *6     increments* |

5. What is your gender? Male / Female (please circle one)
6. What is your age? _____
7. How long have you lived in the Eastern Shore area? _____ (please enter in years)
8. In what county is your primary residence? (please circle one)
   a. Accomack
   b. Northampton
   c. other _____
9. Do you own or rent your home? (please circle one)
10. If you own the house, is this your primary residence? Yes / No (please circle one)

FIGURE 11OO

11OO: Test Auction, Demographics 1

11. Circle the highest level of education you have completed (please circle one)
    a. high school or less,
    b. bachelor's degree or some college,
    c. graduate degree (Master's, Ph.D. etc.) or some graduate school
12. Are you currently working for income? (please circle all that apply)
    a. Full-time
    b. Part-time
    c. Unemployed
    d. Retired
13. If you are currently working for income, how many hours per month do you typically work? _____ And approximately how much are you paid per hour? _____
14. Which category most closely describes your household's income before taxes? (please circle one)
    a. Under A$25,000
    b. $25,000 to under $40,000
    c. $40,000 to under $50,000
    d. $50,000 to under $75,000
    e. $75,000 to under $100,000
    f. Over $100,000

15. Do you consider yourself a: (please circle all that apply)
    a. A recreational fisherman
    b. A commercial fisherman
    c. A bird watcher
    d. A recreational hunter
16. Have you ever participated in oyster gardening activities (yes or no)? (please circle one)
17. Do you or any member of your family work for a clam grower (yes or no)? (please circle one)
18. Have you ever donated money to environmental group(s) (yes or no)? (please circle one)
19. If you answered yes to the above, how often have you donated (please circle one)
    a. Once
    b. A few times
    c. Regularly (monthly, yearly, etc)

Thank you very much for participating in our experiment. Please add any additional comments in the space below/ on the back.

FIGURE 11PP

11PP: Test Auction, Demographics 2

REVENUE RAISING AUCTION PROCESSES FOR PUBLIC GOODS

RELATED APPLICATIONS

This application is based upon provisional patent application No. 61/120,573 filed Dec. 8, 2008, which application is incorporated by reference herein. Applicants the benefit of that provisional application under 35 U.S.C. §119(e) therefrom.

STATEMENT OF FEDERALLY SPONSORED RESEARCH/DEVELOPMENT

The application is based upon research sponsored by the National Science Foundation through subcontracts from the University of Virginia to University of Rhode Island project #1612/1970 involving the Long Term Ecological Research site at the Virginia Coastal Reserve, entitled "Ecosystem Services and Local Coastal Restoration", principal investigator Co-Applicant Stephen K. Swallow herein. This application is also based upon research sponsored by the Rhode Island Agricultural Experiment Station at the University of Rhode Island, principal investigator Co-Applicant Stephen K. Swallow herein.

FIELD OF THE INVENTION

The present invention relates to using auction processes to raise revenue for advancement of public goods ordinarily not having the ability to raise revenues for fostering and developing the public goods. This invention involves providing a process by which individuals can generate revenue for providing public goods that historically have not been possible to produce through private enterprise.

BACKGROUND OF THE INVENTION

Public goods provide benefits to many people all at the same time, regardless of whether the person(s) benefiting has (have) contributed to pay for the cost of provision. Examples include, but are not limited to, the aesthetic value of biodiversity such as birds for bird watchers, the benefits of pollution control to improve air or water quality or reduce carbon emissions, value of open space view-sheds, the restoration of wetlands for aesthetic value, or the broader, public good benefits of education programs. In contrast, private goods are familiar products that individuals buy and use where the buyer is the only person to benefit from one unit of consumption and the seller is able to control who can benefit from the good. Private goods are common, for example, in grocery stores. For private goods, the individual pays a price closely related to their personal evaluation of the benefits of ownership and consumption and competitive markets balance the price with the cost of delivery, allowing producers to profit; this private-good market process leads to everyone paying the same price (economists' law of one price). In contrast, even if individuals voluntarily pay to provide public goods, because many other people might attempt to 'free ride' on the payments of other people, the producer is typically unable to capture revenues reflecting as much benefit as the public good generates; in fact, since everybody has the opportunity to free-ride, markets typically do not develop for public goods. The process presented here addresses the chronic problem that private enterprise generally can not produce public goods, or cannot produce them at a level that provides the most benefits to society, because producers most often are unable to recover the costs of their production from many (or any) of the beneficiaries.

Around 1920, Swedish economist E. Lindahl noted that economically efficient provision of public goods could be accomplished if individuals would state the value (their willingness to pay) for additional delivery of units of a public good. For example, if an individual values living in a rural community in which farms support grassland nesting birds, that individual might be willing to pay a farmer to add one more ten-acre hayfields to a management plan that protects grassland habitats during the bird's nesting season. In Lindahl's system, each person (each beneficiary) would name their own price to add one more hayfield to the management plan; the farmer would presumably collect these individualized "Lindahl prices" and balance the sum of these payments against the additional costs of managing his or her farm to protect the last hayfield he feels able to maintain for nesting birds.

In Lindahl's theory, then, the providers of public goods (farmers in this example) continue adding units of the public good (additional 10-acre hayfields) until the sum of individualized prices from the community of beneficiaries (people who value the protection of nesting birds in their rural town) just balances against the additional costs to farmers managing (providing) a marginal unit of the public good (a 10-acre hayfield for nesting birds). The farmer's costs include the opportunity costs reflecting a farmer's opportunity to earn a living by providing some other crop.

From the 1920's until the present, economists have held the consensus that there is no approach by which an entrepreneur can get individuals in a community to state their individual, Lindahl-price or willingness to pay for units of a public good; economists have considered the incentives for each individual to "free ride" by waiting for someone else to pay, to be sufficient to block any practical approach. The business process offered here directly establishes a practical approach to elicit these willingness to pay statements from individuals, thereby enabling an entrepreneur or broker to establish individualized prices. While the process does not guarantee the removal of all free-riding incentives, it substantially alters the incentives so that the advantages of a free-riding strategy are reduced, and the entrepreneur is able to generate revenue based on individualized prices that total up to revenues sufficient to cover the costs of providing a public good. In particular, the process allows an entrepreneur or broker to establish a market through which the individualized pricing-process can determine the number of units of the public good that will ultimately be provided; the process goes beyond "one unit, one payment."

The business process applies to many public goods. For example, the farmer's management of a hayfield for birds could also produce carbon sequestration benefits as newly planted grasslands develop a deep root-zone. Local residents who are concerned about climate change might value making their own local contribution to carbon sequestration. In addition, this root-zone may better capture nitrogen or other nutrients that otherwise enter a local water supply affecting water quality for human uses including local recreation. These carbon or water quality impacts might establish higher values received by the community by changing farm practices, and individuals would include these considerations in their statement of willingness to pay.

(Walter Nicholson's (2005) textbook, *Microeconomic Theory: Basic Principles and Extensions*, $9^{th}$ edition, (pages 601-603) summarizes the theoretical principles of E. Lindahl's theoretical suggestions from 1920. However, Nicholson states "Unfortunately, Lindahl's solution is only a conceptual one . . . [as] it is difficult to envision how the information necessary to compute equilibrium Lindahl shares [i.e., prices] might be computed" (p. 602). Lindahl's suggestion assumes reliance on the coercive or taxation power of governments along with a method to elicit truthful valuation from individuals. The process offered here establishes a process to elicit valuations which are more likely to approximate truthful revelations through private enterprise (without government authority). Even with government authority, economists find truthful revelation of value for public goods to be controversial at best, and the authors of the process described here are not aware of any alternatives that compose a practical solution while also generating revenues or actual monetary payments in a manner to achieve the vision proposed by Lindahl in 1920.)

For the purpose of definitions, the following glossary defines conventional economic terms associated with the present invention.

"Public good" is a good or service that provides benefits to many people simultaneously, regardless of whether the individuals who benefit actually pay (under normal circumstances) for the units or "supply" of the public good that exists. Public goods have a nature that prevents those who voluntarily provide the good from requiring payment from beneficiaries through ordinary market transactions (a public good is "non-excludable" meaning providers cannot exclude beneficiaries who did not pay toward the costs of provision). Examples are the aesthetic benefits of wildlife or scenic views, air quality shared by everyone, National Public Radio (benefiting donor-listeners and non-donor-listeners). In contrast a "private good" is one for which a single unit of the good only benefits the single consumer who uses that unit. Examples of private goods are most items sold in grocery stores: the consumer of a glass of milk is the only beneficiary of the nutritional value of that glass of milk. Thus a private good has a nature that enables the provider of the good to exclude those would-be-beneficiaries who have not paid for the cost of provision.

"Induced value experiment" is a method of controlled experimentation used by economists (and pioneered by Vernon Smith, 2002 Nobel Prize in Economics) to test the effects of incentives on choice and behavior. For public goods research, the method simulates the way in which individuals benefit by a public good through a set of monetary payments to individuals that everyone in a group receives if a certain "project" is successfully implemented. The project might be creation of an investment fund that individuals contribute to; if the fund reaches a certain level (a provision point), then everyone in the group (including non-contributors) receives a monetary payoff based on the payoff schedule the researcher has assigned to that individual; the payoff assigned to the individual is that person's "induced value" for a unit or level of the "project."

"Treatment"—can refer to a collection of incentives established for a set of decisions by individuals participating in an economics experiment. Some treatments are operation versions of the process proposed for patenting and some treatments have value as a basis for comparison, against which performance of the new business process might be measured.

A "Free rider" is any person who has a positive value for a public good project (e.g., protecting bird habitat or sequestering carbon or a program on National Public Radio), where this positive value is reflected in a willingness to pay for the good, but the free rider does not actually pay (or at least does not pay his or her full marginal value) and yet the free rider still receives benefits from the project. For the purposes of this application, "free rider" or "free riding behavior" is meant to include the choice by some individuals to pay or offer to pay (or make a bid to pay) an amount that is less than 100% of their full "willingness to pay" for the good; some economists call this behavior "cheap riding."

A "Marginal offer" is an offer to pay made by an individual in the auction process, where this offer is to pay a certain amount of money for a particular unit or increment in the public good (e.g., an offer to pay for the $5^{th}$ hayfield for bird habitat) while knowing that this offer will be used to determine actual payments for all units of the public good, up to that particular unit, according to the rules of the business process.

"Level of units" or "level of provision" is referring to the number of increments of the public good that are under consideration or might be provided. For example, protecting two 10-acre hayfields for nesting birds is one level, while protecting four 10-acre hayfields is another level.

"Willingness to pay" is an economic concept for measuring the benefits or value that an item or action has. The maximum willingness to pay is the highest amount of money that an individual would voluntarily pay to see some action occur or be delivered (e.g., provision of an increment to the public good, like establishing an enforceable contract with a farmer to manage one 10-acre field for nesting birds) rather than doing without that action (e.g., rather than having the farm proceed with business as usual, involving no special consideration of nesting birds).

"Auction" is a process by which individuals make offers to purchase a good or service and an auctioneer, market-maker, or broker applies previously stated rules to determine whether the good is provided and how much individuals who make offers actually have to pay. In the new business process, many people are making offers to purchase the same good; this is essential to the public good problem because payments from many people need to be aggregated to cover the cost of providing each unit of the good. (If one individual has personal values that imply a personal willingness to pay that exceeds the cost of providing a unit of the good, then the public good "problem" would typically be trivial since such individuals might act alone.)

"Marginal unit" is the last unit provided at the end of the auction if the auction is complete. A unit is an increment to the public good being provided (e.g., one 10-acre field for grassland bird habitat could be the unit that is required in order to increase the availability of meaningful bird habitat). If the auction process is still unfolding, then the marginal unit is the one under consideration with respect to the offers being solicited from bidders by the broker/auctioneer or market-maker.

"Infra-marginal units" refers to all units or increments to the public good that are provided prior to the marginal unit. For example, if the marginal unit is the $6^{th}$ 10-acre field of bird habitat, then the infra-marginal units are fields numbered 1 through 5.

"Provision point" refers to the minimum cost that must be covered in order to provide one or more units of the public good. For example, the provision point would be the amount of money necessary to pay for a contract with a farmer who agrees to alter his farm operations in order to manage a 10-acre hayfield for grassland birds, plus other transaction fees, advertising expenses, costs to monitor the field and assure compliance with the contract, or similar costs.

Clock auction—is an auction process in which a posted clock indicates a deadline for final bids and final decisions. In this case, bidders might be able to revise their bids (according to pre-announced rules) as the time for bidding nears an end.

OBJECTS OF THE INVENTION

It is an object of the present invention to provide a pricing and auction process which allows private enterprise firms to establish an individual price for each consumer paying in to support delivery of the same units of a public good.

SUMMARY OF THE INVENTION

In keeping with these objects and others which may become apparent, the present invention is a process which solicits bids from individuals who value a public good, while reducing each individual's incentives to free ride, thereby increasing their incentives to bid or offer a payment that approaches their full value for each, successive unit of the good. Examples include farmers selling the services of land for wildlife habitat, farmers altering production processes to reduce pesticides and nutrients and increase local water quality (particularly during transition from technologically intensive farming to organic farming), or businesses established to help neighborhoods and communities become carbon neutral in a global economy. The process benefits profit or non-profit organizations supporting conservation such as wetland and salt marsh restoration or restoration of endangered species habitat.

Applicants' system controls a method of selling multiple units of one or more public goods to a community of beneficiaries. The auction process determines individualized prices that enable raising of revenues to cover costs of provision, including normal return to business. The individualized prices are analogous to in a Lindahl framework, but the process may not eliminate all free-riding incentives; by altering incentives for marginal bids, the process reduces incentives to free ride at the margin and thereby encourages higher bids that approach the individual bidder's full value; by altering (reducing) incentives to free-ride at the margin, the process comprises a practical method to elicit higher bids from beneficiaries of a public good. By establishing a contract right to deliver a public good to a community of beneficiaries, the broker or auctioneer can establish an ability to control delivery of the public good. By this auction process, the broker is in a unique position to deliver the public good. Public goods may include environmentally related goods, cultural goods (such as parks or arts), or any good that benefits numerous people simultaneously. The auction process comprises a platform through which to enhance the delivery (increase the quantity) of public goods provided through private (non-governmental) action or private action in conjunction with government programs. The platform of the auction enhances the delivery and increases the quantity of the public goods provided through at least one action of the following:

a) private, non-profit, non-governmental action,
b) private, for profit, non-governmental action,
c) private non-profit action in conjunction with government action,
d) private for profit action in conjunction with government action, or,
e) combinations thereof.

Process:

The proposed auction process reduces the incentives to free-ride and increases the link between providing payment and getting benefits for public goods. The process enables producers to capture consumer benefits by incentivizing individuals to name and pay a price based on their own perceptions of their own benefits. Essentially, the process creates incentives that reduce the advantage of free-riding, so that individuals are more likely to "name their own price" at a monetary amount that is closer to or approximates their full, maximum willingness to pay. Resulting prices may be different for each individual. For public goods, it is the sum of the prices paid by each individual that the process can balance against the cost of delivery. In standard economic theory, the process described is intended to implement "Lindahl prices" for public goods.

The new business process sets out to establish unique prices that private firms can use to generate revenues, but does so using marginal incentives that Lindahl did not anticipate and that the economic literature has overlooked for cases involving provision of multiple units of the public good. There are several components. First, the firm must establish franchise rights to deliver the public good to a defined population or community of beneficiaries. This community could be the non-farm residents of a rural community in which a few farms remain and could provide a public good such as grassland bird habitat and its aesthetic scenery along with water quality or carbon sequestration benefits. Or it could be an association of homeowners around a freshwater lake, many of whom wish to manage invasive water plants to reduce nuisances for swimmers or boaters, while maintain habitat for recreational fish species. Second, the firm must solicit individual bids to offer a per unit price for delivery of the public good. The consumer-bidders are asked to make their offers conditional on the number of units delivered, with the understanding that they may offer a relatively higher per-unit price for delivery of one or a few units and a lower price for delivery of many units. The firms' franchise rights enable the firm to withhold production and establish the ability to prevent delivery without sufficient payment from the consumer-bidders. In effect the firm is establishing a production target and asking people to buy in, at or above this target, by naming their own price per unit for the actual number of units that are ultimately delivered. Lindahl's framework would have asked for individual prices, but assumed the power of government and overlooked the role that franchise-rights could play.

Third, in order to reduce the incentives to free ride, the new rules of trade involve offering a proportional rebate of funds collected in excess of the cost of delivery for the production target. (Here, Applicants refer to funds collected from all individuals in the community addressed by the firm's franchise rights.) This process allows individual consumers to see that they could get a lower price at higher production levels and it returns any excess funds, above the cost of production, back to the consumers.

An alternative version of this process mitigates the incentives to free-ride by establishing the individuals' price based on the last unit provided, but this version generally uses a source of matching funds to actually pay the cost of the last unit provided. Under this alternative, the consumer may not actually pay for the last unit in most cases; this alternative approach replaces a proportional rebate rule with a rule that evaluates each person's offer on the last unit as if that person's offer could be "pivotal" by providing the last few dollars necessary for the community to pay for delivery of the last unit. This alternative is suitable for use with certain government conservation and farm programs and possibly with non-profit philanthropic organizations in association with firms acting as market-makers or brokers.

The process, as labeled "Process" described herein, is an example of a "forward" version of the auction process. In the forward version, the firm (or market-maker) asks individuals to make bids (or offers) starting from the first unit(s) to be provided and then, based on collecting bids that make it feasible to provide those units, the process moves on to ask for bids in the context of the second unit (or set of units) that could be provided. As indicated above (and illustrated in the attached PowerPoint slides titled "The Process"), the bidding rules mean that bids accepted at this stage would establish a per-unit price for units offered at this stage as well as the same per-unit price for units offered in the previous stage or stages. The process then moves on to a third unit (or set of units). The firm would analyze this series of bids in order to find the point where offers from all individuals in the community (or franchise territory) are sufficient to provide as many units as possible.

Another version could go "backward." In this case, the firm would make an educated guess of a maximum quantity of units that could be delivered. This maximum might, for one example, be based on the maximum potential production of landowners within the franchise territory, in a situation where the firm is subcontracting for delivery of individual units by these landowners. In this direction, the firm would ask participant/bidders to bid a per-unit price at maximum production, then back up to one (or a few) less units of production and make another bid at that level, and so on. The firm would then identify the largest number of units for which all bidders taken together are providing enough revenues for delivery, and the firm would calculate a proportional rebate (relative to the last unit or set of units delivered) or firm might apply the pivotal-bidder calculation (relative to the last unit or set of units delivered).

In this process, the "rebate" and "pivotal-bidder" features are drawn from existing literature in experimental economics for public goods, but these elements have not been previously combined with the Lindahl process or the franchise-rights aspect. The Lindahl process is applying the rebate or pivotal incentives to the "marginal unit" so that the incentive properties described in, for example, Marks and Croson's 1998 study (*Journal of Public Economics,* 67(2):195-220) dealing with rebates, are applicable conditional on provision of a unit at each stage. This connection to Lindahl has been absent from the literature, to the knowledge of the authors. (Isaac, McCue, and Plott (1985) ("Public-Goods Provision in an Experimental Environment." *Journal of Public Economics* 26(1):51-74) used a description of Lindahl's theory as part of the motivation for people to consider making ordinary donations in an early experimental economics study. However, nothing about the actual process for soliciting bids involved the type of process described here.)

Applicants believe the best mode for this process will involve using the Proportional Rebates or the Pivotal Mechanism (pivotal-bidder) in the rules for bidding on each unit or set of units that a firm asks bidders to consider in the Lindahl implementation process described here. These rules reduce the incentive to free ride (at the marginal unit) by rebating excess funds (rebate approach) or eliminate the incentive to free ride (conditional on delivery of infra-marginal units and the bidder's agreement to participate) by applying the pivotal bidder approach. This new, practical Lindahl-like process generates an incentive to participate because bidders can lower their per-unit price as units become deliverable and thereby accumulate net benefits on infra-marginal units. The need to fund the delivery cost of each unit (the unit's "provision point") establishes a threat of non-delivery without participation; the provision point can be defined not only based on cost of production but also to include transactions costs, like advertising, or additional criteria, like a minimum proportion of participation from the community within the franchise territory. Poe, Clark, Rondeau and Schulze (2002) ("Provision Point Mechanisms and Field Validity Tests of Contingent Valuation," *Environmental and Resource Economics* 23(1):105-131) reviewed literature on provision points in public goods experiments, but again with no link to the Lindahl process described here or to the concept of franchise rights.

Alternatives to the rebate or pivotal-bidder mechanisms might involve a class of approaches known as "extended benefits" according to the jargon of Marks and Croson (1998). Examples might include implementing rebates through a lottery process, such as examined by Spencer (2002; dissertation at University of Rhode Island; Spencer, M. A., S. K. Swallow, J. F. Shogren, and J. A. List. 2009. Rebate Rules in Threshold Public Good Provision. *Journal of Public Economics* 93(5-6):798-806), or applying excess funds to provision of a partial unit or, in an environmental application, to provision of an additional form of environmental protection; extended benefits might be done in lieu of rebates.

In addition, for applications where the firm needs a period of time to contact, solicit, and collect bids from individuals in the franchise territory, the process could be combined with a finite timeframe, such as used in clock auctions in experimental economics where bidders have a deadline to submit final bids (and the auction firm might post information at various dates before the deadline, indicating how much provision or what participation rate or other information could be anticipated as the deadline approaches). (For example, one version of the process could involve "feedback" wherein the market-maker (the auction firm) collects initial bids from all members of the interested community of bidders; these bids are then analyzed and the outcome of how many units can be provided based on the initial bids is announced; then all bidders can be given one chance to revise their bids, perhaps under the rule that revised bids on each unit must be equal to or higher than the initial bid by that individual.)

In the description above, it has been suggested that the process solicits bids from individuals based on provision of one-unit-at-a-time (or a set of units). The firm may decide, for practical reasons, to solicit bids for sets of units: for example, rather than soliciting bids for provision of wildlife habitat services on one field at a time, the firm could solicit bids in "units" of three or five fields at a time. This could facilitate the bidding task and improve participation rates within the community.

In a paper by Swallow, Smith, Uchida and Anderson (2008) (Ecosystem Services beyond Valuation, Regulation, and Philanthropy: Integrating Consumer Values into the Economy. *Choices* 23(2):47-52; an on-line publication), the point was made that provision of public goods may occur, particularly in environmental applications, based on the residual or by-product of a business operating to produce private goods. An example is that farms produce wildlife and wildlife habitat as a by-product of their normal production decisions to supply food or fiber, but without considering public values for such aesthetic goods. As in economics experiments discussed in that paper, the provision of units in the process described here is intended to apply to those units that would not be provided to the public without the actions of the firm working within the franchise territory to which Applicants' auction process would be applied in an effort to implement Lindahl prices (or prices that approximate, or are as close as possible to, each individual bidders maximum willingness to pay for the marginal unit provided at the end of the auction).

Also, Applicants note that the description provided here assumed that the firm would implement Applicants' process in a manner that maximizes the provision of units of the public good for the benefits of the community within the franchise territory. It should also be noted that firms might use their ability to control provision in a manner that maximizes profits (net revenues), with profit margins built into the "delivery cost" of units, or by finding individualized prices that balance the marginal aggregate revenue against the marginal cost of providing the last unit.

The Applicants' auction process is a pricing and auction process that allows private enterprise (firms) to establish an individual price for each consumer who is paying in to support delivery of the same units of a public good. The process solicits bids from individuals who value a public good, but does so in a manner that reduces each individual's incentives to free ride, thereby increasing their incentives to bid or offer a payment that approaches their full value for each, successive unit of the good. Examples could include, farmers selling the services of land for wildlife habitat, farmers altering production processes to reduce pesticides and nutrients and increase local water quality, particularly during transition from technologically intensive farming to organic fanning, or businesses established to help neighborhoods and communities become carbon neutral in a global economy. The process may also be of interest to profit or non-profit organizations supporting conservation such as wetland and salt marsh restoration or restoration of endangered species habitat. By creating a consumer oriented sector, the process can serve as a complement to a regulation-based approach to, for example, carbon cap-and-trade that is the focus of international negotiations, or to complement the implementation of certain government-administered land conservation programs, such as the conservation reserve program.

To test the subject matter of the present invention, Applicants have conducted tests and preliminary test data exists. Experimental Economics sessions occurred in the University of Rhode Island Policy Simulation Lab, Coastal Institute building, Kingston Campus. A preliminary experimental auction was conducted in Oyster/Cheriton, Va. on Nov. 19, 2008. Experimental economics sessions have been conducted on various dates in March-June, and September 2009. A field auction is planned in Virginia during December 2009.

Concerning patentability, Applicants kept dated notebooks and theoretical economic sketches which exist and which were independently corroborated as of Sep. 15, 2008. The subject matter of the present invention has novel and unusual features: It is likely to be 60-90% better than previous approaches to the public good problem examined in the economics literature. The process may not eliminate all "free riding" behavior by members of a community (in economic theory, it will not eliminate the free-riding strategy), but the use of the rules of trade to reduce the advantages to free riding in making offers or bids on each unit of provision stimulate higher bids that come closer to an individuals maximum willingness to pay for the marginal unit.

This process is designed to implement a long standing concept in economic theory of public goods, known as 'Lindahl Pricing'. To Applicants' knowledge this is the first and only attempt with practical prospects for success.

The present invention is an improvement or new use for existing product/process. It incorporates some elements of earlier economic approaches to the public good, but makes significant improvements to applicability.

The process is valuable to firms seeking to provide public goods and is particularly relevant as modern society attempts to integrate the benefits of the environment and ecosystems into the commercial economy.

The primary existing approaches to public goods are donations to non-profit organizations, regulation based approaches including direct regulation by government or cap-and-trade systems. Government approaches omit direct ties to the values of consumers, and can involve substantial administrative cost. Philanthropy approaches are severely limited by incentives for consumers to free ride. The Applicants' auction process could substantially enhance fund raising by non profit conservation groups, could enable private for-profit enterprise and can generate a connection between the values of individuals and government established cap-and-trade systems or environmental conservation programs.

The incentives to free ride are a long standing challenge and are subject to marketing and communications approaches that clarify the novel and unfamiliar rules of trade required by this process. Marketing and communication strategies must be developed to mitigate the potential for consumer bidders to identify and leverage strategies that maintain some of the potential benefits of free riding.

License to use this revenue-stimulating process could involve a small percentage of many thousands of gross revenue transactions by NGO's or for profit companies. This is a 'market-making process' and is not based on the sale of tangible units of any particular item. Consulting firms could use the process to create business's delivering public goods or to establish public values for inclusion in benefit-cost analysis for government or other decision-makers. Interested parties could theoretically include organizations, such as, for example, The Nature Conservancy® The Audubon Society®, groups of farmers and farm collaborators or related landowners, the United States Department of Agriculture through its farm subsidy programs or consulting firms involved in environmental valuation and natural resource damage assessment.

BRIEF DESCRIPTION OF THE DRAWINGS

The present invention can best be understood in connection with the accompanying drawings. It is noted that the invention is not limited to the precise embodiments shown in drawings, in which:

FIG. 5 is formatted to allow for either the application of the proportional rebate rule of FIG. 3 or the pivotal-bidder rule of FIG. 4 (with the choice of the rule published in the Display Introduction and Treatment C instructions).

FIG. 6 is a graph of the sum of marginal offers on each unit from all bidders in an auction of the present invention compared with marginal cost of delivering a unit of the public good; data derive from an induced value experiment FIG. 7 is a graph of the sum of marginal offers on each unit of habitat restoration in an auction of the present invention comparing to the marginal costs of delivering a defined unit of sea grass restoration, clam habitat restoration, bird habitat restoration; data derive from a field experiment with residents of coastal Virginia.

FIG. 10A is a chart of demographics overview and preliminary observations of an example of a test of the revenue raising auction process for public goods of the present invention; data derive from a field experiment with residents of coastal Virginia.

FIG. 10B shows tables of results of the test auction of FIG. 10A, where responses were accumulated for public goods related to preservation of sea grass, clams and birds and habitats related thereto.

FIGS. 11A-11PP are portions of data input questionnaires and instructions to bidders at a test of the revenue raising auction process for public goods of the present invention, where the public goods were defined as bundles of increments of purchased value relating to restoration of habitats for birds, clams and sea grass respectively.

DETAILED DESCRIPTION OF THE INVENTION

Figure 1:
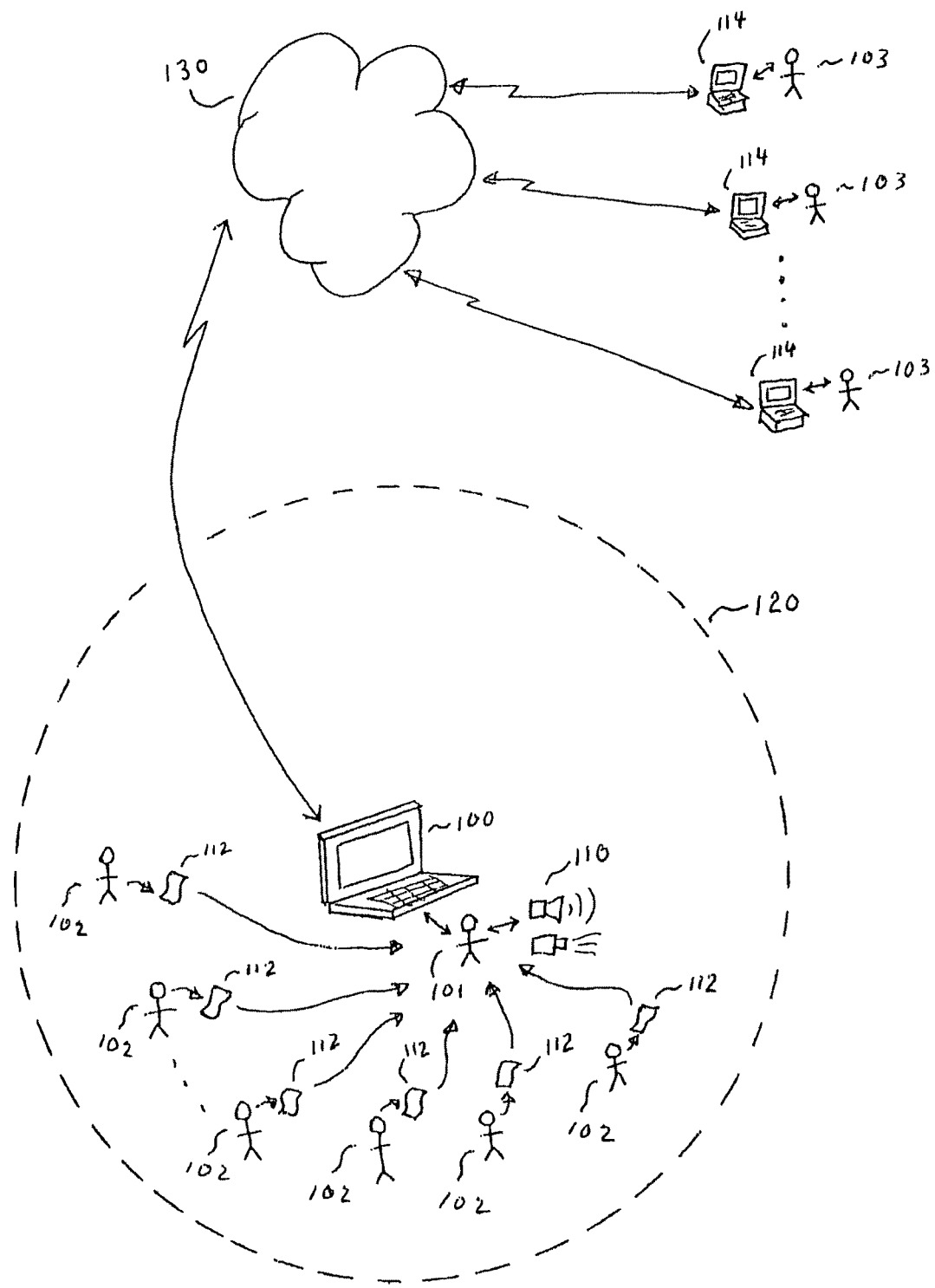
FIG. 1 is a block diagram illustrating the interaction of the broker/auctioneer with the community of beneficiaries during an auction of the revenue raising auction processes of the present invention.

FIG. 1 is a block diagram representation of an auction being held to provide public good to a community of beneficiaries. The dashed line shows a local venue 120 such as a high school classroom or Grange Hall which could serve as a locale for a physical auction involving a face-to-face meeting of beneficiaries/bidders 102 (who form a local affinity group) with a broker/auctioneer 101. This type of auction can be facilitated in a rather low-tech fashion wherein auctioneer 101 uses an audio/visual aid 110 such as an amplifier and video projector to introduce the auction and explain the rules for bidding. Bidders 102 can mark paper bid sheets 112 and submit them to auctioneer 101; alternatively even vocal bidding can be used. If the group is small enough, auctioneer 101 can enter the bids manually into the auction computer 100 in real time. Alternatively, a computer classroom can be used wherein a computer connected to the designated auction computer 100 via local network is supplied to each bidder 102. Then bidders 102 can be given instructions and can enter bids directly to the software residing in auction computer 100; auctioneer 101 would then be able to answer individual questions about bid rules or the process in general. While venue 120 is a good match for some auctions, computer auctions handled with a vast remote community of beneficiaries/bidders 103 via the internet 130 using personal computers 114 would serve affinity groups such as members of national or international non-profit environmental groups.

The revenue raising auction process for public goods reduces the incentive for individuals to free ride, on the voluntary monetary support from others, during the individual's use and enjoyment of public goods. For implementation of the auction, a computer system can implement the revenue raising auction process for public goods. The computer system includes a computer having a database for receiving and storing data. The database has data processing systems by which a firm, such as the broker/auctioneer 101 provides the raising auction. The broker/auctioneer establishes an ability to deliver by pre-signing contracts with individuals or entities capable of supplying increments of public goods to a community of beneficiaries, such as bidders 102 or 103 and to deliver the public goods to a defined population and/or community of beneficiaries. The broker/auctioneer solicits individual bids from the consumer-bidder beneficiaries, such as bidders 102 or 103, who are asked to make the bids conditional on predetermined numbers of units of the public goods to be delivered. The pre-signed contracts to supply increments of public goods include withholding delivery of the public goods without sufficient payment from any consumer-bidder beneficiaries, such as bidders 102 or 103. The broker/auctioneer also has the capacity to offer a rebate of funds The offering of a rebate of funds may be, for example, a proportionate rebate of funds in excess of cost of delivery. Alternatively, the offering of the rebate of funds may be a rebate on a marginal unit while charging the consumer-bidder beneficiaries, such as bidders 102 or 103, for infra-marginal units.

The auction can be a remote auction, where the broker/auctioneer 101 communicates with the consumer-bidder beneficiaries 102 or 103 via a browser controlling communications over a network of the computer system, which further has a server, wherein the broker/auctioneer communicates with a defined population and/or community of consumer bidders 102 or 103 through the server, wherein the broker/auctioneer 101 interacts with the computer system via the internet with corresponding computer systems having internet connections in respective locations where remote bidders 103 participate in the revenue raising auction process.

Optionally, on a local basis, the broker/auctioneer 101 communicates with the consumer-bidders 102 or 103 via an in situ intranet controlling communications over a local area network.

For small groups of locally located bidders, such as a homeowners' association of a group of farmer's meeting at a single Grange hall location which acts as a clearinghouse, the computer can communicate visual data in a power point presentation to the consumer-bidders 102 attending the revenue raising auction at the single clearinghouse location.

The broker/auctioneer can also use the computer to communicate via a server over the internet with respective personal digital assistant (PDA's) or laptop/notebook computer electronic devices of the consumer-bidders 102 or 103.

Figure 1A:
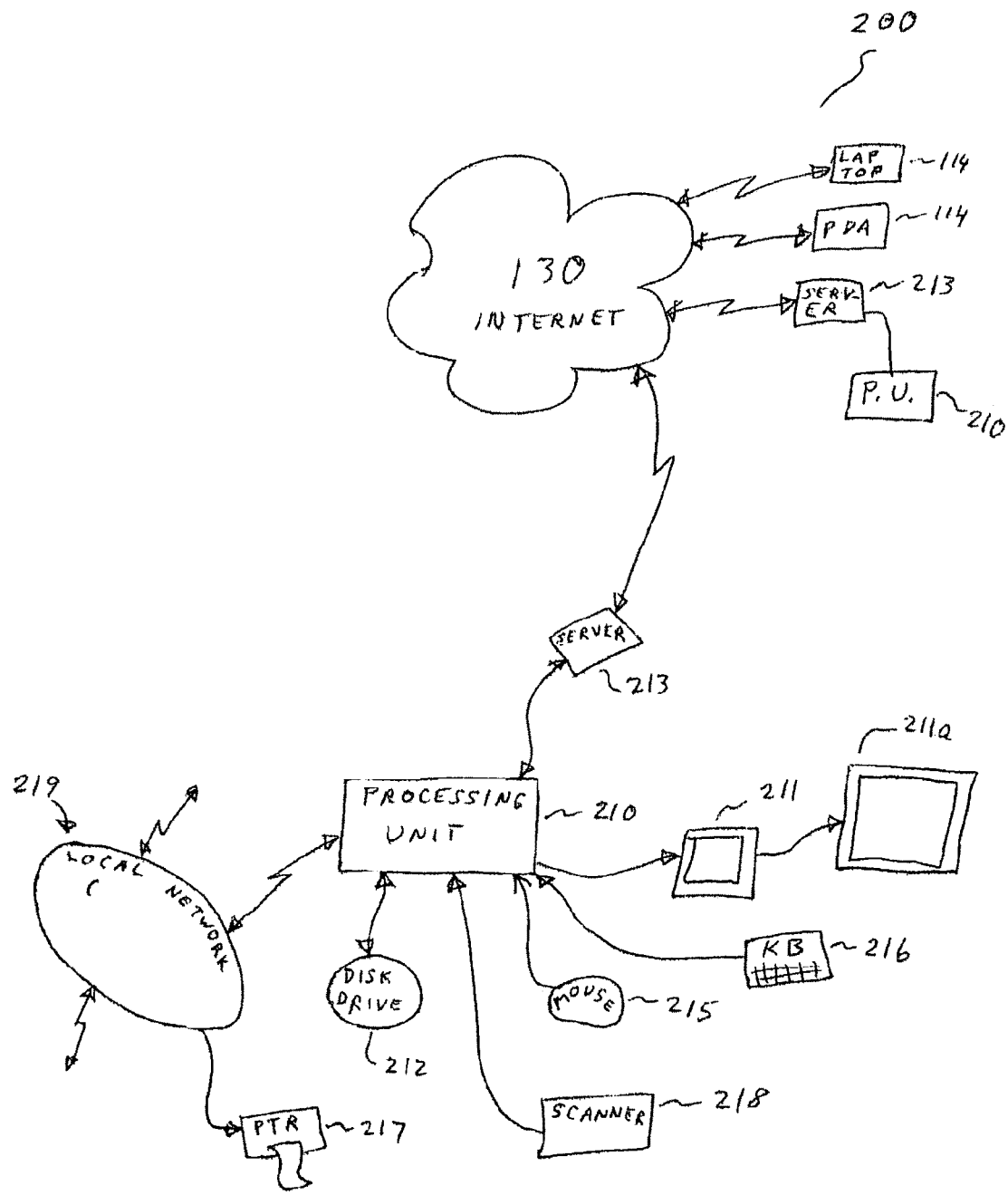
FIG. 1A is a computer system, within which an application program may be provided, to carry out the functional operation of the revenue raising auction processes of the present invention.

A computer-based system 200 is depicted in FIG. 1A herein, by which the inventive method or application program implemented by the revenue raising auction processes for public goods may be carried out. The broker/auctioneer 101 operates an auction with computer-based system 200, which includes a processing unit 210, such as a central processing unit (CPU) or microprocessor, which houses a processor, memory and other systems components (not shown expressly in the drawing figure) that implement a general purpose processing system, or a computer that may execute a computer program product. The computer program product may comprise media, for example a compact storage medium such as a compact disc, which may be read by the processing unit 210 through a disc drive 212, or by any means known to the skilled artisan for providing the computer program product to the general purpose processing system for use in the auction thereby.

The computer program product comprises all the respective features enabling the implementation of the inventive method for the revenue raising auction processes for public goods described herein, and which—when loaded in a computer system with a CPU/microprocessor—is able to carry out the auction process and method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product for the auction processes may be stored on hard disk drives within processing unit 210, as mentioned, or may be located on a remote system such as a server 213 communicating through the internet 130 with other remote processing units 210 or internet-capable portable electronic devices 114 of bidders 102 or 103, such as laptops, notebook computers and handheld electronic devices, such as a Blackberry®, coupled to processing unit 210, via a network interface such as an Ethernet interface 219. Monitor 211, mouse 215 and keyboard 216 are coupled to the processing unit 210, to provide user interaction for the auction. Monitor 211 may also be used with a large screen 211a or remote screen for PowerPoint® presentations educating the bidders 102 or 103 prior to and during the auction. Scanner 218 and printer 217 are provided for document input and output associated with the auction. Printer 217 is shown coupled to the processing unit 210 via a network connection 219, but may be coupled directly to the processing unit. Scanner 218 is shown coupled to the processing unit 210 directly, but it should be understood that peripherals might be network coupled, or direct coupled without affecting the ability of the processing unit 210 to perform the auction processes and method of the invention.

Figure 2:
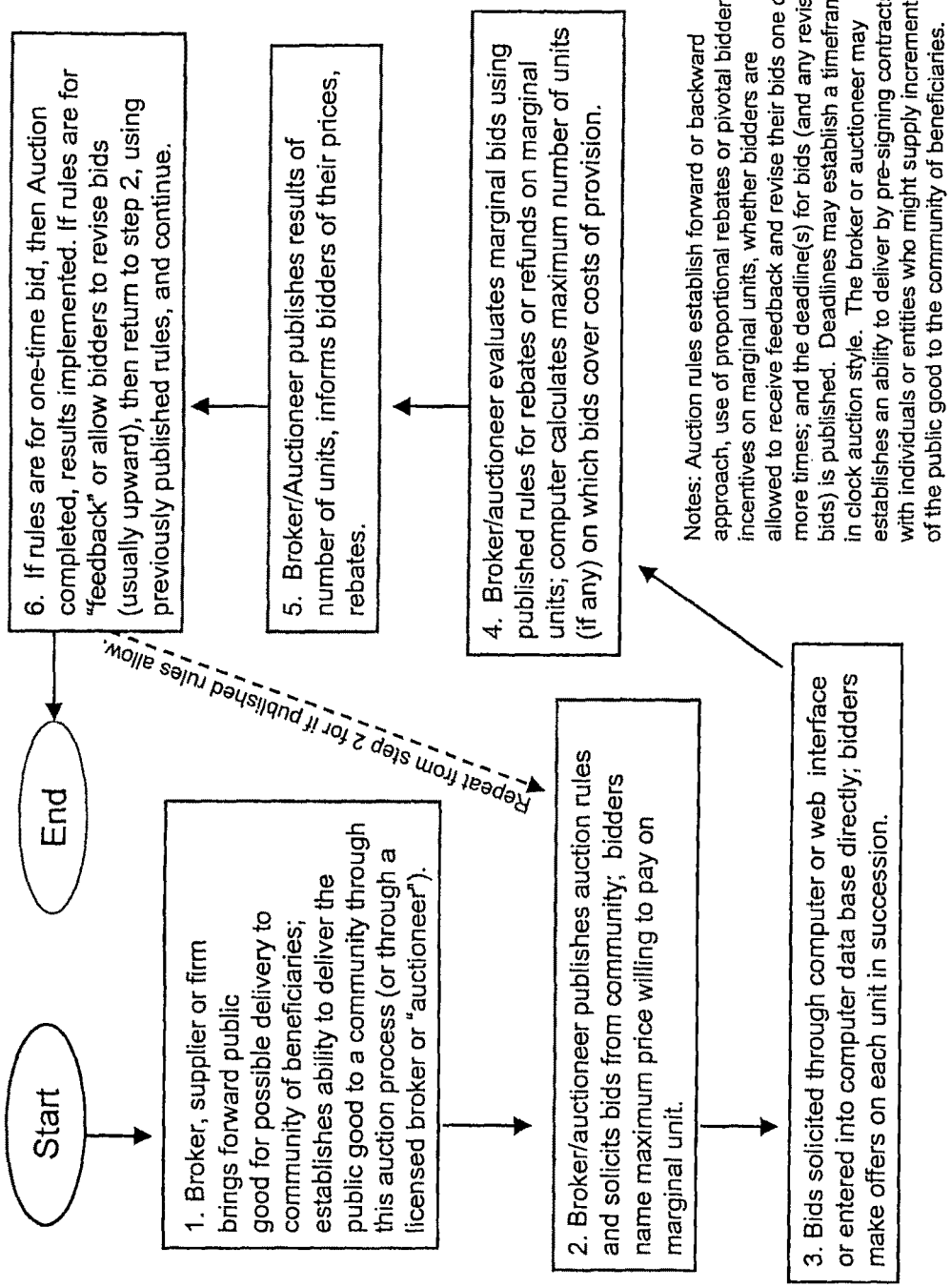
FIG. 2 is a flow chart of a condensed schematic flow chart of the auction process, allowing for different implementations of the auction to employ different marginal incentives to reduce free-riding behavior by bidders on each marginal unit.

FIG. 2 shows a condensed schematic flow chart of the auction process, allowing for different implementations of the auction to employ different marginal incentives to reduce free-riding behavior by bidders on each marginal unit. Box 1 indicates that the broker/auctioneer first establishes an ability to deliver incremental increases in the quantity or level of a public good to the community of beneficiaries; this may be done by either being the sole potential firm that could supply the public good or by signing option contracts with individuals or firms (e.g. landowners) who may be in a position to contribute increments or units of the public good and who agree to let the broker/auctioneer act as sales agents. In some cases, this ability to deliver may be equivalent to the broker/auctioneer establishing a franchise right or territory to operate within the locale that is relevant to a community of beneficiaries. Box 2 then indicates that the broker/auctioneer publishes auction rules and solicits bids. Publication could be through traditional media and include, but are not limited to, the internet, local area network, or Powerpoint® presentation components of FIG. 1. The rules establish the timeframe in which bids will be solicited, whether bids will be solicited by the forward or backward process (described in the application), and which rules for provision will be applied to the marginal units/bids (also described in the application, concerning whether the specific auction conducted will involve proportional rebates or pivotal mechanism, with or without any opportunity to revise bids). Rules may also include, for example in a forward process, requirements or simply encouragements to consider higher bids on early (first or second) units and lower bids on successive units, and may include the requirement that revised bids must be increases over initial bids on a unit when the opportunity for revision is part of the auction's implementation. Solicitations for bids may be through community meetings or internet or other marketing channels (such as direct mail marketing), with bids necessarily being compiled in a data base for analysis and calculations implementing the auction process. The publication may also provide additional information to bidders, such as information about whether the shape of the marginal cost curve for providing the public good or information about whether a major funder (such as a government program) is providing a subsidy or match fund for bidders. Box 4 then indicates that the broker/auctioneer uses the computer data base and software formulas implementing the auction rules to evaluate bids and the number of units that may be delivered relative to the revenues represented in the bids. These calculations proceed one unit at a time: for example, in the forward process the calculations begin from the first unit and if bids on that unit allow provision, the auctioneer proceeds to consider the bids on the second unit and so forth until reaching a unit for which the marginal bids fail to allow delivery. Box 5 indicates that the broker/auctioneer then publishes the results for the number of units that could be provided with the available bids, with a private message sent to each bidder concerning the marginal price charged to that bidder (based on bids for the last unit provided and the incentive rules published). This marginal price is then used to generate the overall bill or "amount due" from each bidder; the amount due is reduced by calculation of rebates or last-unit discounts as posted under published rules (for proportional rebate or pivotal-bidder) on the last unit. However, Box 6 indicates that if published rules include allowing bidders to revise their bids, before ending the auction the broker/auctioneer announces the results from Box 5 while including a message soliciting any bid-revisions from participants; if revisions are allowed under the published rules, then the process picks up again from Box 2 and proceeds until data-base calculations lead to the end of the auction at Box 6 in compliance with published rules.

Figure 3:
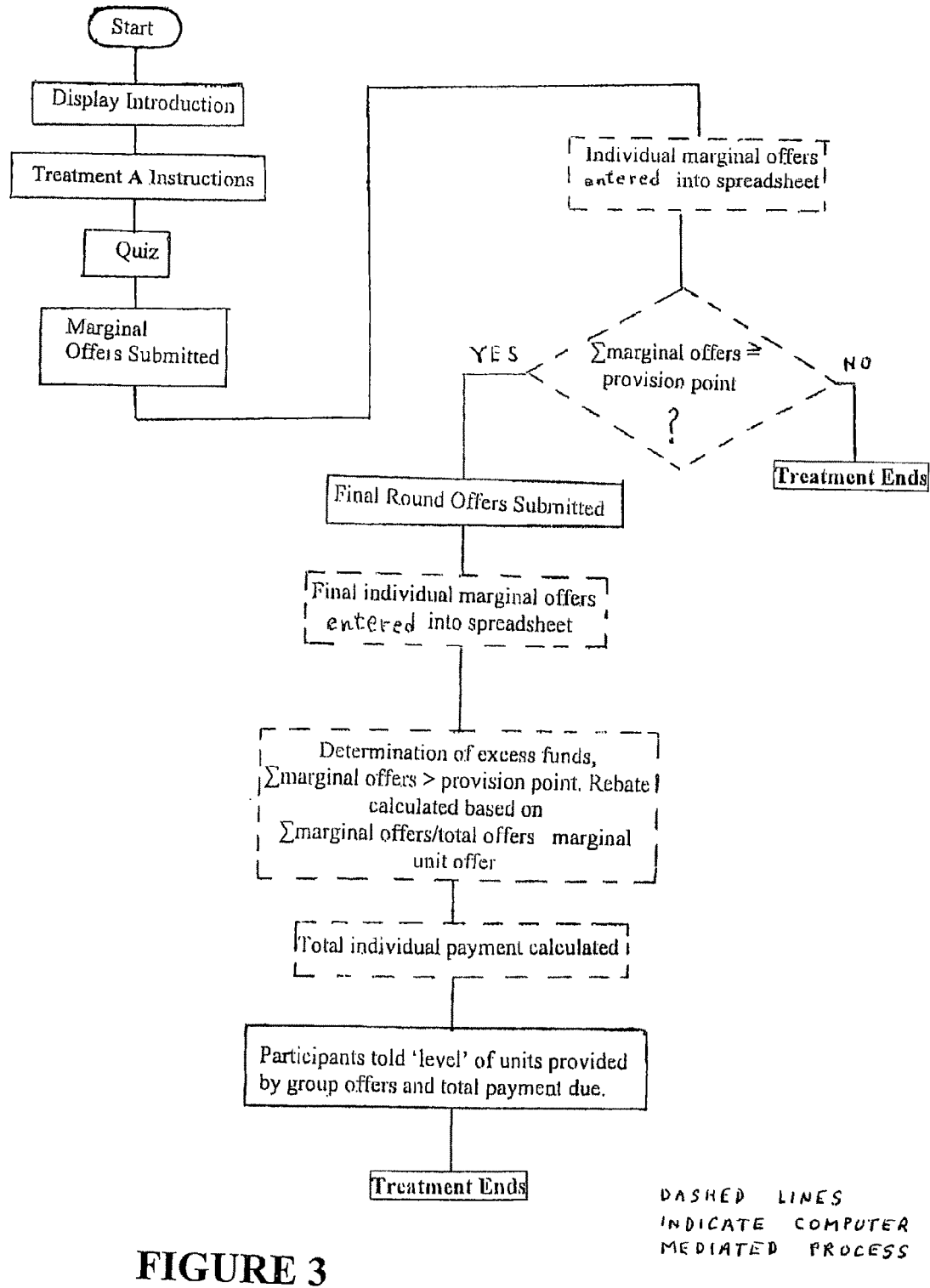
FIG. 3 is a flow chart of a treatment A which is a version of the auction based on the proportional rebate incentives for sequential, marginal bids on each unit of the public good available for sale; wherein bidders have one opportunity to place all bids. For the purpose of FIGS. 3, 4 and 5, "treatment" can refer to publishing the rules of the auction, including what the marginal incentives are (proportional rebate or pivotal bidder, with or without feedback or a chance to make a second-round bid, forward or backward approach, and appropriate time limits or eligibility criteria for bidders and bids).

FIG. 3 illustrates the process from FIG. 2 for the case where auction rules follow a forward bidding process and involve proportional rebates as the incentives chosen by the broker/auctioneer to reduce the advantages of free-riding for bidders on each marginal unit, and there is only one opportunity to place a bid (no revision of bids will be allowed). The display introduction and treatment A instructions refers to the publication of the auction rules on the internet or through public media or announcement at a community meeting. The quiz implies that the publication of rules may allow a question-and-answer period or involve a numerical illustration of how the rules might work, via a computerized example or set of interactive trial-runs designed to give potential bidders a clearer understanding of the published rules and their implications for strategic bidders. Offers are then submitted and entered into a spreadsheet or database to enable computer analysis to apply the rules for evaluating marginal bids. If the sum of marginal bids (offers) does not exceed the delivery cost (provision point) of the first marginal unit, in a forward process, then the treatment (auction) ends with no units supplied. However, if the sum of marginal bids does exceed the provision point on the first marginal unit, then the broker/auctioneer continues database analysis to evaluate the second unit; if the sum of bids on the second unit exceeds the cost of provision, then the analysis considers the third unit and so forth. Analysis stops when the marginal unit under consideration cannot be provided based on the published rules and the bids received for that unit relative to the provision point (or if there is no additional units that might be provided feasibly by the broker/auctioneer or individuals under contract for supplying the good). Based on the last unit for which the sum of bids exceed the provision point for that unit, the broker establishes the final-round offers and determines the final individual marginal offers that will be accepted and entered as the bids that set the individual prices for each bidder. Then, the data base analysis/calculations identify the excess of funds on the last unit provided (sum of bids minus the provision point for the marginal unit) and calculate the rebate on the last unit provided, for each individual bidder, in proportion to the excess of funds; this rebate establishes a discounted price for each individual bidder that is then applied to all units provided before the last unit. For example, if the auction process stops at the determination that unit 5 is the last one to be provided under published rules, and the excess of funds from the sum of bids over the provision point for the fifth unit is 15%, then each individual bidder's individualized price will be 85% of his bid on the fifth unit; in this example, each bidder will pay that price (85% of his fifth-unit bid) on the fifth unit and on the inframarginal units (units 1 through 4 in this example), even if that individual had made higher offers on units 1, 2, 3, or 4. On this basis, the total individual payment is calculated, participants (bidders) are told the outcome, payments are billed or rebates are provided to participants.

Figure 4:
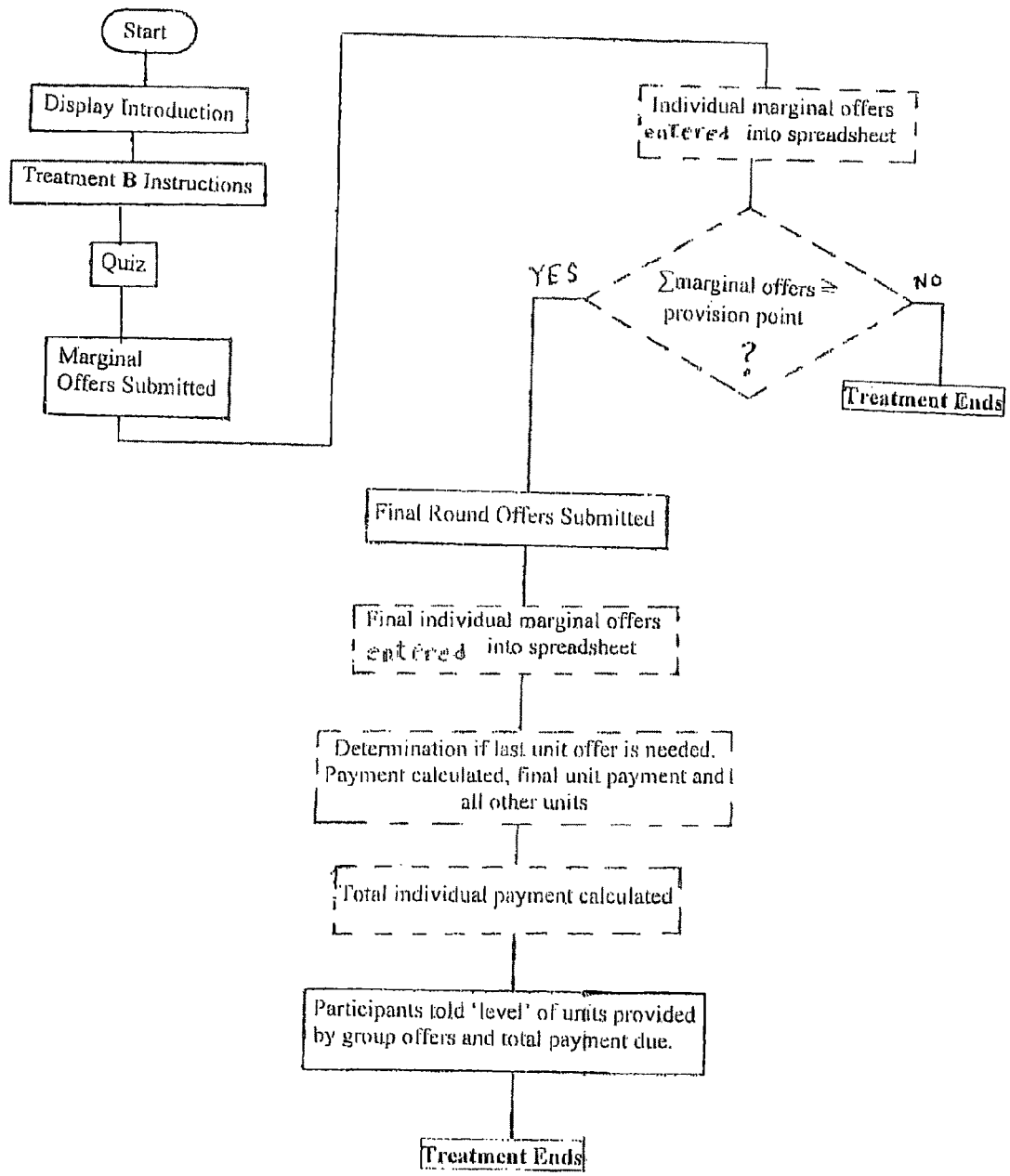
FIG. 4 is a flow chart of a treatment B which is a version of the auction based on the pivotal mechanism (pivotal bidder) incentives for sequential, marginal bids on each unit of the public good available for sale; bidders have one opportunity to place all bids

FIG. 4 illustrates the adaptation of the general process (FIG. 2) to the specific implementation with pivotal mechanism (pivotal bidder) form of marginal incentives as the published rules of the auction, again with no opportunity for bidders to revise their initial bids. FIG. 4 therefore is very similar to the illustration in FIG. 3, except as involving the calculations and analysis of the data base of bids received. In this implementation of the auction, the marginal rules are that units will be provided/delivered by the broker/auctioneer (and partners) when the sum of marginal bids exceeds the provision point for that unit (as in FIG. 3). Sequential analysis of each unit continues until the broker/auctioneer determines the last unit that may be provided given the bids received. This determination establishes the final-round offers. Calculations then determine the discount price that each individual bidder pays on the last unit provided and determines a price that bidder pays on the units before the last unit (the infra-marginal units). The discount price for each bidder on the last unit is calculated as the proportion of his bid on the last unit that is required in order to meet the provision point for that unit; this amount is zero for a particular individual if the sum of bids from all other bidders (excluding this individual) exceeds the provision point, but otherwise it is a positive discount-price (less than or equal to this individual's bid) set equal to the amount of money needed to bring the sum of bids from everyone else up to the provision point. Then individualized price for each bidder for the inframarginal units is equal to their bid on the last unit provided. For example, suppose unit 5 is the last that can be provided based on the bids received, and person "A" bid $10 on unit 5; suppose the provision point for unit 5 is $600 and the total of all bids is $700 ($690 excluding person A). Then person A has a discount-price of zero on the fifth unit but pays $10 each on inframarginal units 1 through 4. If person "B" bid $120 on the fifth unit, these rules will leave person B paying $100 as a discount price on the fifth unit (not $120) and paying $120 on each of the inframarginal units 1 through 4. This process establishes the total individual payment for each bidder. The auction results are told to the group of participants and the treatment/auction ends. (As noted in the application, if the process does not raise enough revenues under the pivotal-bidder rules to cover the costs of providing the last unit, the fifth unit in the numerical example, that fifth unit must be provided from funds arranged by the broker/auctioneer through a matching source such as a government program or a major benefactor for the public good.)

Figure 5:
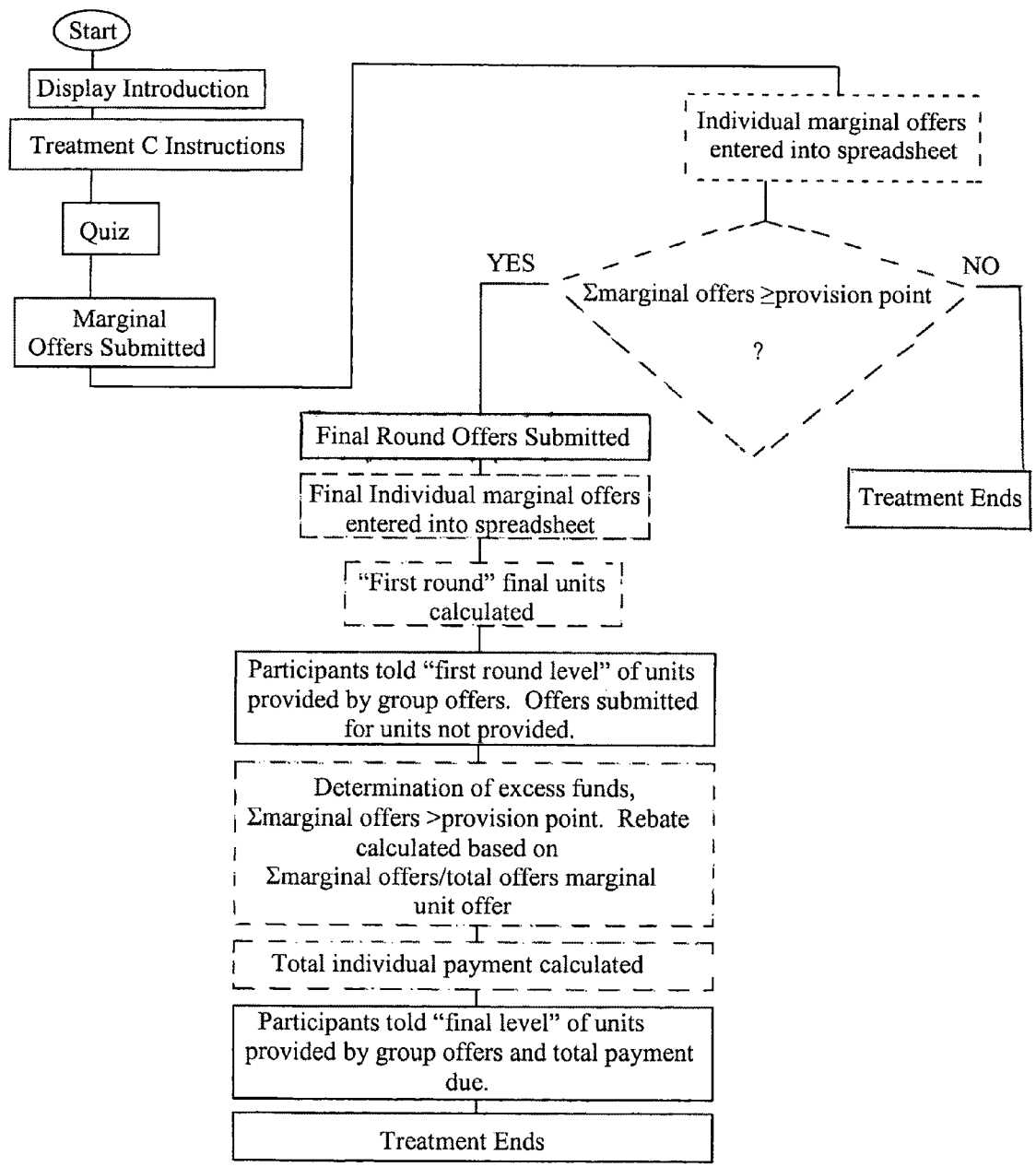
FIG. 5 is a flow chart of a treatment C which is a version of the auction that allows bidders one opportunity to gain feedback and place revised bids if the first collect of bids fails to deliver some units.

FIG. 5 shows a version of the auction that allows bidders one opportunity to gain feedback and place revised bids if the first collection of bids fails to deliver some units; FIG. 5 is formatted to allow for either the application of the proportional rebate rule of FIG. 3 or the pivotal-bidder rule of FIG. 4 (with the choice of the rule published in the Display Introduction and Treatment C instructions). Differences from FIG. 4 include that the broker/auctioneer may publish rules under which revised bids will be considered (such as, revised bids will only be accepted from bidders who made initial bids above a minimum amount on successive units). The other differences from FIG. 4 include that the broker/auctioneer publishes the first round "final units" that may be provided based only on initial bids (under the pivotal-bidder rule or the proportional rebate rule, as stated under the rules published by the broker/auctioneer) and tells each participant his or her price on the last unit and on the inframarginal units if these initial bids stand; the broker/auctioneer then solicits revised bids. Then the broker/auctioneer updates the collection of bids based on any revised bids received and calculates the final number of units that may be provided under the published rules, announces the outcome and issues bills or rebates to individual bidders under those rules.

FIG. 6 depicts the sum of marginal offers for all participants making decisions (or bids) on 1, 2, 3, up to 8 units. The shaded column representing all marginal offers on the first unit is substantially higher than the marginal cost for that unit, represented by the black column. While the sum of marginal offers gets closer to the marginal cost for higher units (particularly units 6, 7 & 8), the graph does show the mechanisms' ability to provide for successive units of the good through bid collection.

FIG. 7 also represents the ability of this process to raise enough revenues to provide for the good, but is taken from Applicants' 2008 field experiment which applied the process to actual public goods (in the form of different restoration activities, sea grass, clams & birds). In this scenario all restoration activities were provided for units 1 and 2. Only sea grass and clams provided the $3^{rd}$ unit of restoration and none of the activities were provided at the maximum of 4 units.

Figure 8:
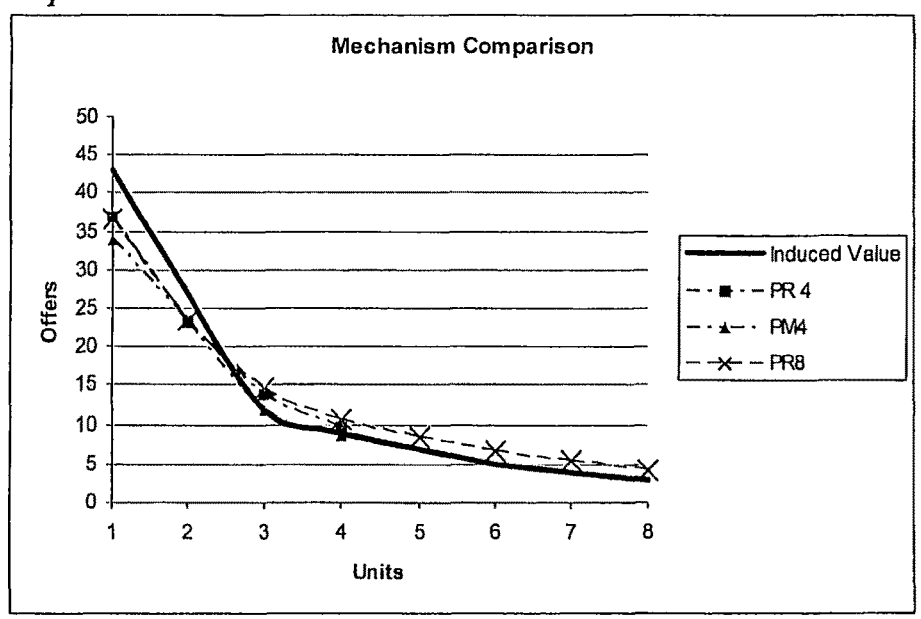
FIG. 8 is a graph showing the results of induced value experiments indicating that the average bid made by individuals for each unit of public good is approaching the individual's maximum willingness to pay under each of three different inducement mechanism rules.
Figure 9A:
FIGS. 9A-9O describe a series of images from an electronically communicated PowerPoint® presentation explaining to participants and the general public the background of the economics problem of public goods and the summary of the present invention for one example of Revenue Raising Auction Processes for Public Goods.
Figure 9B:
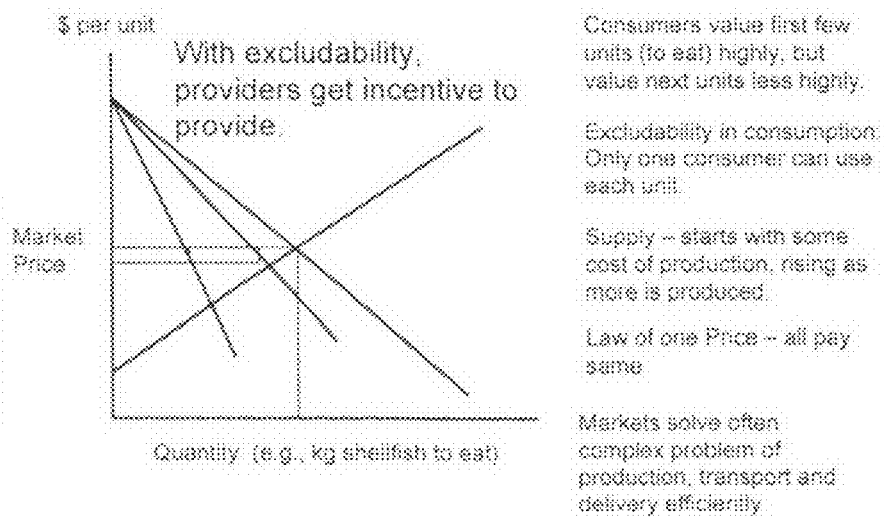
Figures 9C, 9D:
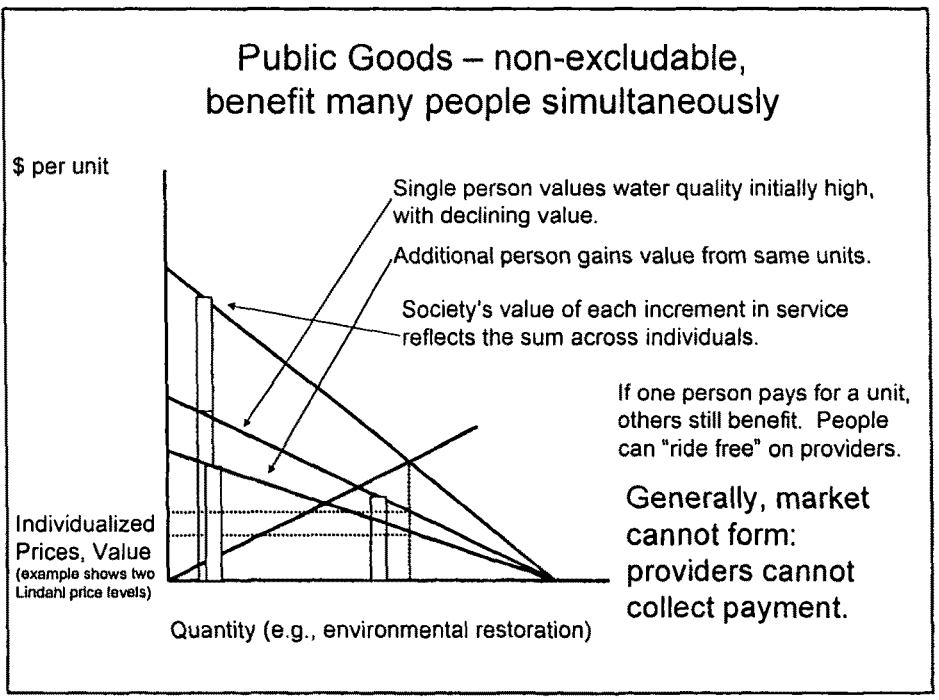
Figure 9K:
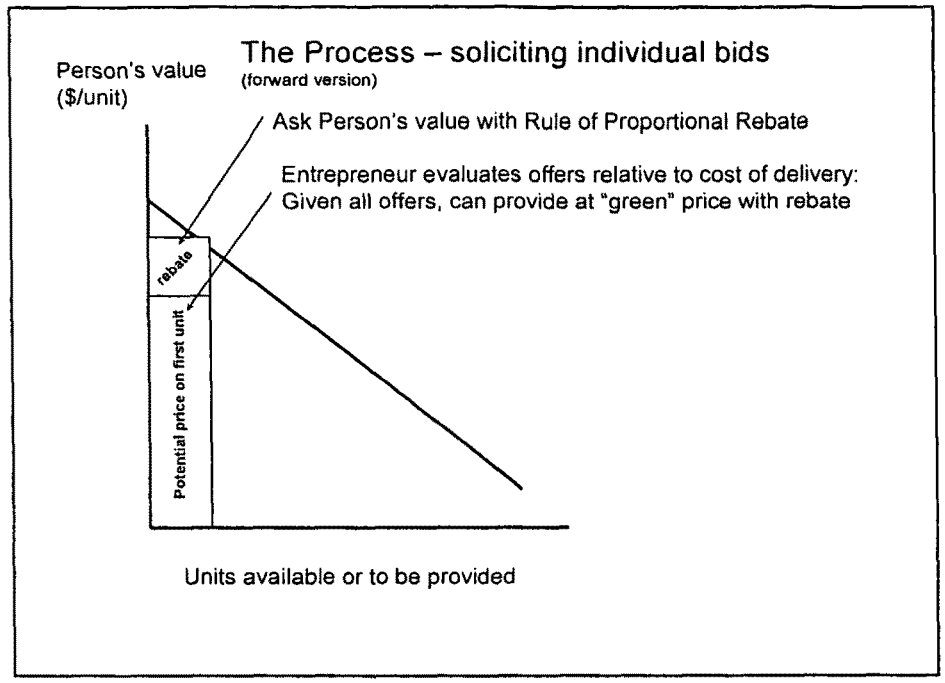
Figure 9L:
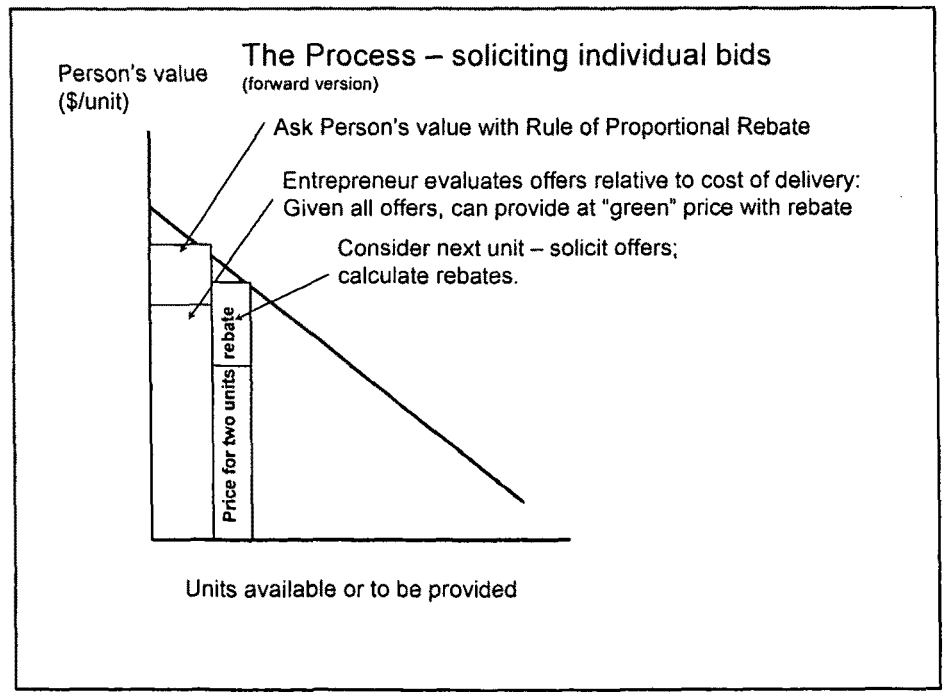
Figure 9M:
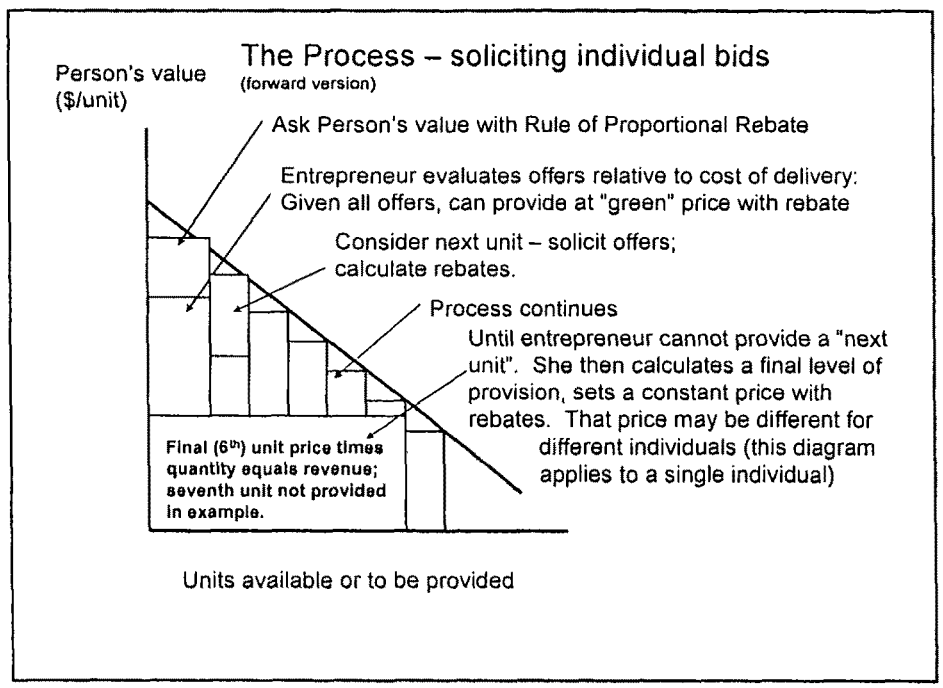

Based on induced value experiments, the graph of FIG. 8 shows that the average bid made by individuals for each unit of a public good is coming very close to the individual's maximum willingness to pay. The "induced value" line shows the maximum willingness to pay for individuals; this value is established or "induced" by giving participants in the experiment a monetary payoff if a unit is provided. The "PR 4" line plots the average bid on each unit from individuals for which the marginal incentives were based on the "Proportional Rebate" rules described in the patent application; these individuals were given induced values for units 1, 2, 3, and 4. The "PR 8" line plots the average bid for individuals who again faced incentives under the "Proportional Rebate" rule but were given induced values for units 1 through 8. The "PM 4" line plots average bid from individuals who faced incentives under the "Pivotal Mechanism" for the marginal unit (the "pivotal bidder") approach and had induced values for units 1 through 4. These preliminary results suggest the business process has a potential to come very close to eliciting bids consistent with Lindahl's theoretical framework of individualized prices equal to the person's maximum willingness to pay for a marginal unit FIGS. 9A-9O describe a series of images from an electronically communicated PowerPoint® presentation explaining to participants and the general public the summary of the present invention for one example of Revenue Raising Auction Processes for Public Goods. For example FIG. 9A summarizes in a title the objects of the present invention, namely using economic market approaches to public goods, such as cultural and aesthetic ecosystem services. FIGS. 9B and 9C explain market goods and the concept of excludability stimulating markets for provisioning services of commodities, such as the use of a commodity such as shellfish for food or building materials, such as crushed lime. FIGS. 9D-9F describe the efforts and challenges to place a valuation of generally non-marketable goods, such as public goods benefiting many people simultaneously. FIG. 9G describes known processes including provision point goods and money back guarantees. FIG. 9H describes examples of specialized groups for participating in Applicants' revenue raising auction processes for public goods. FIG. 9I describes a proportional rebate feature useful for revenue raising auction processes for public goods. FIGS. 9J-9N describe an example of a "forward" type of auction process for revenue raising for public goods. FIG. 9O describes an outline of research issues related to auction processes for raising revenue for public goods.

Example A

FIGS. 10A, 10B, 10C and 10D show an example of a test revenue raising auction process for public goods, where the public goods were defined as being related to preservation of sea grass, clams and birds and habitats related thereto.

Figure 10C:
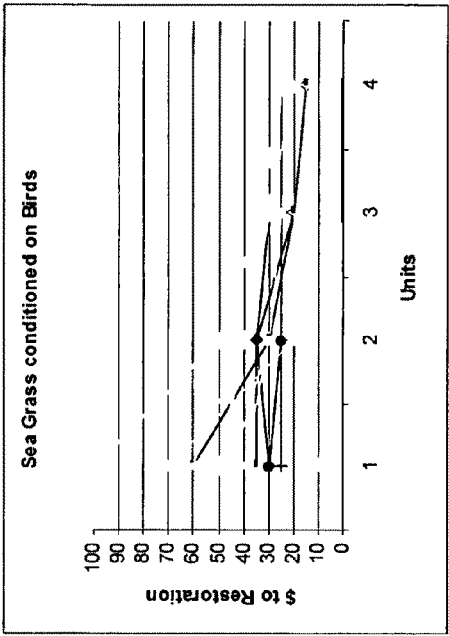
FIGS. 10C and 10D are graphs showing the tabulation of the test results accumulated in FIG. 10B for the test auction of FIG. 10A.
Figure 10C:
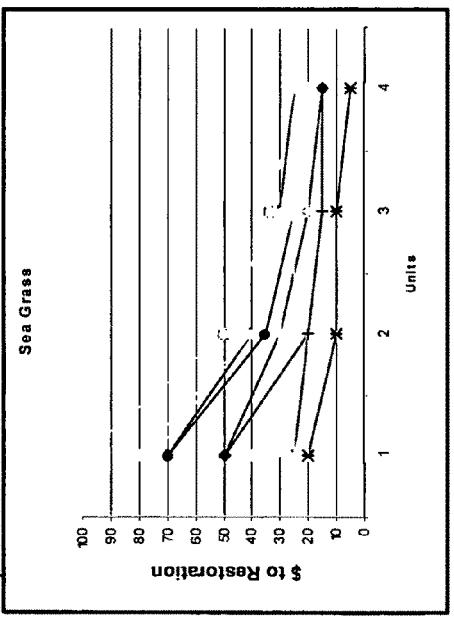
Figure 10C:
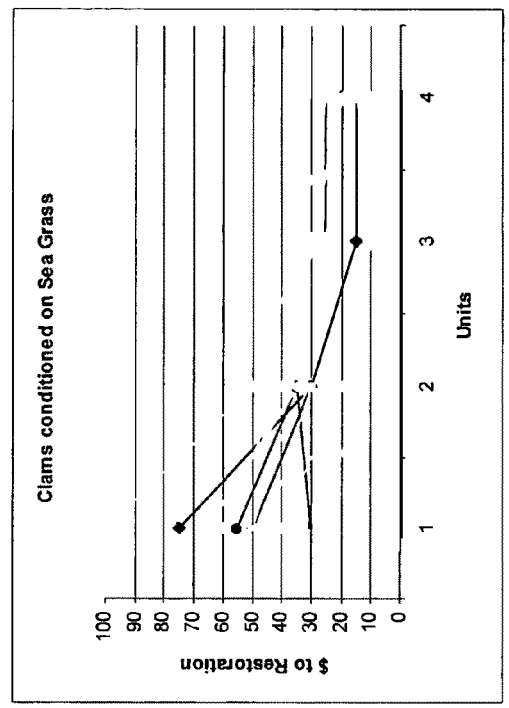
Figure 10C:
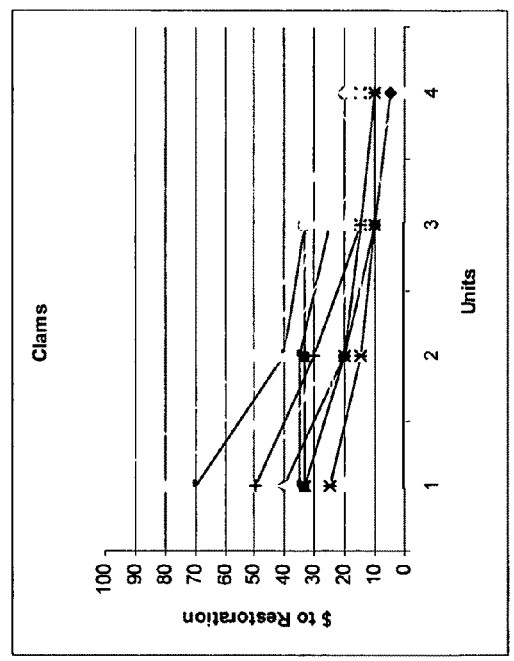
Figure 10D:
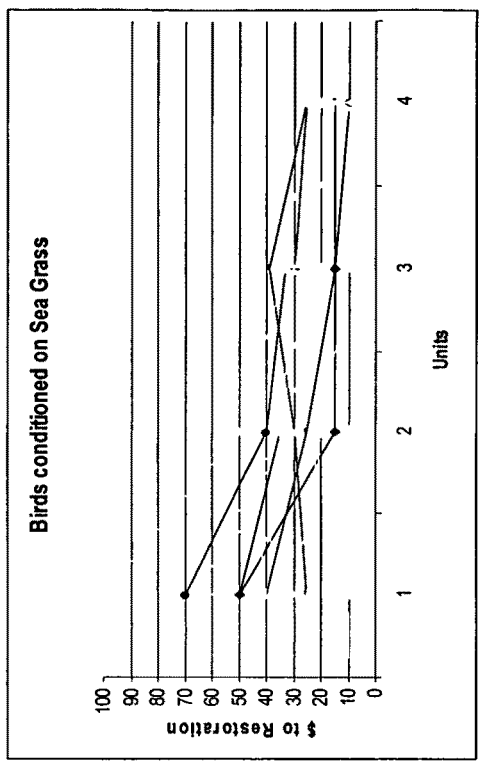
Figure 10D:
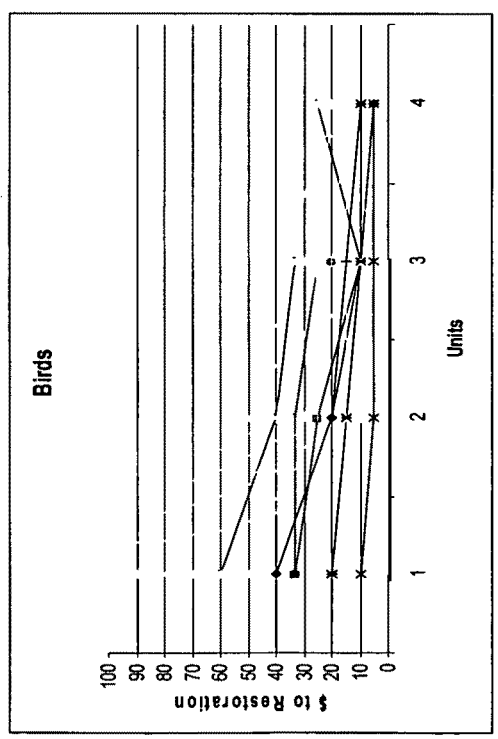

In connection therewith, FIG. 10A is a chart of demographics overview and preliminary observations of the test of the revenue raising auction process for public goods of the present invention. FIG. 10B shows tables of results of the test auction of FIG. 10A, where responses were accumulated by the participant bidders choosing either a bundle of revenue for each unit of restoration concerning to preservation of sea grass, clams and birds and habitats related thereto, or a bundle split across all types of designated public goods concerning to preservation of sea grass, clams and birds and habitats related thereto. FIGS. 10C and 10D are graphs showing the tabulation of the test results accumulated in FIG. 10B for the test auction of FIG. 10A.

Example B

FIGS. 11A-11PP are portions of data input questionnaires and instructions to bidders participating in an experiment designed as an exemplary test of the revenue raising auction process for public goods of the present invention, where the public goods were defined as bundles of increments of purchased value relating to restoration of habitats for birds, clams and sea grass respectively. FIGS. 11A-11U apply to one group of participants in the experiment, and FIGS. 11V-11PP apply to a second group of participants in the experiment, FIG. 11A is a sign-in page requiring the signature of a participating bidder experimental test of the revenue raising auction process for public goods.

FIG. 11B is a sheet of introductory comments and general instructions to participating bidders in the first group of participants at the test auction of FIG. 11A.

FIG. 11C is an alert to participating bidders alerting them to wait for further instructions from the broker/auctioneer conducting a first step of experiment testing the auction.

FIGS. 11D-11G show an example of the questions for the first step of the economics experiment designed to test the auction as in FIG. 11C.

FIG. 11H is an alert to participating bidders alerting them to wait for further instructions from the broker/auctioneer conducting a second step of the experiment designed to test the auction.

FIGS. 11I-11L show an example of the questions for the second step of the experiment designed to test the auction of FIG. 11H.

FIG. 11M is an alert to participating bidders alerting them to wait for further instructions from the broker/auctioneer conducting a third step with the first group of participants in the experiment to test the auction. The portions of the experiment designed to test the auction process, as represented in FIGS. 11A-11M, are intended to establish alternative data against which results of the auction process might be compared.

FIGS. 11N-11S show an example of the instructions and questions for the third step of the experiment to test the auction process of FIG. 11M; materials in FIGS. 11N-11S begin and implement the Applicants' auction process as designed for the experimental test.

FIGS. 11T-11U are follow-up questions to participating bidders participating in the experiment designed to test the revenue raising auction for public goods.

FIG. 11V is a sign-in page requiring the signature of a participating bidder in the second group of participants in the experiment to test a revenue raising auction process for public goods.

FIG. 11W is a sheet of introductory comments and general instructions to participating bidders second group of participants in the exemplary test auction of FIG. 11V.

FIG. 11X is an alert to participating bidders alerting them to wait for further instructions from the broker/auctioneer conducting a first step for the second group of participants in the auction.

FIGS. 11Y, 11Z, 11AA and 11BB show an example of the questions for the first step involving the second group of participants in the experiment to test the auction of FIG. 11V.

FIG. 11CC is an alert to participating bidders alerting them to wait for further instructions from the broker/auctioneer conducting a first step with the second group of participants in the experiment to test the auction.

FIG. 11DD is a sheet of introductory comments and general instructions to participating bidders at the second step with the second group of participants in the experiment to test the auction of FIG. 11V.

FIGS. 11EE-11GG show an example of the questions for the second step with the second group of participants in the experiment to test the auction as in FIG. 11DD.

FIG. 11HH is an alert to participating bidders alerting them to wait for further instructions from the broker/auctioneer conducting the third step with the second group of participants in the experiment to test the auction. The portions of the experiment designed to test the auction process, as represented in FIGS. 11V-11HH, are intended to establish alternative data against which results of the auction process might be compared.

FIG. 11II-11MM show an example of the instructions and questions for the third step of the experiment, with the second group of participants, in the exemplary test of the auction process of FIG. 11HH; these are a series of budgetary inquiries to be selected from charts of examples of incremental choices of offers (bids) of payment for increments of public goods, with participants in the experiment spending money initially provided by the researchers as "personal budget" to be used to purchase the experimental public good or used as money to be taken home in the third step of the experiment to test the auction; materials in FIGS. 11II-11MM begin and implement the Applicants' auction process as designed for the experimental test.

FIGS. 11NN-11PP are statistical follow-up questions to participating bidders in the second group of participants in the experiment testing the revenue raising auction for public goods.

Example C

The following is another example of questions to beneficiary bidders as a Public Benefit Auction:

"For the questions in this section, based on your preferences you will choose between allocating your funds between an environmental restoration activity (or set of restoration activities) and an amount that you can keep for your household's use. In this section, however, each question will ask about your willingness to contribute part of your budget towards different levels of additional restoration of a particular type. Each individual will again be given a personal budget to allocate (or spend) in each choice-question.

"Determining the Outcome:

Your choice and the choices of the other individuals in your group will determine the level of each action influencing restoration activities and ecosystem services. This means that the project coordinator will look at the decisions of the entire group to determine the how much restoration will be provided, if any. If one of these questions is randomly drawn for implementation, then the project coordinator will begin by identifying whether your group's decisions allocated enough funds to pay the costs needed to implement one half acre of the restoration activity, before moving on to evaluating whether your group allocated enough funds to pay for an additional half acre, and so on. Depending on the decisions of all members of your group, the project coordinator will determine the highest level of restoration activities that can be achieved as the largest number of half acres that can be provided from the funds your group allocated in that question.

"After determining how many acres of the restoration activity can be provided, any money allocated by you and the members of your group that is in excess of the predetermined cost to implement the restoration will be rebated to you and your group members. Your rebate will be in proportion to the excess of funds allocated by the group. For example, if the project coordinator determines that your group provided enough funds for 2 acres and your group allocated X % more money than was actually needed to implement 2 acres restoration, then we will rebate X % of your money back to you as additional funds you can take home.

"Instructions:

"In this section, each question will provide you with a table, like the one below. Each question provides you with a personal budget ($100 for the example below) with which to make decisions for each part (a-d) of the question. Each part (a-d) will give you a new opportunity to allocate some amount of funds towards a certain level of restoration activities and the remainder for you to take home (or use in any way you choose).

"You will make a decision for how much money to allocate (per ½ acre) for varying levels of the restoration activity (1, 2, 3 & 4). The table will give you the breakdown of your funds, for each ½ acre. You may choose to allocate a dollar amount pre-specified in the provided table or choose your own dollar amount, as long as it does not exceed your allocated budget.

"For example, in column (a) you will decide how much to allocate on one ½ acre. If you choose to pay $40 towards restoration, and enough funds are allocated from your group to provide a ½ acre of restoration, you will keep (take home) $60, plus any available rebate.

"In column (b) you will decide how much to allocate for two ½ acres of restoration activities. If you again choose to pay $40 per ½ acre, you will allocate $80 ($40×2) for restoration activities, and if enough funds are allocated from your group to provide these 2½ acres of restoration, you will keep (take home) $20 plus any available rebate.

"In column (c) you will decide how much to allocate for three ½ acres of restoration activities. In this example, your budget is $100 which prevents you from allocating $40 per unit ($40×3=$120), but does allow you to allocate up to $33.33 per unit (3×$33.33=$100) for restoration activities, and if enough funds are allocated from your group to provide three ½ acres of restoration, you will take home $0.

"In column (d) you will decide how much to allocate for four ½ acres of restoration activities. In this example, your budget is $100, which prevents you from allocating $33.33 per unit, but allows you to allocate a maximum of $25 per unit ($25×4=$100). In the example below, the 'choose your own' price was selected, $12 per half acre or a total allocation for four units of $48 ($12×$4).

"You can make any allocation you like in each column. The above numbers are ONLY examples.

"After the research coordinator determines the largest number of ½ acres that can be provided, in the event one of these questions is chosen for implementation, then any excess money allocated above the amount needed to implement the restoration will be rebated to you in proportion to the excess and added to your money to take home and use in whatever way you decide.

"Example

| Per Unit Prices ($) | (a) price × One ½ Acre = Payment | (b) price × two ½ Acres = Payment | (c) price × three ½ Acres = Payment | (d) price × four ½ Acres = Payment |
|---|---|---|---|---|
| 0 | 0 × 1 = 0 | 0 × 2 = 0 | 0 × 3 = 0 | 0 × 4 = 0 |
| 5 | 5 × 1 = 5 | 5 × 2 = 10 | 5 × 3 = 15 | 5 × 4 = 20 |
| 10 | 10 × 1 = 10 | 10 × 2 = 20 | 10 × 3 = 30 | 10 × 4 = 40 |
| 15 | 15 × 1 = 15 | 15 × 2 = 30 | 15 × 3 = 45 | 15 × 4 = 60 |
| 20 | 20 × 1 = 20 | 20 × 2 = 40 | 20 × 3 = 60 | 20 × 4 = 80 |
| 25 | 25 × 1 = 25 | 25 × 2 = 50 | 25 × 3 = 75 | 25 × 5 = 100 |
| 30 | 30 × 1 = 30 | 30 × 2 = 60 | 30 × 3 = 90 | NAME YOUR OWN PRICE |
| 33.3 | 33 × 1 = 33.3 | 33 × 2 = 66.6 | 33.3 × 3 = 99.9 | |
| 35 | 35 × 1 = 35 | 35 × 2 = 70 | NAME YOUR OWN PRICE × 3 = | |
| 40 | 40 × 1 = 40 | 40 × 2 = 80 | | 12 × 4 = 48 |
| 45 | 45 × 1 = 45 | 45 × 2 = 90 | | |
| 50 | 50 × 1 = 50 | 50 × 2 = 100 | | |
| 55 | 55 × 1 = 55 | NAME YOUR OWN PRICE × 2 = | | |
| 60 | 60 × 1 = 60 | | | |
| 65 | 65 × 1 = 65 | | | |
| 70 | 70 × 1 = 70 | | | |
| 75 | 75 × 1 = 75 | | | |
| 80 | 80 × 1 = 80 | | | |
| 85 | 85 × 1 = 85 | | | |
| 90 | 90 × 1 = 90 | | | |
| 95 | 95 × 1 = 95 | | | |
| 100 | 100 × 1 = 100 | | | |
| OWN | NAME YOUR OWN PRICE × 1 = | | | |

Although the aforesaid is an example of an auction for raising revenue for public goods, there are only a limited number of required "topics" for running the auction.

For example, it is not required that the auction process actually use the full body of the questionnaire examples included in this application. The minimum tasks that a broker/auctioneer for a client (or a firm operating an auction for itself) needs to implement are:

1. Establish a means to deliver the public good above levels that happen as a side-effect of other economic activities or programs.

For example, obtain agreements with farmers, within a defined community, who will manage their operations for better wildlife habitat, water quality protection, or agrarian views beyond the current output of wildlife, water quality protection, or scenic views that happen as a consequence of current farm operations.

2. Decide on the details of the auction rules to be used for the particular case.

Choices include: forward process (most likely) versus backward; version of incentives to reduce free rider behavior (proportional rebates or pivotal bidder method) for bids on successive marginal units; time frame for accepting bids; decision on whether bidders will have any opportunity to revise bids after evaluation of the first collection of bids received and who will be eligible to submit revised bids (if any).

3. Establish traditional marketing, internet or presentation (including, but not limited to, PowerPoint®) to explain the public good being sold to consumers and to publish the rules of the auction (with explanations or question-answer opportunities for potential participants-bidders).

In the farmland example, the explanation could link protection of hayfields from harvest during the bird nesting season to the role of the agrarian landscape in the character of a community, the role of hayfields in absorbing farm nutrients (nitrogen or phosphorus) that might otherwise enter water bodies, the role of hayfields as an alternative to corn and associated nutrient loadings mitigated or avoided; and the aesthetic value of health bird populations near human residential areas. Auction rules to publish are mentioned in item 2 above and elsewhere (see FIG. 2, et seq.).

4. Contact potential consumer-bidders and establish logistics for soliciting and receiving bids.

This may be done through a consulting firm (or university extension specialist or university center supporting non-profits) that maintains web-internet-database capabilities, possibly in conjunction with community meeting rooms or mobile computer equipment, for these auctions.

5. Solicit bids with an instrument allowing individual bidders to make a per-unit price offer (name their own price) on successive marginal units (successive "lots") of the public good being sold.

The example questioners provide this in a table. If bids are made on paper, these bids would be entered into the database for the auctioneer's analysis. As described elsewhere in the application, bid might be solicited directly through computer networks or internet (see FIG. 1 et seq.).

CONCLUSION

As a result of the foregoing Examples, the present invention concerns a computer system and method of running a revenue raising auction process for selling multiple units of one or more public goods to a community of beneficiaries. The auction process determines individualized prices that enable raising of revenues to cover costs of provision, including normal return to business. The individualized prices are analogous to in a Lindahl framework, but the process may not eliminate all free-riding incentives; by altering incentives for marginal bids, the process reduces incentives to free ride at the margin and thereby encourages higher bids that approach the individual bidder's full value; by altering (reducing) incentives to free-ride at the margin, the process comprises a practical method to elicit higher bids from beneficiaries of a public good. By establishing a contract right to deliver a public good to a community of beneficiaries, the broker or auctioneer can establish an ability to control delivery of the public good. By this auction process, the broker is in a unique position to deliver the public good. Public goods may include environmentally related goods, cultural goods (such as parks or arts), or any good that benefits numerous people simultaneously. The auction process comprises a platform through which to enhance the delivery (increase the quantity) of public goods provided through private (non-governmental) action or private action in conjunction with government programs.

Applicants envision that this revenue raising auction process can be implemented by consulting firms, university extension personnel, or trained student-interns at a university. These trained individuals would be contacted by non-profit or for-profit clients who ask for auctioneer services to sell a particular public good in a region. Consulting firms, or an auction business, might also proactively contract to establish options to sell or provide public goods in a region in advance of an auction. For example, a firm interested in selling water quality permits or wildlife habitat services in a community where residents value their rural character might sign options or brokerage contracts with local owners of farmland who agree to enable water quality or wildlife habitat management services (or both) as a public good flowing from their land to the community of resident-beneficiaries. Consulting firms could also use the process to create business that helps to establish public values for inclusion in benefit-cost analysis for government or other decision-makers, by using the process to obtain data on people's actual willingness to pay for increasing the level or quantity of a public good. In addition, such firms might integrate this process with future versions of government programs, such as the U.S. Department of Agriculture's conservation reserve-type programs in which the USDA puts up a base grant for enrolling some farmland in conservation programs while the consulting firm uses the Applicant's auction process to raise matching revenues directly from the public and uses those revenues to direct the use or distribution of the government funds toward the public's (or auction participants') most-valued farmland public goods.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A method implemented on a server based computing device, of selling multiple units of one or more public goods in a revenue raising auction process for public goods, to a community of beneficiaries, comprising:
    receiving input on said server based computing device from an auction manager of a public goods offering comprising:
    a schedule of increments of a plurality of selected units of a public good potentially
    available to a community of beneficiaries for a public goods offering;
    publishing availability of said plurality of selected units of public goods offering, and
    publishing rules for auction for said public goods offering;
    said rules including at least one rule selected from the group of at least one of requiring and not requiring said auction manager to publish the minimum thresholds of monetary support necessary for delivery of said increments of said plurality of selected units of public goods offering;
        receiving first bid offerings from participant bidder based client devices by said server based computing device;
        receiving a succession of marginal bid offerings from said participant bidder based client devices by said server based computing device until said participant bidders have provided a cumulative set of bid offerings including one bid offering on each of said plurality of units of public goods;
    said server based computing device determining individualized prices of said auction process that enable raising of revenues to cover costs of provision of said plurality of selected units of public good, including normal return to business;
    said server based computing device determining individualized prices of a pricing framework that approximates the theoretical ideal of a Lindahl pricing framework by creating incentives for each participant bidder that identify a willingness of the participant bidder to pay a price for each marginal unit of public good that approaches each individual's actual marginal benefit for said marginal unit of public good, said pricing framework comprising the steps of:
    determining a collective amount of revenue that may be derived from the collective set of bids received from participant bidders within said community of beneficiaries,
    creating incentives for said participant bidders to contribute revenue toward said delivery of public goods by determining said final number of units to be sold by implementing an algorithm on said computing device to evaluate said collective set of bids sequentially for each unit against the delivery cost of each unit within said available plurality of selected units of public goods;
    whereby said algorithm of said pricing framework determines the final unit sold, such that the sum of the collective set of bids on said final unit sold offers sufficient potential revenue to at least equal the delivery cost of said final unit sold and said algorithm of said pricing framework uses a pre-specified rule to determine a price-per-unit sold for each of said individuals;
    said pre-specified rule of said pricing framework enhancing incentives for said participant bidders to offer bids on each unit reflecting each said participant bidder's full marginal values for each corresponding unit, while establishing a price-per-unit for each of said participant bidder's to pay, comprising the corresponding participant bidder's share of the cost of delivering said final number of units sold in said auction process;
    sequentially requesting bids from each participant bidder to make successive bids on each unit of public good to stimulate subsequent higher bids that come closer to each participant bidder's maximum willingness to pay for each said marginal unit of public good;
    wherein said pricing framework tabulates bids from each of said participant bidders into a schedule of offers to pay a maximum price-per-unit on each particular unit and on any units delivered up to said particular unit;
    said method reducing free-riding behavior of beneficiaries of said plurality of selected units of public goods by said auction manager altering successive incentives for marginal bids made by the participant bidders by making said successive bids on said marginal units after the first unit to be at least one of (i) relevant and (ii) irrelevant, given the auction manager's choice to use at least one of (i) a forward bid evaluation method and (ii) a backward bid evaluation method, thereby said auction method reducing incentives of said beneficiaries of said plurality of selected units of public goods to free ride at the margin and thereby encouraging higher bids that approach the individual participant bidder's full value for the marginal unit;
    wherein said forward bid evaluation method makes relevant said successive bids on said marginal units after said first unit by requiring that the sum of all bids received on an earlier unit relative to the marginal unit for which bids would next be evaluated to cover the delivery cost on said earlier unit;
    and wherein said backward bid evaluation method makes irrelevant said successive bids on units beginning from the final unit backward toward said first unit when the sum of all bids received on the marginal unit for which bids are being evaluated fail to cover the delivery cost on said marginal unit for which bids are being evaluated;

said auction method further comprising a practical method to elicit higher bids said server based computing device from said participant bidders among said community of beneficiaries of said plurality of selected units of public goods;

said auction method establishing a contract right to deliver said plurality of selected units of public goods on said server based computing device to the community of the participant bidders of said community of beneficiaries, wherein said auction manager uses said server based computing device to control delivery of said plurality of selected units of public goods to said participant bidders of said community of beneficiaries.

2. The method implemented on a server based computing device of claim 1 in which funds collected in excess of that required to pay for said final cumulative bid offering for a last unit that may be provided from said plurality of units of public good are returned proportionately to each participant bidder who contributed to said last unit that may be provided of selected units of public goods thereby establishing an individualized price for each participant bidder on all other inframarginal units of said plurality of selected units of public goods and creating an incentive to members of said community of beneficiaries to offer bids that approach their full marginal value to said auction manager upon said server based computing device.

3. The method implemented on a server based computing device of claim 1 in which funds collected on said server based computing device in excess of that calculated by said auction manager to pay for said plurality of selected units of public goods are used toward at least one of i) a greater number of units of said selected units of public goods, and ii) are used to provide extended benefits through provision of selected units of different public goods.

4. The method implemented on a server based computing device of claim 1 in which funds collected by said auction manager from or offered by an individual participant bidder on said last unit that may be provided of said plurality of units of public goods, such that these funds create an excess of funds of that required to pay for said last unit that may be provided of said plurality of units of public goods, establish the individual participant bidder's price on all other provided units of said selected units of public geed goods while an individual participant bidder of said participant bidders pays a discounted price between the individual participant bidder's last-unit offer and zero, for said last unit that may be provided of said selected units of public goods, thereby creating an incentive for the members of said community of beneficiaries to offer bids that approach their full marginal value;

said auction manager using any excess funds collected on respective units of said selected units of public goods other than and prior to determination by said server based computing device of said last unit that may be provided of said plurality of selected units of public goods provided to pay all or part of respective costs of providing said last unit that may be provided of said selected units of public goods, from at least one of iii) with and iv) without matching funds provided by an additional party to perform at least one of v) payment for and vi) assistance with paying for said last unit that may be provided of said selected units of public goods to said auction manager on said server based computing device; and said additional party being at least one party of vii) said philanthropic donor to the sale of said plurality of selected units of public goods and viii) at least one government agency supporting the sale of said selected units of public goods through government funding.

5. The method implemented on a server based computing device of selling said selected units of public goods to said community of beneficiaries as in claim 1, wherein said auction manager requests said participant bidders of said community of beneficiaries to make bid offers to said auction manager through said server based computing device starting from a first unit of said plurality of selected units of public goods to be provided and continuing to make bids on successive units up to a final unit available of said selected units of public goods chosen by said auction manager and then, based on said auction manager collecting said bids on said server based computing device from each participant bidder on each respective unit of said plurality of selected units of public goods, said auction manager, using a forward bid evaluation method, analyzes on said server based computing device bids received on said first unit of public goods to determine with said server based computing device whether said first-unit bids are sufficient to cover delivery costs of said first unit, wherein further said auction manager proceeds to evaluate with said server based computing device a second-unit bid for sufficiency to cover delivery costs of said second unit of said plurality of selected units of public goods, wherein further said auction manager proceeds with said bidding on said server based computing device in like manner with respective successive bids until identifying a last unit of said selected units of public goods prior to a first instance when earlier bids received are insufficient to cover delivery costs on said earlier unit of said selected units of public goods, thereby establishing said last unit as the last unit that may be provided as said final unit sold, wherein said auction manager uses said participant bidders' bids on said last unit that may be provided to establish with said server based computing device a per-unit price to be paid on each unit by the corresponding participant bidder, said per unit price being an individualized price to be paid by the corresponding participant bidder, wherein said auction manager uses said server based computing device to provide incentives to said respective participant bidders by determining at least one of:

a) a rebate to said participant bidder by the proportional rebate method wherein said individualized price on all units of said plurality of selected units for each participant-bidder equals said participant-bidder's bid minus any rebate of said participant bidder's bid in proportion to the excess of funds from the sum of all participant bidder's last unit bids over the delivery cost of said last unit that may be provided of said selected units of public goods; and, b) a pivotal bidder method wherein an individualized price on all units of said selected units of public goods before said last unit that may be provided for each participant-bidder is determined by said server based computing device equals the participant bidder's bid on said last unit that may be provided, while a respective discount price to be paid by each participant bidder for said last unit that may be provided is the amount of the participant bidder's bid on said last unit that may be provided, that is just enough to cover said last delivery costs on said last unit that may be provided when added to the sum of all last unit bids by all other respective participant bidders.

6. The method implemented on a server based computing device of selling multiple units of one or more public goods to a community of beneficiaries as in claim 1, in which said auction manager enters into a conditional contract for a maximum quantity of said plurality of selected units of public good that could be delivered, said auction manager requesting bids for a per-unit price for said maximum quantity, following up by requesting in succession bids for a per-unit price for fewer units of said plurality of selected units of public good, and based on collecting said bids the auction manager uses said server based computing device, in a backward bid evaluation method, to analyze unit-specific bids from said final potentially available unit backward toward the first potentially available unit, wherein said auction manager uses said server based computing device to stop analysis at a first instance when the sum of unit-specific bids are determined by said server based computing device to be sufficient to cover corresponding unit-specific delivery costs, thereby establishing said specific unit as the last unit that may be provided;

wherein said auction manager uses said participant bidders' bids on said last unit that may be provided to establish with said server based computing device a per-unit, individualized price to be paid on each unit by the corresponding participant bidder, wherein said auction manager uses said server based computing device to provide incentives to said respective participant bidders by determining at least one of:

a) a rebate to said participant bidder by the proportional rebate method wherein said individualized price on all units of said plurality of selected units for each participant-bidder equals said participant bidder's bid minus any rebate of said participant bidder's bid in proportion to the excess of funds from the sum of all participant bidder's last unit bids over the delivery cost of said last unit that may be provided of said selected units of public goods; and, b) a pivotal bidder method wherein an individualized price on all units of said selected units of public goods before said last unit that a be provided for each participant-bidder is determined by said server based computing device to equal the participant bidder's bid on said last unit that may be provided, while a respective discount price to be paid by each participant bidder for said last unit that may be provided is the amount of the participant bidder's bid on said last unit that may be provided that is just enough to cover said last unit delivery costs when added to the sum of all last unit bids by all other respective participant bidders.

7. The method implemented on a server based computing device of selling multiple units of one or more public goods to a community of beneficiaries as in claim 6 wherein said auction manager establishes unit specific prices by said proportional rebate method wherein said individualized bid price on all respective units for each participant-bidder equals said participant bidder's bid minus any rebate of said participant bidder's bid in proportion to a determined excess of funds from the sum of all said last unit bids over the delivery cost of said last unit that may be provided.

8. The method implemented on a server based of selling multiple units of one or more public goods to a community of beneficiaries as in claim 6 wherein said auction manager establishes unit specific prices as stated by a pivotal bidder method wherein by pivotal bidder method said individualized price on all units before said last unit that may be provided for each participant-bidder equals the participant bidder's bid on said last unit that may be provided, while the discount price paid by each participant-bidder for said last unit that may be provided is the amount of the participant bidder's bid on said last unit that may be provided that is just enough to cover said last-unit-delivery costs of said last unit that may be provided when added to the sum of all last-unit bids by all other respective participant bidders.

9. The method implemented on a server based computing device of selling multiple units of one or more public goods to a community of beneficiaries as in claim 6 wherein said auction manager uses said server based computing device to determine that said plurality of selected units of public goods are to be delivered when a sum of marginal bids exceeds a provision point for at least one unit of public goods, said auction manager using said server based computing device in analyzing subsequent bids of subsequent selected units of public good until said auction manager determines with said server based computing device a unit initially designated as said last unit that may be provided given the total number of bids received from said participant bidders and said auction manager publishes said unit initially designated as a last unit that may be provided and then establishing an additional-round of bidding offers;

wherein said auction manager then uses said server based computing device, in conjunction with bids received from said additional-round to identify whether a higher-numbered unit can be provided and designated as the ultimate last unit that may be provided, and to determine a discount price that each said participant bidder pays on said ultimate last unit that may be provided of public goods and a price that said participant bidders may pay on said previously bid-on respective infra-marginal units of public goods before said additional-round bid on said ultimate last unit that may be provided;

wherein said discount price is determined by said auction manager for each said participant bidder until said ultimate last unit that may be provided is calculated as a proportion of each said participant bidder's bid on said ultimate last unit that may be provided that is required in order to meet a provision point for said ultimate last unit that may be provided set equal to the amount of money needed to bring the sum of all bids from all participant bidders up to said provision point, wherein further said server based computing device determines when an individualized price for each said participant bidder for infra-marginal units is equal to said participant bidder's bid on said ultimate last unit that may be provided.

10. The method implemented on a server based computing device of selling multiple units of one or more public goods to a community of beneficiaries as in claim 5 wherein said auction manager uses said server based computing device to determine that said plurality of selected units of public goods are to be delivered when a sum of marginal bids exceeds a provision point for at least one unit of public goods, said auction manager using said server based computing device in analyzing subsequent bids of subsequent selected units of public good until said auction manager determines with said server based computing device a unit initially designated as said last unit that may be provided given the total number of bids received from said participant bidders and said auction manager publishes said unit initially designated as a last unit that may be provided and then establishing an additional-round of bidding offers;

wherein said auction manager then uses said server based computing device, in conjunction with bids received from said additional-round to identify whether a higher-numbered unit can be provided and designated as the ultimate last unit that may be provided, and to determine a discount price that each said participant bidder pays on said ultimate last unit that may be provided of public goods and a price that said participant bidders may pay on said previously bid-on respective infra-marginal units of public goods before said additional-round bid on said ultimate last unit that may be provided;

wherein said discount price is determined by said auction manager for each said participant bidder until said ultimate last unit that may be provided is calculated as a proportion of each said participant bidder's bid on said ultimate last unit that may be provided that is required in order to meet a provision point for said ultimate last unit that may be provided set equal to the amount of money needed to bring the sum of all bids from all participant bidders up to said provision point, wherein further said server based computing device determines when an individualized price for each said participant bidder for infra-marginal units is equal to said participant bidder's bid on said ultimate last unit that may be provided.

11. The method implemented on a server based computing device of selling multiple units of one or more public goods to a community of beneficiaries as in claim 1, in which funds collected in excess of that required to pay for said plurality of selected units of public good are returned proportionately to members of said participant bidders who contributed to said plurality of selected units of public goods thereby creating an incentive to non-bidding members of said community of beneficiaries to also offer bids.

12. The method implemented on a server based computing device of selling multiple units of one or more public goods to a community of beneficiaries as in claim 1 wherein said algorithm determines said final unit sold for each of said participant bidders by at least one of (a) a forward algorithm evaluating said collective set of bids beginning from a first unit of said plurality of available units and proceeding sequentially toward the last unit included within said plurality of available units as long as said collective set of bids offer sufficient revenue to cover the delivery cost of the corresponding unit, settling the auction at the last instance for which said collective set of bids offers sufficient revenue to cover said delivery cost of said corresponding unit and (b) a backward algorithm evaluating said collective set of bids beginning from the last unit included within said plurality of available units and proceeding sequentially toward the first unit included within said plurality of available units as long as said collective set of bids fails to offer sufficient revenue to cover the delivery cost of the corresponding unit, settling the auction at the first instance for which said collective set of bids offers sufficient revenue to cover said delivery cost of said corresponding unit;

thereby enhancing incentives for said participant bidders to provide a schedule of offers that approximately reveals each participant bidder's value for each marginal unit, particularly for units near said final unit sold;

wherein said forward algorithm sums up offers on said first unit from said schedule of offers from each of said participant bidders and determines whether the sum of said offers on said first unit equals or exceeds said delivery cost for said first unit; if said sum for said first unit equals or exceeds said delivery cost for said first unit, then and only then does said forward algorithm proceed to sum up offers on a second unit from said schedule of offers from each of said participant bidders to determine whether the sum of said offers on said second unit equals or exceeds said delivery cost for said second unit; if said sum for said second unit equals or exceeds said delivery cost for said second unit, then and only then does said forward algorithm proceed to sum up offers on a subsequent unit from said schedule of offers from each of said participant bidders to determine whether the sum of said offers on said subsequent unit equals or exceeds said delivery cost for said subsequent unit; whereby said forward algorithm proceeds to sum offers on each unit from said schedules of offers from each of said participant bidders until said algorithm finds that said sum of said offers on a particular unit fails to equal or exceed said delivery cost on said particular unit, at which point said forward algorithm determines that the last unit delivered by the auction is that highest-numbered unit for which the sum of offers from said schedule of offers from each of said participant bidders does equal or exceed said delivery cost on said last unit delivered by the auction.

13. The method implemented on a server based computing device of selling multiple units of one or more public goods to a community of beneficiaries as in claim 12 in which, for purposes of said auction process, said server based computing device may establish said delivery cost for each of said plurality of available units as at least one of (a) the total cost of delivery arising from all elements of a necessary sequence of steps for acquisition, production, management, marketing and delivery for each of said units and (b) some portion of said total cost for each of said units wherein said portion of said total cost for each of said available units is identified prior to solicitation of said bids from said participant bidders within said community of beneficiaries.

14. The method implemented on a server based computing device of selling multiple units of one or more public goods to a community of beneficiaries as in claim 13 in which a portion of said total cost of delivery for each of said units is provided outside said auction by at least one of (a) government funding sources, (b) non-government organizations, and (c) philanthropic donors, or combinations thereof, acting as partners to stimulate voluntary participation by said participant bidders within said community of beneficiaries.

15. The method implemented on a server based computing device of selling multiple units of one or more public goods to a community of beneficiaries as in claim 1 in which said participant bidders submit bids to said server based computing device through at least one of (a) a web-connected computing device such as a personal computer, including but not limited to a cell phone, and (b) written entry to an electronic spreadsheet on said server based computing device designed to implement said algorithm and determine an outcome of said auction; wherein said bids from each of said participant bidders comprises a schedule of offers to pay a maximum price-per-unit on each particular unit and on any units delivered up to said particular unit.

* * * * *